(12) United States Patent
Westenberger

(10) Patent No.: US 12,500,909 B1
(45) Date of Patent: Dec. 16, 2025

(54) SYSTEM FOR BI-DIRECTIONAL MESSAGE SCORING USING FEATURE EXTRACTION, CONTEXTUAL REFINEMENT, AND SYNTHESIS

(71) Applicant: Leon Westenberger, Wellington, FL (US)

(72) Inventor: Leon Westenberger, Wellington, FL (US)

(*) Notice: Subject to any disclaimer, the term of this patent is extended or adjusted under 35 U.S.C. 154(b) by 0 days.

(21) Appl. No.: 19/303,307

(22) Filed: Aug. 18, 2025

Related U.S. Application Data

(60) Provisional application No. 63/684,670, filed on Aug. 19, 2024.

(51) Int. Cl.
*H04L 9/40* (2022.01)
*G06Q 30/018* (2023.01)

(52) U.S. Cl.
CPC ..... *H04L 63/1416* (2013.01); *G06Q 30/0185* (2013.01); *H04L 63/1441* (2013.01)

(58) Field of Classification Search
CPC ............ H04L 63/1416; H04L 63/1441; G06Q 30/0185
See application file for complete search history.

(56) References Cited

U.S. PATENT DOCUMENTS

| | | | |
|---|---|---|---|
| 8,903,920 B1* | 12/2014 | Hodgson | G06F 21/56 709/206 |
| 9,356,941 B1* | 5/2016 | Kislyuk | H04L 63/14 |
| 9,690,933 B1* | 6/2017 | Singh | G06N 5/025 |
| 10,491,627 B1* | 11/2019 | Su | H04L 63/145 |
| 11,741,256 B2* | 8/2023 | Gupta | G06F 21/552 726/23 |
| 2014/0096261 A1* | 4/2014 | Boldyrev | G06F 21/00 726/26 |
| 2018/0063163 A1* | 3/2018 | Pevny | H04L 63/1425 |
| 2019/0108334 A1* | 4/2019 | Sadaghiani | G06N 3/08 |
| 2020/0145433 A1* | 5/2020 | Gutierrez | G06N 3/0985 |
| 2020/0213325 A1* | 7/2020 | Scherman | H04L 63/1425 |

(Continued)

*Primary Examiner* — Abu S Sholeman
(74) *Attorney, Agent, or Firm* — Outlier Patent Attorneys, PLLC

(57) ABSTRACT

A computing system for adaptive electronic message classification employs a multi-agent architecture comprising a media feature analysis system, a user context refinement system, and a response synthesis system. The media feature analysis system generates pillar scores including message type, intent, and link risk scores with associated confidence values using trained classification models. When pillar scores and confidence values do not satisfy predetermined threshold conditions, the user context refinement system dynamically constructs contextual prompts using the pillar scores and confidence values as input parameters. User responses generate score modification data that refines the pillar scores and contextual response data for recommendation generation. The response synthesis system generates refined classifications and personalized recommendations using the refined pillar scores and contextual response data. An orchestration system coordinates agent interactions using learned uncertainty points and implements asymmetric influence algorithms with variable weighting based on content and URL analysis concordance.

26 Claims, 17 Drawing Sheets

(56) References Cited

U.S. PATENT DOCUMENTS

| | | | |
|---|---|---|---|
| 2022/0060491 A1* | 2/2022 | Achleitner | H04L 63/1425 |
| 2023/0153427 A1* | 5/2023 | Croteau | G06F 21/554 |
| | | | 726/22 |
| 2025/0071129 A1* | 2/2025 | Sinks | H04L 63/1416 |

\* cited by examiner

SYSTEM FOR BI-DIRECTIONAL MESSAGE SCORING USING FEATURE EXTRACTION, CONTEXTUAL REFINEMENT, AND SYNTHESIS

CROSS-REFERENCE TO RELATED APPLICATIONS

This application claims priority to U.S. Provisional Patent Application No. 63/684,670, entitled "AI-DRIVEN INTERACTIVE SCAM DETECTION," filed on Aug. 19, 2024, the entire disclosure of which is incorporated herein by reference in its entirety.

FIELD OF THE ART

The systems and methods disclosed herein relate generally to cybersecurity and fraud detection systems and, more specifically, to multi-agent systems and methods for distributed message classification using bi-directional feedback agent coordination and context-driven threat assessment refinement.

BACKGROUND

Fraudulent and deceptive communications are increasingly delivered through multiple channels, including SMS, email, phone calls, and application notifications. These communications may involve impersonation, urgency cues, misleading context, or other behaviorally targeted techniques designed to manipulate recipients into disclosing sensitive information or performing harmful actions. Conventional detection systems often rely on static rule sets, fixed signatures, or single-layer AI models trained on known attack patterns, which limits their adaptability to evolving threats.

Many existing fraud detection systems apply unidirectional classification logic that operates solely on message content or surface-level features. These approaches typically lack mechanisms to incorporate situational context, user-specific details, or follow-up interaction signals that may be critical to disambiguating legitimate communications from harmful ones. As a result, ambiguous or context-dependent messages often go unflagged or are misclassified.

Scoring systems in conventional architectures do not typically support iterative refinement based on downstream interaction or response data. Even when user input is collected, it is often treated as an isolated signal and not integrated into the core classification logic. This limits the system's ability to dynamically resolve uncertainty or adjust outputs based on evolving context.

In addition, traditional architectures do not support modular coordination across multiple processing agents. Components often operate independently with limited orchestration, and there is no consistent mechanism to evaluate scoring uncertainty or to selectively trigger deeper contextual analysis when appropriate. This lack of coordination reduces system flexibility and reduces the opportunity to combine multiple risk signals into a coherent decision.

Accordingly, there remains a need for systems and methods that support coordinated fraud detection using modular analysis agents, where scoring can be dynamically refined based on structured user interaction, and where orchestration logic can determine when and how deeper contextual refinement is applied.

SUMMARY

Systems and methods in accordance with various embodiments of the present disclosure may address technical limitations associated with conventional fraud detection, message classification, and context-dependent risk evaluation. In particular, various embodiments describe systems and methods for distributed risk scoring using modular classifier agents, bi-directional scoring refinement, and prompt-based context resolution. The system supports modular execution across classifier components, selective user prompting based on score uncertainty, and refinement workflows that apply transformation logic to adjust scoring outputs in response to structured user input.

As used herein, a "pillar" refers to a distinct scoring track trained to evaluate a specific risk attribute, such as a feature-based signal pillar, an intent-based classification pillar, or a link analysis pillar, wherein each pillar produces independent scores and supporting metadata that are combined using orchestration logic.

For example, embodiments receive a message or communication, which may include a text string, sender metadata, embedded links, attachments, timestamps, or other contextual attributes. A combined risk score is generated using a multi-pillar classification architecture trained to evaluate feature-based, intent-based, and link-based attributes. When a scoring threshold or confidence condition is met, the system generates a context-refining prompt using prompt variables, extracted features, and configurable goal types.

The system dynamically constructs these prompts using the pillar scores and confidence values as input parameters for prompt generation, wherein the specific score patterns and confidence distributions inform the contextual relevance and targeting of the generated questions. Unlike static questioning systems that rely on predefined templates, the prompt generation process utilizes the feature importance data and pillar-specific uncertainty indicators to construct prompts specifically designed to resolve identified areas of analytical ambiguity.

The prompt is presented to the user, and a structured response is received. This response is applied using transformation logic to update the original score within defined delta boundaries and logit space constraints. The system implements a bidirectional feedback mechanism wherein user responses not only provide additional context but directly modify the original pillar scores generated by the initial classification models. This bidirectional refinement enables iterative improvement of the underlying analysis rather than treating user input as supplementary data, creating a feedback loop that enhances classification accuracy through score-level modifications based on user-provided contextual information.

A synthesis engine generates a refined output that reflects the updated classification and rationale. The user context refinement system generates dual-purpose output comprising both score modification data for refining the original classification analysis and contextual response data for enhancing personalized recommendation generation. The same user responses simultaneously serve two functions: adjusting the pillar-based threat assessment scores and providing contextual information that informs the generation of tailored security recommendations. This dual-purpose integration enables the system to improve both analytical accuracy and recommendation personalization through a single user interaction workflow.

Embodiments support coordinated execution across modular classifier agents. Each agent is operable to process input features, apply a trained model, and produce structured scoring outputs. Orchestration logic governs message routing, score evaluation, prompt generation triggers, and agent invocation based on message class, session state, and prior outputs. Each agent interface supports schema-conformant data transfer, version-aware input structures, and logging for training and traceability.

The system also supports machine-executed training workflows. These workflows generate labeled datasets, apply filtering and clustering logic, and refine classification models used by each agent. During execution, the system applies response impact scoring to identify candidate questions that are likely to shift model predictions. User inputs and scoring outcomes are stored with associated metadata to support retraining and future inference adaptation.

The disclosed systems improve the technical field of fraud detection and risk classification by enabling adaptive scoring pipelines driven by modular classifier agents, confidence-aware orchestration, and response-informed score transformation. Each function in the system is performed by machine-executed components operating over defined inputs and structured workflows.

The system generates targeted prompts using prompt variable mappings and delivers them to the user when classification ambiguity is detected. Responses are applied using bounded transformation logic that adjusts risk scores in logit space based on response content, scoring vector delta thresholds, and refinement alignment models.

Orchestration components evaluate message type, scoring confidence, and session state to determine execution flow. Agent modules are invoked selectively and operate over defined schema inputs to perform classification, prompting, and synthesis. This coordination allows dynamic adjustment of processing steps without manual intervention.

The system supports technical capabilities that extend beyond rule-based classifiers by enabling logit-level scoring updates, agent-driven orchestration, and prompt-response integration through structured execution paths. These functions collectively improve classification reliability and adaptability under conditions where message meaning depends on context, user relationship, or behavioral cues.

Various other functions and advantages are described and suggested below as may be provided in accordance with the various embodiments.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

The embodiments described herein relate to systems and methods for message classification and risk scoring using modular agent coordination, prompt-based refinement, and structured synthesis. The system is operable to receive a message or communication, apply distributed classification models, evaluate scoring uncertainty, generate structured prompts, receive and interpret user responses, and generate a refined classification outcome using updated scoring logic. In various embodiments, the system includes components for message ingestion and parsing, multi-pillar scoring and classification, orchestration-based agent coordination, prompt generation and delivery, and response-based score refinement-enabling modular, machine-executed workflows for dynamic message interpretation. The system processes incoming messages, evaluates multiple risk dimensions using trained classifiers, determines whether refinement is needed, and when applicable, generates questions designed to shift classification probability based on user input. Structured responses are used to adjust underlying scores through transformation logic and are applied as part of a synthesis process that produces human-readable outputs. In certain embodiments, the system integrates model-based classification, logit-space refinement logic, prompt impact scoring, and structured orchestration workflows to enable adaptable and transparent message evaluation.

Conceptual Architecture

Figure 1:
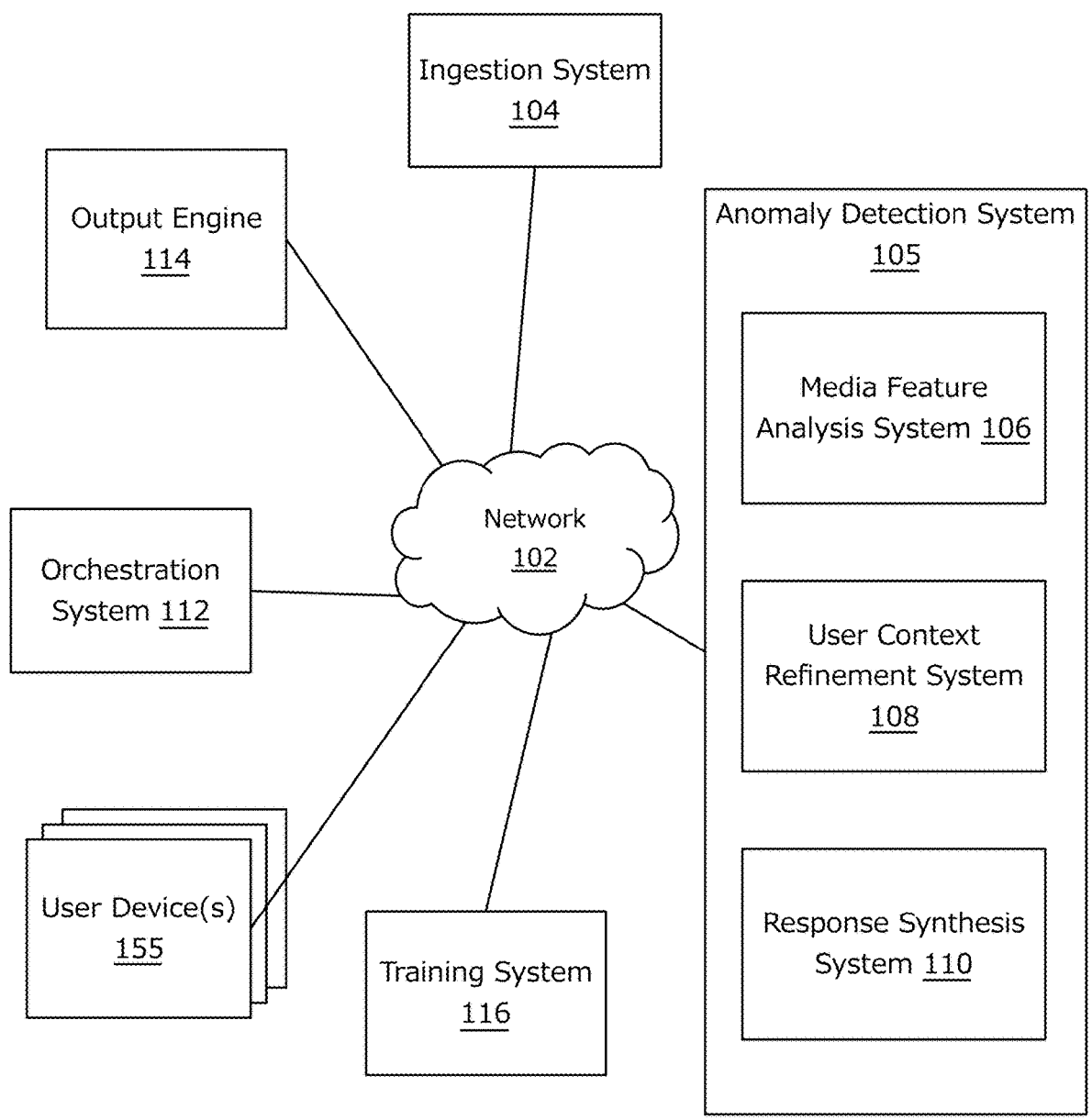
FIG. 1 illustrates an example system architecture for modular message classification and refinement in accordance with various embodiments.

FIG. 1 illustrates an exemplary embodiment of a system architecture for coordinated message classification and refinement, in accordance with various embodiments. As shown, the system includes ingestion system 104, anomaly detection system 105, media feature analysis system 106, user context refinement system 108, response synthesis system 110, orchestration system 112, output engine 114, training system 116, and user device(s) 155, interconnected over one or more networks 102. Each component is operable to process structured or unstructured message data, evaluate classification confidence, and coordinate scoring, prompting, and refinement workflows across distributed system elements.

The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met.

User device(s) 155 comprise one or more network-connected computing devices operable to render interface components for interacting with classification results and structured message refinement workflows. User device(s) 155 may include smartphones, tablets, laptops, or other devices configured to execute native or browser-based applications that communicate with the systems described herein. Through these interfaces, users may submit potentially fraudulent messages or suspicious content, receive classification prompts, and provide structured responses to assist in message interpretation and scoring refinement. In certain embodiments, user device(s) 155 receive agent-generated prompts, transmit response inputs for score recalibration, and display outputs provided by response synthesis system 110.

User device(s) 155 include, generally, a computer or computing device including functionality for communicating (e.g., remotely) over a network 102. Data may be collected from user device(s) 155, and data requests may be initiated from each user device. User device(s) 155 may be a server, a desktop computer, a laptop computer, personal digital assistant (PDA), an in-or out-of-car navigation system, a smart phone or other cellular or mobile phone, or mobile gaming device, among other suitable computing devices. User device(s) 155 may execute one or more applications, such as a web browser (e.g., Microsoft Windows Internet Explorer, Mozilla Firefox, Apple Safari, Google Chrome, and Opera, etc.), or a dedicated application to submit user data or respond to system prompts over network 102.

In particular embodiments, each user device may be an electronic device including hardware, software, or embedded logic components or a combination of two or more such components and capable of carrying out the appropriate functions implemented or supported by the user device. For example and without limitation, a user device may be a desktop computer system, a notebook computer system, a netbook computer system, a handheld electronic device, or a mobile telephone. The present disclosure contemplates any user device. A user device may enable a network user at the user device to access network 102. A user device may enable its user to communicate with other users at other user devices.

A user device may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 155 one or more Hyper Text Markup Language (HTML) files responsive to the HTTP request. The user device 155 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 155 may also include an application that is loaded onto the user device 155. The application obtains data from the network 102 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Ingestion system 104 is operable to receive communication input from user device(s) 155 for analysis and scoring. More specifically, ingestion system 104 is operable to receive a message that includes one or more forms of media content to be evaluated for potential scam or risk indicators. As used herein, the term "message" may refer to any user-submitted communication intended for evaluation, including but not limited to email text, SMS content, chat messages, voice transcriptions, phone transcripts, social media direct messages, screenshots, file attachments, and hyperlinks. The term "media content" may refer to the digital representation of the message, including structured or unstructured text, metadata, embedded links, images, and formatted message artifacts.

For example, ingestion system 104 is operable to receive a pasted message copied from an email, a screenshot of a chat thread, an uploaded image containing text (such as a photo of a physical letter), or a forwarded link to an online message. In certain embodiments, ingestion system 104 includes parsing logic to segment multi-part messages, normalize text encoding, and extract relevant components from embedded media such as hyperlinks or attached files. In one example, ingestion system 104 may apply optical character recognition (OCR) to extract message content from an uploaded image, or tokenize HTML-formatted input to isolate visible message text from markup, headers, or tracking pixels.

In certain embodiments, ingestion system 104 is further operable to apply one or more preprocessing operations to prepare the message for analysis by systems and/or components described herein. In an embodiment, preprocessing may include text normalization, entity redaction, language detection, or session tagging based on metadata associated with the input. In an embodiment, ingestion system 104 performs language-agnostic formatting to preserve message structure while enabling multi-lingual analysis. In another embodiment, ingestion system 104 adds a session-level identifier to group related messages for analysis under a common orchestration cycle.

In an embodiment, ingestion system 104 may operate as an entry point for anomaly detection system 105 and its constituent subsystems. In various embodiments, ingestion system 104 forwards the parsed and normalized message to media feature analysis system 106 for classification, while separately providing metadata and session state to orchestration system 112 for execution flow control. In some implementations, ingestion system 104 includes an ingestion logging module or message intake record for traceability and session reconstruction.

Anomaly detection system 105 is operable to evaluate message content for indicators of fraud, deception, or other risk conditions using distributed model-based analysis. More specifically, anomaly detection system 105 comprises a plurality of classification agents operable to perform specialized risk evaluation tasks using distinct inference models and domain-specific heuristics. In various embodiments, anomaly detection system 105 includes at least media feature analysis system 106, user context refinement system 108, and response synthesis system 110, each operable to analyze or refine risk attributes of a message using model-specific processing. While three agents are described in connection with the illustrated embodiment, the number, configuration, and processing boundaries of such agents may vary. Additional or alternate agent types may be included depending on deployment context, scoring objective, or training pipeline availability.

Anomaly detection system 105 serves as a logical grouping for distributed analysis components and does not independently govern task execution or output synchronization. In various embodiments, agent coordination, execution timing, and message routing are directed by orchestration system 112, which determines which agents to invoke, when to solicit user input, and how to resolve or combine intermediate scores. As such, anomaly detection system 105 provides a modular classification architecture through which distinct scoring techniques, refinement methods, and model feedback loops can be independently implemented and orchestrated.

In operation, anomaly detection system 105 receives normalized message content and associated metadata from ingestion system 104. The media feature analysis system 106 is operable to apply trained classification models to detect structural, linguistic, and feature-based anomalies. The user context refinement system 108 is operable to prompt the user with targeted questions to clarify ambiguous or under-specified message attributes. The response synthesis system 110 is operable to reconcile model output and user-provided input to generate a combined score representing the system's current confidence level. These agents operate as discrete inference modules, each exposing one or more interfaces for model invocation, score submission, or question-response capture.

In various embodiments, the design of anomaly detection system 105 supports iterative scoring, inter-agent messaging, and dynamic prompt construction, with coordination decisions handled externally by orchestration system 112. As further described in connection with FIGS. 2-4, each classification agent may include its own training system interface and internal scoring mechanisms that contribute to the overall system evaluation.

Media feature analysis system 106 is operable to perform feature-level classification of a received message using trained models and domain-specific attribute extraction. More specifically, media feature analysis system 106 is operable to generate a base risk score for a message based on structural, linguistic, and metadata-based features present in the submitted content. Media feature analysis system 106 is further described in FIG. 2. In various embodiments, media feature analysis system 106 operates independently of user context and is configured to apply static feature pipelines that evaluate the message as initially received.

For example, media feature analysis system 106 may tokenize input content into discrete features and apply multiple classification models to infer attributes such as topic category, persuasive tone, grammatical complexity, emotional urgency, or impersonation likelihood. In certain embodiments, media feature analysis system 106 generates one or more classification scores using a pillar-based architecture. As used herein, a "pillar" refers to a distinct scoring track trained to evaluate a specific risk attribute, such as a feature-based signal pillar, an intent-based classification pillar, or a link analysis pillar. Each pillar may produce an individual score and supporting metadata. These pillar scores may be retained for combination by other systems. In certain embodiments, media feature analysis system 106 generates independent scoring outputs from multiple modeling tracks, including a feature-based pillar, an intent classification pillar, and a URL structure pillar. These outputs are fused into a combined risk score, and a confidence value is assigned based on pillar agreement, model certainty, or historical error calibration metrics.

In certain embodiments, media feature analysis system 106 further includes logic to detect format anomalies such as encoded characters, invisible links, obfuscated contact information, or domain impersonation. In one example, media feature analysis system 106 may extract all embedded URLs from the message, apply a link reputation model, and output a confidence score that is passed to orchestration system 112 for further use in prompt generation or synthesis. In another example, media feature analysis system 106 may use a lightweight BERT-based model to classify the message's overall intent and generate supporting evidence for why it was flagged.

In various embodiments, media feature analysis system 106 interfaces with training system 116 via training system interface 204 to receive updated model weights, scoring rules, or tokenization logic. Feature labels, classification outcomes, and intermediate pillar scores may be logged to support retraining or refinement. As described in connection with FIG. 2, media feature analysis system 106 may also provide raw or preprocessed feature maps to user context refinement system 108 for use in question generation workflows.

User context refinement system 108 is operable to generate and deliver prompt content to user device(s) 155 in order to solicit user input for clarifying ambiguous or risk-relevant aspects of a received message. More specifically, user context refinement system 108 is operable to select, construct, and transmit context-specific questions designed to influence the underlying classification outcome by adjusting how the message is interpreted. User context refinement system 108 may operate as a component of anomaly detection system 105 or as a standalone service depending on system architecture. User context refinement system 108 is further described in FIG. 3.

In various embodiments, user context refinement system 108 receives the combined risk score and associated confidence value from media feature analysis system 106 and applies user-specific adjustments based on answers to dynamically generated questions. Each user response is mapped to a structured modifier or flag that corresponds to one or more score dimensions. The system applies transformations in logit space to reflect directional adjustments, and generates a refined score, a difference metric, and an updated confidence value. These updated values are passed downstream to response synthesis system 110 for final synthesis and output determination.

In various embodiments, user context refinement system 108 includes one or more prompt generation models operable to construct multiple-choice or freeform questions that relate to high-variance dimensions in the classification outcome. For example, user context refinement system 108 may identify a scoring region with low confidence or contradictory feature weights and generate a question designed to probe that ambiguity. In one embodiment, the question is framed to distinguish between a benign service notice and a phishing attempt by prompting the user to identify the original message's purpose, tone, or expected follow-up. Questions may vary in structure, specificity, or delivery format depending on message type, user interface context, or model-driven uncertainty.

In certain embodiments, user context refinement system 108 includes a question selection module operable to prioritize prompts based on their potential impact on the combined classification score. As used herein, "impact strength" refers to a heuristic or learned measure of how materially a given user input could alter the message score when fed back into the overall evaluation process. In one example, user context refinement system 108 references a previously trained response-effect model that estimates the shift in score likelihood resulting from a particular user response and selects the top-ranked prompt accordingly.

In an embodiment, user context refinement system 108 includes a response mapping module operable to transform user inputs into structured response vectors. These vectors may be passed directly to response synthesis system 110 or may be used to update earlier model inputs, weights, or feature interpretations. In certain configurations, user responses are hashed and stored along with the session identifier to support later review, model refinement, or reprocessing. Prompt content, delivery timing, and response structure may be adapted over time based on training system interface 302, which allows updated prompt models, question weightings, or scoring logic to be applied without full redeployment.

In certain embodiments, the response mapping module implements a dual-purpose processing architecture wherein each individual user response simultaneously generates two distinct output streams from the same input data.

As used herein, "dual-purpose processing architecture" refers to the system's capability to process a single user response to generate both score modification data (comprising structured response vectors and transformation parameters for adjusting pillar scores) and contextual response data (comprising semantic information and user preference indicators for enhancing recommendation generation), enabling simultaneous improvement of threat classification accuracy and recommendation personalization through parallel processing pathways.

The first output stream comprises score modification data derived from the user response, which is applied to refine and adjust the original pillar scores generated by media feature analysis system 106. The second output stream comprises contextual response data, also derived from the same user response, which provides contextual information used by response synthesis system 110 to generate personalized recommendations. This dual-purpose architecture enables a single user interaction to concurrently improve both the accuracy of the underlying threat classification (through score refinement) and the personalization of security recommendations (through contextual enhancement), maximizing the value extracted from each user input while minimizing interaction burden on the user.

In certain embodiments, user context refinement system 108 dynamically constructs a structured prompt using a collection of variables received from media feature analysis system 106, orchestration system 112, and prior user interactions. These variables may include the initial combined risk score, per-pillar disagreement metrics (e.g., variance between feature model and intent model outputs), score confidence values, user profile metadata, prior response influence deltas, message classification category, and session-level state flags. More specifically, prompt templates are populated with these parameters to instruct the large language model on which question to generate and what format to follow, enabling consistent refinement across sessions and users. In certain embodiments, orchestration system 112 applies rules or learned heuristics to determine which input parameters are most predictive of user-influenced score adjustment, allowing Scout to generate targeted prompts likely to elicit meaningful differentiation. This dynamic prompt construction distinguishes the system from static, single-format LLM interactions and supports adaptive, score-guided refinement in real time.

Orchestration system 112 implements a sophisticated two-step score combination process for integrating outputs from multiple analysis components into a unified risk assessment. This two-step process ensures that each type of analysis contributes appropriately to the final classification while maintaining sensitivity to complex threat patterns that may not be apparent from individual component scores.

In the first step of the combination process, orchestration system 112 combines the feature-based scores from message-type classifier 208 with the intent-based scores from intent scoring and pillar evaluation engine 210. This combination uses confidence-weighted averaging, wherein each score's contribution is modulated by its associated confidence value. The confidence weighting ensures that high-confidence assessments have greater influence on the combined score than low-confidence assessments. This first step produces a base content assessment that reflects both the structural characteristics of the message (from feature analysis) and its semantic intent patterns (from intent analysis).

The second step of the combination process occurs when link analyzer engine 211 has identified URLs within the message. In this step, orchestration system 112 applies the link-based risk assessment to modify the base content assessment using the asymmetric influence algorithm described herein. The modification process employs non-linear transformation functions that calculate influence magnitude based on multiple factors including the distance between the base content score and the URL risk score, the confidence values of each assessment, and learned uncertainty thresholds.

The transformation functions used in the second step provide several important characteristics. First, they ensure smooth transitions between different influence levels, preventing discontinuous jumps in the final risk score that could lead to classification instability. Second, they bound the maximum influence that any single component can exert, preventing a single high-confidence assessment from completely overriding other components. Third, they implement bidirectional influence, allowing URL assessments to both increase risk scores (when URLs appear more dangerous than content) and decrease risk scores (when URLs appear safer than content), though with asymmetric strength as specified by the influence algorithm.

In certain embodiments, the two-step combination process utilizes learned parameters retrieved from training system 116. These parameters include uncertainty thresholds for each scoring component, maximum influence weights for different scenario types, and scaling factors for confidence integration. The learned parameters are periodically updated based on classification performance metrics, ensuring that the combination process adapts to evolving threat patterns and maintains optimal classification accuracy.

Response synthesis system 110 is operable to generate a final risk classification or message interpretation by combining model-derived signals and user-submitted input into a unified scoring output. More specifically, response synthesis system 110 is operable to aggregate scores, apply adjustment logic based on user responses, and produce a confidence-weighted determination suitable for output or downstream integration. Response synthesis system 110 may be implemented as part of anomaly detection system 105 or operate as a standalone module depending on system configuration. Response synthesis system 110 is further described in FIG. 4.

In various embodiments, response synthesis system 110 receives one or more score components from media feature analysis system 106, along with structured user response vectors from user context refinement system 108. The system includes a score reconciliation engine operable to evaluate the differential between pre-response and post-response scores and apply adjustment logic accordingly. In one embodiment, response synthesis system 110 maintains a weighted combination formula in which model confidence, user alignment, and historical response effectiveness are used to adjust the final classification output.

In certain embodiments, response synthesis system 110 includes a refinement loop evaluator operable to track how much user input altered the classification result. As used herein, a "refined score" refers to the updated message score produced after incorporating one or more structured user responses. In some implementations, response synthesis system 110 computes a "difference score" indicating the delta between the original model-based classification and the user-informed result. This value may be used for audit purposes, training data weighting, or trust-based adaptation in future sessions.

In various embodiments, response synthesis system 110 includes a scoring policy module configured to determine how multiple inputs (e.g., multi-pillar scores, user-derived vectors) are weighted, discarded, or elevated during final output generation. Different scoring policies may be applied depending on message type, platform source, or risk category. These policies may be updated dynamically via training system interface 402, which allows scoring thresholds, reconciliation formulas, and weightings to be revised based on retraining or system-wide tuning procedures.

Training system 116 is operable to generate, refine, and distribute model artifacts used by one or more components of the classification and refinement system described herein. More specifically, training system 116 is operable to prepare labeled training sets, execute training jobs using domain-specific data, evaluate performance against validation criteria, and deliver updated model weights, prompt selection logic, and scoring parameters to downstream systems. Training system 116 is further described in FIGS. 6, 7, and 8.

A key innovation of training system 116 is the derivation and optimization of learned uncertainty points that replace traditional hardcoded decision thresholds throughout the anomaly detection system 105. These uncertainty points represent empirically determined score values where classification confidence is lowest, typically occurring at decision boundaries between different risk categories. Unlike static thresholds that remain fixed regardless of model performance, learned uncertainty points dynamically adapt based on validation data analysis and real-world classification outcomes.

Training system 116 calculates uncertainty points for each scoring component by analyzing the distribution of scores across labeled validation datasets. For each component (message-type classifier 208, intent scoring and pillar evaluation engine 210, and link analyzer engine 211), the system identifies score regions where classification errors are most frequent or where confidence values are consistently low. These regions indicate natural decision boundaries in the feature space where additional context or refined analysis would be most beneficial. The identified uncertainty points are then stored as model metadata and provided to orchestration system 112 for use in score combination and influence weighting calculations.

The learned uncertainty points serve multiple critical functions within the system. First, they determine when user context refinement system 108 should be engaged to gather additional information, with scores near uncertainty points triggering contextual prompts while scores far from uncertainty points proceed with direct classification. Second, they modulate the influence weights in the asymmetric influence algorithm, with the distance from uncertainty points affecting how strongly one component's assessment can influence another's. Third, they enable the system to quantify and report classification confidence in a principled manner, with confidence inversely related to proximity to uncertainty points.

In various embodiments, training system 116 continuously refines uncertainty points through online learning mechanisms. As response synthesis system 110 generates classification outputs and receives feedback through user interactions or ground truth labels, training system 116 analyzes classification performance in different score regions. Regions with improving performance may have their uncertainty points adjusted to reflect increased model confidence, while regions with degrading performance may have uncertainty points shifted to trigger more conservative classification strategies. This continuous refinement ensures that the system's decision boundaries remain optimally positioned as threat patterns evolve.

The use of learned uncertainty points provides significant advantages over traditional threshold-based approaches. By deriving thresholds from actual model performance rather than predetermined values, the system achieves better calibration between reported confidence and actual classification accuracy. Additionally, learned uncertainty points can differ between content types, user populations, or deployment contexts, enabling the system to maintain optimal performance across diverse operational environments without manual threshold tuning.

In various embodiments, training system 116 includes data pipelines for constructing training sets based on captured message samples, user responses, and observed score differentials. Training data may include feature vectors derived from message content, structured labels assigned by human reviewers, and telemetry from prior classification sessions. In certain configurations, training system 116 also receives scoring deltas produced by response synthesis system 110 and uses those values to model impact strength and question effectiveness. These values may be used to guide prompt generation or adjust score reconciliation strategies.

Figure 7:
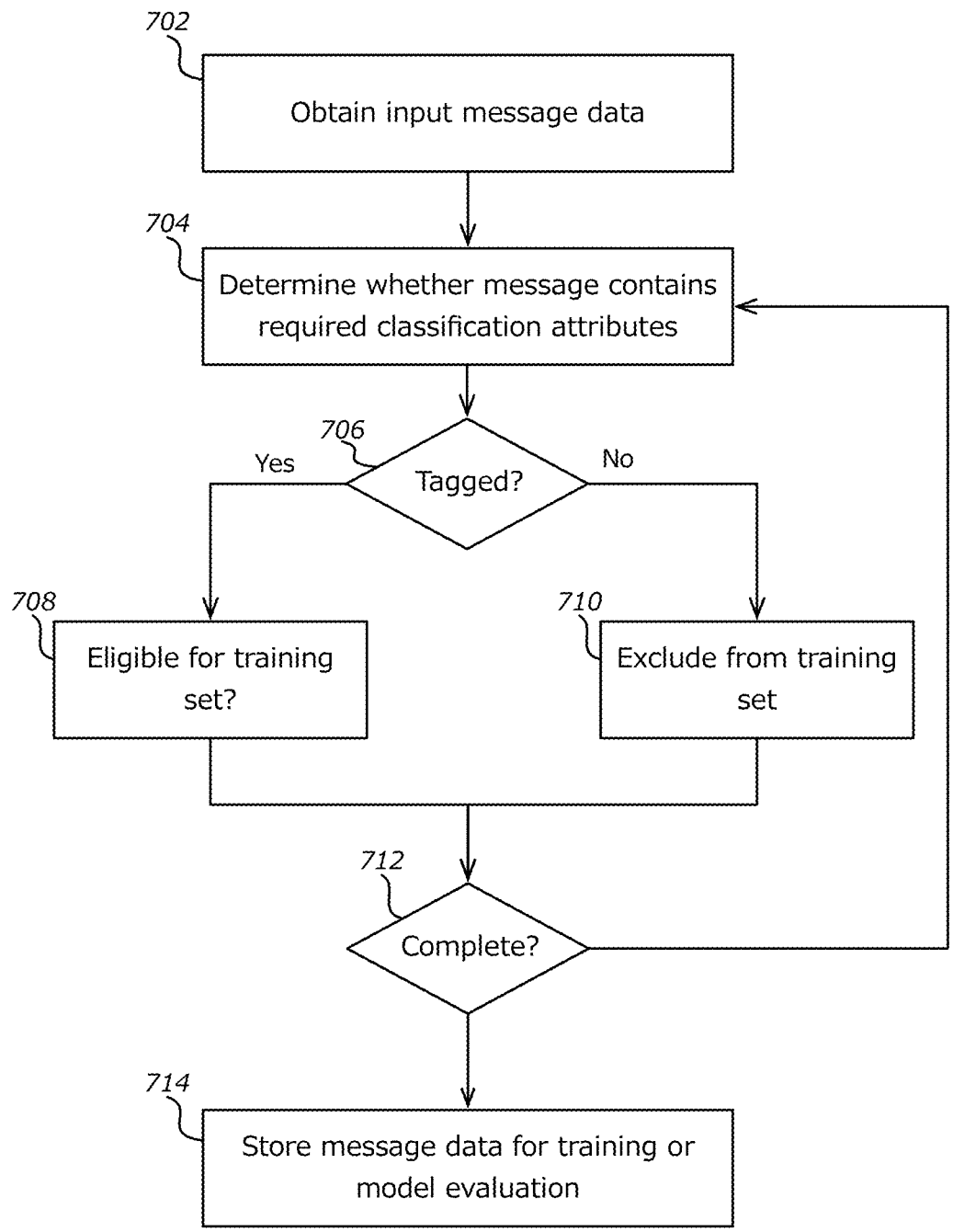
FIG. 7 illustrates a training pipeline for the user interaction system in accordance with various embodiments.

In an embodiment, training system 116 supports multi-pillar training flows, wherein independent models are trained to classify features, intent, or link-based attributes using separate, pillar-specific training sets. Trained models are versioned and evaluated against separate test data prior to deployment. In certain implementations, training system 116 applies inclusion criteria, exclusion filters, and confidence thresholds (as shown in FIG. 7) to determine whether a message-response pair qualifies for retraining inclusion.

In some embodiments, training system 116 includes distribution logic for transmitting updated models, prompt selection weights, or scoring rules to individual components—such as media feature analysis system 106, user context refinement system 108, and response synthesis system 110—using the training system interfaces described in each corresponding figure. Retraining may occur on a fixed schedule, upon crossing a performance degradation threshold, or in response to novel message types. Metadata and version information may be persisted to support model rollback, auditability, or traceability across sessions.

Orchestration system 112 is operable to control message flow, execution timing, and coordination logic across system components responsible for classification, refinement, and output generation. The system implements RED FLAG detection, which is a condition triggered when link risk analysis indicates high threat levels while content analysis indicates low risk levels, representing sophisticated attack patterns where malicious URLs are masked by legitimate-appearing content. This discordant scenario receives maximum influence weighting in the asymmetric influence algorithm to ensure dangerous URLs are not overlooked due to benign content characteristics. More specifically, orchestration system 112 is operable to receive input data, determine which agents or modules to activate based on message state, and route intermediate and final results across relevant subsystems. Orchestration system 112 is further described in FIG. 5.

In various embodiments, orchestration system 112 includes a message intake manager operable to receive message objects from ingestion system 104 and prepare them for multi-stage analysis. Preparation may include normalization of message fields, attachment of metadata tags, or initialization of agent execution flags. In some implementations, orchestration system 112 performs format verification and extracts embedded content for separate evaluation or queuing.

Orchestration system 112 may include an execution routing module operable to determine which components to activate, in what order, and with which input parameters. For example, orchestration system 112 may instruct media feature analysis system 106 to generate an initial classification vector, pass that vector to user context refinement system 108 if additional input is required, and then trigger response synthesis system 110 after user input is received or timeout conditions are met. In certain embodiments, routing logic is stateful and incorporates session-level metadata to inform execution decisions.

In certain embodiments, orchestration system 112 includes a session tracking module operable to maintain state information across the lifetime of a message classification session. This may include tracking intermediate scores, user engagement status, or pending agent outputs. State tracking supports timeout handling, partial execution recovery, and system logging.

Orchestration system 112 may further include threshold evaluation logic used to determine whether downstream components are necessary based on system confidence levels or message sensitivity. For example, if a classification exceeds a system-defined risk threshold, orchestration system 112 may bypass refinement and send the message directly to output engine 114. In other cases, orchestration system 112 may delay message forwarding until user input is received or additional confirmation is captured.

In certain embodiments, orchestration system 112 interacts with training system 116 to log runtime telemetry, trigger retraining events, or propagate system flags used for feedback integration. System logs may include timing metadata, error traces, delta scores, or execution variance records, which are used to support post-hoc analysis and retraining dataset assembly.

Output engine 114 is operable to deliver the final system-generated classification or risk interpretation to an external interface, message-handling service, or user-facing component. More specifically, output engine 114 is operable to receive structured results from response synthesis system 110, apply formatting logic or routing policy as applicable, and transmit the final result for presentation, logging, or downstream handling.

In various embodiments, output engine 114 includes a result formatter configured to assemble scoring data, message annotations, and classification labels into a structured payload. Payloads may include original message content, per-pillar score components, a combined risk score, and one or more user-readable summaries. In some implementations, output engine 114 also includes confidence indicators or explanatory tags derived from the scoring logic, which can be rendered as part of an interface element or response packet. The system performs transformations in logit space, which refers to the mathematical domain where probability values are converted using the logit function (natural logarithm of odds ratio) to enable linear mathematical operations on probability distributions. Logit-space transformations allow the system to apply additive and multiplicative adjustments to confidence scores while maintaining valid probability bounds, ensuring that score modifications preserve the mathematical properties required for accurate probability combination and calibration.

In certain embodiments, output engine 114 includes a delivery policy module operable to determine where and how to transmit the final output. For example, the output may be sent to a browser-based user interface, an SMS handler, an email client plugin, or a backend fraud detection service. The delivery policy may be based on platform-specific configuration, message source, user role, or alert level.

Output engine 114 may also be operable to persist output results for downstream analytics or feedback incorporation. In one embodiment, outputs are stored with unique session identifiers and associated metadata, allowing training system 116 to later access them during model retraining or performance evaluation. In some implementations, output engine 114 appends flags indicating whether the message classification was influenced by user input, a fallback condition, or a system override.

Network 102 generally represents a network or collection of networks (such as the Internet or a corporate intranet, or a combination of both) over which the various components illustrated in FIG. 1 communicate and interact, including user device(s) 155, ingestion system 104, anomaly detection system 105, training system 116, orchestration system 112, and output engine 114. In particular embodiments, network 102 is an intranet, an extranet, a virtual private network (VPN), a local area network (LAN), a wireless LAN (WLAN), a wide area network (WAN), a metropolitan area network (MAN), a portion of the Internet, or another network 102 or a combination of two or more such networks 102. One or more links connect the systems and services described herein to the network 102. In particular embodiments, one or more links each include one or more wired, wireless, or optical links.

The network 102 connects the various computing devices and systems referenced herein and facilitates the transfer of messages, scores, prompts, user responses, model updates, and control signals. In various embodiments, communication between components may occur over secure channels using authenticated protocols, allowing the system to maintain message integrity and state across distributed deployments.

One or more links couple systems, services, or user devices to network 102. These links may include cloud-based APIs, direct HTTPS connections, socket communication, or other interface protocols. In particular embodiments, the network links include an intranet, an extranet, a VPN, a LAN, a WLAN, a WAN, a MAN, a portion of the Internet, or any suitable combination of such links.

In particular embodiments, each system or engine may be implemented on a unitary server or may be distributed across multiple physical machines or virtual containers. Systems, engines, or modules may include application servers, message classifiers, scoring modules, prompt generation services, or output delivery engines. These may rely on hardware, software, or a combination of both, and may execute within a cloud environment or a private deployment.

In some implementations, one or more data storages may be communicatively linked to the systems described above via network 102. Data storage may be used to persist messages, model versions, user responses, telemetry, and system outputs, and may be structured as relational databases, document stores, or vector-based datastores depending on the implementation. Particular embodiments may provide interfaces that allow orchestration system 112 or training system 116 to access and modify information stored therein for purposes of execution coordination, analysis, or retraining.

The system may also include additional subsystems and databases not illustrated in FIG. 1 but readily understood by a person of ordinary skill in the art. For example, the system may include one or more databases for storing raw message data, extracted features, intermediate scoring results, user interaction logs, classification outcomes, and trained model artifacts. In certain embodiments, these data stores may include structured relational databases, unstructured document stores, or vector-based embeddings repositories used during runtime or training workflows. The agents referenced above-including media feature analysis system 106, user context refinement system 108, and response synthesis system 110—may be deployed on separate servers, executed asynchronously, or trained either independently or as part of a coordinated pipeline. Similarly, orchestration system 112 and training system 116 may operate as distributed services across cloud or edge infrastructure. Other databases, components, or orchestration services may be added or modified as needed to support specific deployment contexts, integration workflows, or regulatory constraints, all without departing from the scope of the present disclosure.

Figure 2:
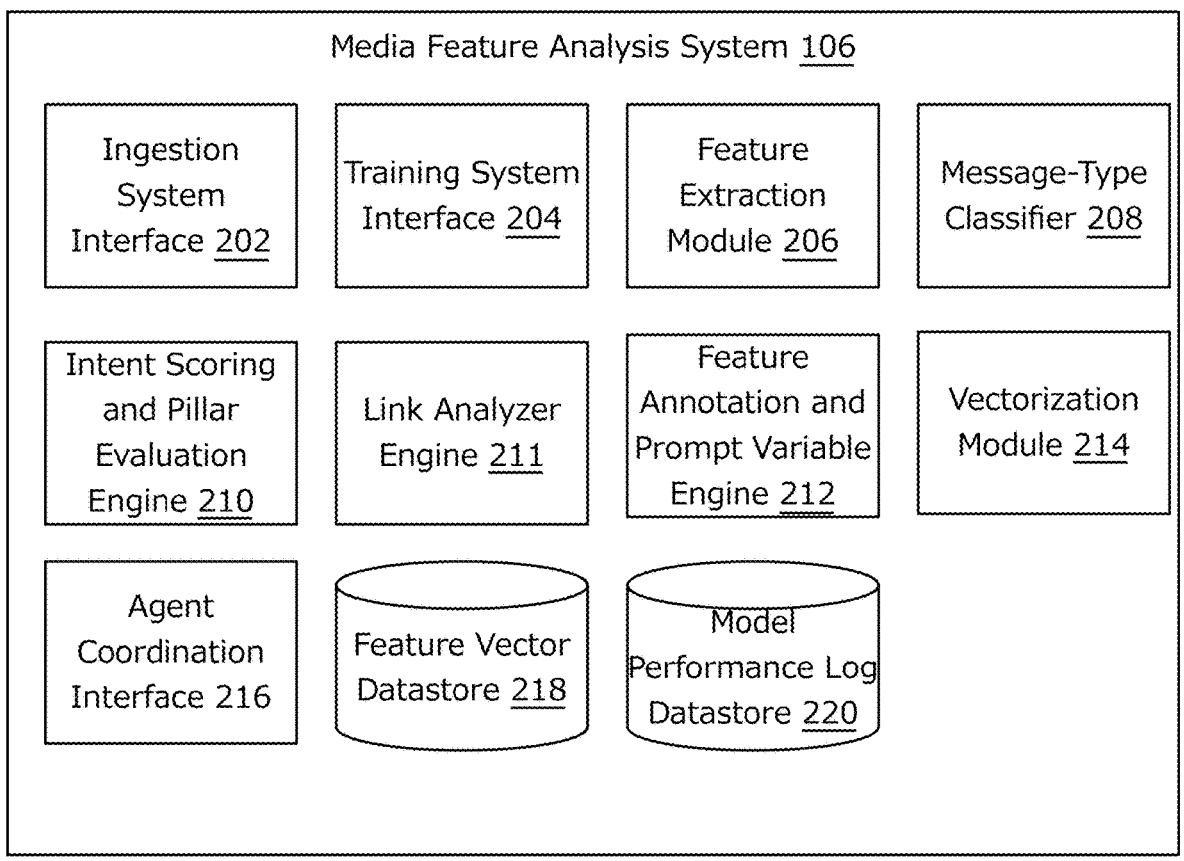
FIG. 2 illustrates components of the message analysis system in accordance with various embodiments.

FIG. 2 illustrates an example internal architecture of media feature analysis system 106, in accordance with various embodiments. As shown, media feature analysis system 106 includes ingestion system interface 202, training system interface 204, feature extraction module 206, message-type classifier 208, intent scoring and pillar evaluation engine 210, link analyzer engine 211, feature annotation and prompt variable engine 212, vectorization module 214, agent coordination interface 216, feature vector datastore 218, and model performance log datastore 220.

Ingestion system interface 202 is operable to receive message content and associated metadata from ingestion system 104, either directly or via orchestration system 112. In various embodiments, orchestration system 112 receives the initial communication input through an API endpoint, webhook listener, messaging queue, or client-side application relay, and may apply preliminary processing such as protocol validation, source classification, and timestamp normalization before passing the structured payload to ingestion system interface 202.

In one embodiment, the communication payload comprises a plaintext message body (e.g., SMS, email, chat, or transcribed audio), a message-type indicator, and contextual metadata such as a communication ID, timestamp, channel source, or prior classification label. For example, a mobile client may issue an HTTPS POST request to orchestration system 112 containing an SMS string and associated sender information. Orchestration system 112 may evaluate the message length, format encoding, or content source before routing the structured payload to ingestion system interface 202.

Ingestion system interface 202 is further operable to decode, standardize, and register the incoming message data for downstream analysis. For instance, if a message contains formatting artifacts (e.g., line breaks, URL encoding, non-printable characters), ingestion system interface 202 may apply character-level normalization and prepare the message for tokenization and vectorization. In certain embodiments, ingestion system interface 202 assigns a processing tag, origin source classification, or initial hash identifier used to prevent duplicate analysis across sessions.

Ingestion system interface 202 then provides the normalized message body and metadata to feature extraction module 206 and message-type classifier 208. These modules rely on the consistency and structure established by ingestion system interface 202 to execute their classification and scoring processes without ambiguity. Orchestration system 112 may continue to track the downstream progression of the message as it flows through the agent-based components of anomaly detection system 105.

Training system interface 204 is operable to receive, transmit, and coordinate model-related data exchanges between media feature analysis system 106 and training system 116. In various embodiments, training system interface 204 supports the bidirectional flow of feature embeddings, model checkpoints, updated scoring parameters, and retraining instructions. More specifically, training system interface 204 enables model synchronization between live inference pipelines and offline training routines, thereby facilitating continuous updates to classification models, feature detection heuristics, and signal weighting strategies based on historical interaction data.

More specifically, training system interface 204 may retrieve feature vector outputs, model activation logs, and performance metrics produced during media analysis operations and prepare these records for consumption by training system 116. In certain embodiments, training system interface 204 serializes this data into schema-conformant batches, associates each batch with message identifiers and timestamp metadata, and queues them to training system 116 for offline or asynchronous processing. Conversely, when training system 116 completes model retraining or generates updated classification weights, training system interface 204 receives those model artifacts, validates model integrity (e.g., via hash verification), and registers the updated models with the execution environment of media feature analysis system 106.

For example, after processing multiple messages involving suspicious media content, media feature analysis system 106 may emit a set of intermediate feature scores and label outcomes indicating model uncertainty across specific categories (e.g., obfuscated URLs, phishing intent, or financial baiting). Training system interface 204 aggregates this historical evidence and transmits the corresponding training samples-including weighted confidence outputs, ground truth labels (if available), and contextual metadata-back to training system 116. Upon receiving a retrained version of the feature-extraction model, training system interface 204 replaces the previous model version in the runtime cache and triggers warm-start validation routines to assess baseline scoring behavior under updated model conditions.

In certain embodiments, training system interface 204 supports model version tagging and rollback protocols, allowing media feature analysis system 106 to switch between model versions based on scenario-specific parameters or regression test results. In further embodiments, interface 204 allows for partial model updates, such as updated link-parsing weights or intent-detection layers, without replacing the full model stack. This modular update structure supports the distributed nature of anomaly detection system 105 and allows individual agents to evolve independently, while remaining compatible with shared orchestration logic defined by orchestration system 112.

As used herein, the term "model-related data exchanges" refers to structured data passed between components to enable model evaluation, retraining, and deployment, including inference outputs, model update notifications, or configuration metadata. The term "feature embeddings" refers to machine-learned vector representations derived from message content, metadata, or link structure, which may be used by training system 116 to refine classification boundaries. "Model checkpoints" refers to saved versions of machine learning models at specific training states, typically used for rollback or warm start. "Updated scoring parameters" include revised weights, thresholds, or coefficients that modify how incoming message features contribute to a classification outcome. "Retraining instructions" refers to structured directives issued by orchestration system 112 or training system 116 to indicate when and how training should be executed, potentially referencing performance drift, concept shift, or underperforming feature combinations.

Feature extraction module 206 is operable to evaluate incoming media inputs and generate structured representations of relevant risk indicators, semantic content, and signal-level attributes for use in downstream classification and scoring. In various embodiments, feature extraction module 206 receives ingested message data (e.g., image, video, link preview, or stylized message content) from ingestion system interface 202 and converts this content into structured formats such as vectorized embeddings, extracted attribute maps, or domain-specific feature arrays. Feature extraction module 206 forms the foundation for multiple processing paths within media feature analysis system 106 and establishes the input layer for multi-pillar classification models executed by subsequent modules.

More specifically, feature extraction module 206 applies preprocessing routines to isolate and normalize media elements contained within the message payload. For example, if a message includes a stylized image containing embedded text and QR codes, module 206 applies optical character recognition (OCR) and QR pattern decoders to extract the embedded information, which is then appended to the feature set. If the message includes a shortened or obfuscated URL, module 206 may resolve redirection chains, capture final destination metadata (e.g., domain age, registration anomalies), and embed these as structured risk features. The module is further operable to extract stylistic attributes such as font types, layout patterns, or visual distortions that may be indicative of manipulation or impersonation attempts.

In one embodiment, feature extraction module 206 supports multi-path feature pipelines, allowing text, image, and link-based elements to be processed using specialized routines or model adapters. For example, module 206 may use a dedicated visual model to parse iconography or badge-like imagery in promotional messages, while a separate transformer-based language model processes surrounding captions or disclaimers. These parallel paths are later fused into unified embedding representations to support coordinated scoring downstream.

For example, a suspicious message promoting a giveaway may include exaggerated imagery, emojis, and bold fonts alongside an external link. Feature extraction module 206 tokenizes the visual elements, extracts caption-level language cues, evaluates the destination domain using DNS-derived metrics, and emits a structured feature map that encodes these elements with positional and semantic annotations. These outputs are propagated to classification pillars (e.g., message-type classifier 208, intent scoring and pillar evaluation engine 210) for individual pillar-level evaluations.

In certain embodiments, feature extraction module 206 emits confidence scores or extraction fidelity metrics along with the features, allowing downstream components to weigh low-certainty signals differently during classification. The outputs of module 206 may also be annotated with source flags (e.g., "image-derived," "OCR-interpolated," "inferred URL"), which can affect how features are used during model evaluation and how results are interpreted during score synthesis.

Message-type classifier 208 is operable to apply a trained classification model to the structured feature outputs received from feature extraction module 206 to determine the type or category of message under analysis. In various embodiments, message-type classifier 208 distinguishes between known message archetypes—such as promotional offers, impersonation attempts, informational alerts, or user-to-user communications—by evaluating a curated set of text, link, and visual features derived from the incoming message. Message-type classifier 208 is one of several classification pillars executed within media feature analysis system 106 and contributes a type-specific score to the system's downstream combined scoring logic.

More specifically, message-type classifier 208 may apply a multi-label or softmax-based model to compute the probability that the message corresponds to a predefined set of types. These probabilities are generated based on features such as the use of urgency cues ("limited time"), layout conventions (e.g., centered logos, CTA buttons), or linguistic framing. For example, if the message contains language indicating a reset or account notification combined with a masked hyperlink, the classifier may assign elevated weights to the "impersonation" category.

In one embodiment, message-type classifier 208 outputs both (i) a predicted class label (e.g., "promotion"), and (ii) a set of associated confidence values for each possible label. These confidence scores are forwarded to orchestration system 112 and stored alongside outputs from other classifiers (e.g., intent scoring and pillar evaluation engine 210 and feature annotation and prompt variable engine 212). These outputs are labeled with metadata indicating model version, timestamp, and the feature set origin, which supports downstream interpretation and score tracing.

For example, message-type classifier 208 may determine that an image-based message with a QR code and prize language has a 0.76 confidence score for the "promotional scam" class, while also emitting a 0.12 score for the "unknown" class and 0.09 for "user communication." These values are not final determinations; rather, they represent a weighted input to a subsequent combined scoring process.

In certain embodiments, message-type classifier 208 may also generate intermediate representations (e.g., attention heatmaps, latent embeddings) that are retained for retraining purposes via training system interface 204. These representations may optionally be used to fine-tune classification thresholds or reweight inputs when orchestration system 112 detects a pattern shift in the incoming message stream.

Intent scoring and pillar evaluation engine 210 is operable to analyze message-level intent signals across multiple interpretive dimensions-referred to as "pillars"—and assign respective scores that contribute to the overall combined message classification. In various embodiments, intent scoring and pillar evaluation engine 210 receives outputs from feature extraction module 206 and message-type classifier 208, including tokenized content, link features, linguistic attributes, and metadata related to source or message context. The engine applies configurable evaluation routines to map these inputs to structured scoring vectors, with each dimension corresponding to a specific interpretive pillar.

More specifically, intent scoring and pillar evaluation engine 210 processes features aligned with one or more scoring axes, such as intent inference, urgency modeling, financial lure detection, social engineering signal strength, or manipulative language presence. In certain embodiments, each axis corresponds to a pillar model trained separately on labeled data. For example, a first pillar may model direct requests for sensitive information, while a second pillar detects emotionally manipulative phrasing. The engine evaluates the likelihood of each identified signal and produces a weighted output or confidence score for each pillar, formatted as a structured vector. The system calculates disagreement metrics between pillars by analyzing variance in prediction outcomes and confidence levels, wherein disagreement is identified when pillar predictions differ across classification outcomes. These disagreement metrics are computed using statistical measures including absolute differences between pillar scores, variance calculations across pillar confidence values, and uncertainty difference analysis to determine appropriate weighting adjustments for score combination.

In one implementation, the engine applies transformer-based language models for each pillar, with prompt templates structured to evaluate the target characteristic in isolation. For instance, a zero-shot prompt may query: "Does this message exhibit characteristics of urgency that are common in phishing attempts?" The model response may then be converted into a normalized confidence score on a scale (e.g., 0-1). This output is stored alongside a system-generated rationale, model output text, and metadata used during prompting (e.g., prior classification results, extracted link details, or source type). The transformer-based models may include bidirectional encoder architectures trained on labeled message intent datasets to detect manipulation patterns across multiple semantic dimensions.

In certain embodiments, intent scoring and pillar evaluation engine 210 maintains a configuration file or model blueprint that specifies which pillars to activate, how to weight their respective scores, and how to generate traceability metadata for downstream synthesis or debugging. For example, some deployments may use three pillars (intent, urgency, and links), while others may activate a broader set of interpretive dimensions depending on customer policy or regional threat models. The generated pillar scores are passed to orchestration system 112, where cross-pillar normalization and aggregation are performed to generate a combined score. As used herein, "pillar" refers to a structured axis of interpretive evaluation used to decompose message classification into independent scoring tasks. Pillars may correspond to intent inference, link inspection, language framing, contextual deviation, or other domain-specific risk signatures. The engine operates in coordination with model management processes in training system 116 to retrieve pillar-specific model weights, update scoring logic, or apply retraining updates as described further with respect to FIGS. 6-8.

Link analyzer engine 211 is operable to evaluate link-based attributes present within a received message and generate structured indicators reflecting potential risk, deception, or manipulation. In various embodiments, link analyzer engine 211 receives extracted URLs, link previews, redirect metadata, or embedded hyperlink references from feature extraction module 206 and applies link-specific evaluation logic that complements other classification pillars described herein. Link analyzer engine 211 functions as a dedicated component for structured URL analysis and risk assessment, supporting system-wide scoring workflows. As described above, link analyzer engine 211 forms one of multiple classification or interpretive pillars feeding into the system's combined risk evaluation process, and may be used independently or in conjunction with message-type classifier 208 and intent scoring and pillar evaluation engine 210.

Link analyzer engine 211 implements a dual analysis approach that combines mathematical feature extraction with transformer-based semantic analysis to achieve comprehensive URL threat detection. This dual approach addresses the limitations of single-methodology URL analysis, where mathematical features alone may miss sophisticated semantic deceptions, and semantic analysis alone may overlook technical manipulation patterns. By integrating both analytical methods through ensemble scoring, link analyzer engine 211 achieves superior detection accuracy for both known and novel URL-based threats.

The mathematical analysis component of link analyzer engine 211 extracts and evaluates multiple quantitative features from each URL. These features include brand impersonation scores calculated through string similarity metrics against known legitimate domains, structural anomaly scores that identify unusual URL constructions or encoding patterns, path entropy metrics that measure the randomness or complexity of URL paths, and domain age verification through WHOIS lookups or domain reputation databases. Additional mathematical features may include redirect chain analysis, subdomain depth calculations, TLD risk scoring, and statistical analysis of character distributions within the URL structure.

The semantic analysis component employs transformer-based models, specifically fine-tuned BERT (Bidirectional Encoder Representations from Transformers) architectures, trained on large corpora of labeled benign and malicious URLs. These models process URLs as text sequences, learning complex patterns of deception that may not be captured by mathematical features alone. The transformer models excel at identifying semantic tricks such as homograph attacks, brand spoofing through creative misspellings, social engineering patterns embedded in URL paths, and contextual relationships between URL components that suggest malicious intent.

Link analyzer engine 211 combines the outputs of mathematical and semantic analysis through an ensemble scoring mechanism that utilizes learned uncertainty points. The ensemble approach implements a two-stage combination process. In the first stage, mathematical features are combined using gradient-boosted decision trees or similar ensemble methods to produce an initial mathematical risk score. In the second stage, this mathematical score is refined based on the transformer model's semantic assessment, with the degree of refinement determined by the relative uncertainty of each analysis method. When mathematical analysis produces high-confidence results (scores far from uncertainty points), semantic analysis has limited influence. Conversely, when mathematical analysis yields uncertain results (scores near uncertainty points), semantic analysis plays a larger role in determining the final URL risk score.

The dual analysis approach enables link analyzer engine 211 to detect sophisticated URL threats that evade single-method detection. For example, a URL that appears mathematically legitimate (proper domain age, normal structure, no redirects) but contains semantic deception patterns (brand impersonation through clever wordplay) would be flagged by the semantic analysis. Similarly, a URL with suspicious mathematical properties (very recent registration, unusual entropy) but seemingly legitimate semantic content would be identified through mathematical analysis. This complementary detection capability significantly reduces both false positives and false negatives in URL threat assessment.

More specifically, link analyzer engine 211 applies structured resolution routines to process and decode shortened URLs, resolve multi-stage redirection paths, extract final destination domains, and normalize embedded metadata. In certain embodiments, the engine queries an internal or external reputation database to assess the trustworthiness of a resolved domain or IP address, using features such as DNS age, WHOIS records, SSL certificate anomalies, or inclusion on curated threat lists. Where appropriate, heuristics or trained classifiers may be used to evaluate lexical patterns in the domain (e.g., homoglyph substitutions, extra tokens), contextual mismatches between displayed anchor text and true destination, or domain impersonation risks. Each evaluated link may be assigned a risk score or probabilistic confidence measure based on these features.

The system implements asymmetric influence algorithms wherein link risk score influence varies based on threat scenario combinations. For discordant scenarios where link analysis indicates high risk while content analysis indicates low risk (RED FLAG detection), the system applies substantially higher influence weight (approximately 40%). For concordant high-risk scenarios, moderate influence weight (approximately 20%) is applied. For scenarios where link analysis indicates low risk, minimal influence weight (approximately 10%) is applied, utilizing non-linear transformation functions that provide smooth, bounded influence transitions.

For example, link analyzer engine 211 may receive a masked hyperlink labeled "Reset Account" that points to http://security-login-verify.com. Upon redirection resolution, the engine determines the domain is newly registered, contains a suspicious token structure, and does not match known sender domains. Based on trained evaluation logic and URL heuristics, the engine emits a link risk vector including a high-risk label (e.g., "deceptive redirect"), a numerical confidence score (e.g., 0.88), and metadata for use in downstream synthesis. In one embodiment, the engine also logs prior link occurrences and maintains a link cache to detect repeated uses of known malicious endpoints.

In certain embodiments, link analyzer engine 211 includes submodules for domain risk profiling, redirect depth analysis, and visual preview comparison. For example, the system may compare the link preview image or summary text with extracted text from the message body to detect contextual inconsistencies. If a message includes a promotional image that implies a specific brand, but the hyperlink redirects to a domain without affiliation, the engine flags this inconsistency for elevated downstream weighting. Outputs of link analyzer engine 211 may also include annotations indicating resolution status (e.g., "resolved to base domain"), anchor mismatch indicators, and obfuscation flags.

The outputs from link analyzer engine 211 are transmitted to orchestration system 112 along with outputs from message-type classifier 208 and intent scoring and pillar evaluation engine 210. These link-based confidence vectors and annotations are tagged with model identifiers, inference timestamps, and input feature references to support downstream score synthesis, metadata tracing, and training system interface 204 integration. In certain embodiments, link analyzer engine 211 supports feedback loops with training system 116 to periodically update classification thresholds, domain blocklists, or URL-specific scoring logic.

In various embodiments, orchestration system 112 implements an asymmetric influence algorithm for integrating link-based risk assessments with content-based analyses. This asymmetric influence algorithm addresses sophisticated attack patterns wherein malicious actors embed harmful URLs within otherwise benign-appearing content, or conversely, where legitimate URLs appear within suspicious content patterns. The system dynamically adjusts the influence weight of link analyzer engine 211 outputs based on the concordance or discordance between URL-based risk scores and content-based risk scores.

More specifically, when link analyzer engine 211 generates a high risk score (indicating suspicious URL characteristics) while the combined outputs of message-type classifier 208 and intent scoring and pillar evaluation engine 210 indicate low risk (suggesting benign content), the system applies a substantially higher influence weight to the URL-based assessment. This discordant scenario, referred to herein as a "RED FLAG" condition, receives maximum influence weighting because it represents a sophisticated attack pattern where malicious URLs are masked by legitimate-appearing content. The elevated influence ensures that dangerous URLs are not overlooked due to benign content characteristics.

Conversely, when both link analysis and content analysis indicate high risk (concordant high-risk scenario), the system applies a moderate influence weight to the URL assessment. This moderate weighting reflects that the URL analysis serves as confirmation of the threat already identified by content analysis, rather than as the primary threat indicator. When link analyzer engine 211 indicates low risk, the system applies minimal influence weight regardless of content assessment, preventing false positives from overly aggressive URL influence in legitimate communications.

The asymmetric influence algorithm utilizes non-linear transformation functions to calculate influence magnitude based on the distance between URL-based scores and content-based scores. These transformation functions provide smooth, bounded transitions between influence levels, avoiding abrupt threshold effects that could create classification instabilities. The influence magnitude is further modulated by confidence values from each analysis component, ensuring that low-confidence assessments have proportionally reduced impact on final classifications.

In one implementation, the orchestration system 112 calculates influence weights using learned parameters derived from training system 116 analysis of historical threat patterns. These learned parameters replace static thresholds with dynamically optimized values that adapt to evolving threat landscapes and improve classification accuracy over time. The asymmetric influence algorithm enables the anomaly detection system 105 to detect sophisticated multi-vector attacks while maintaining low false positive rates for legitimate communications containing URLs.

Feature annotation and prompt variable engine 212 is operable to transform raw and derived message features into structured annotations and variable sets suitable for injection into downstream prompts. In various embodiments, feature annotation and prompt variable engine 212 receives pillar scores, classifier outputs, and metadata generated by upstream modules (e.g., feature extraction module 206 and intent scoring and pillar evaluation engine 210), and translates these into structured prompt-ready artifacts used for contextual grounding and model-controlled evaluation.

More specifically, feature annotation and prompt variable engine 212 applies configurable mapping logic to identify which features are eligible to serve as prompt variables based on their interpretability, contribution strength, or classification relevance. For instance, if the intent score for "urgency" exceeds a threshold, feature annotation and prompt variable engine 212 may annotate the message with an urgency_flag=true variable. Additionally, the engine tags segments of the message with inline annotations (e.g., [REQUEST_EMAIL], [LINK_PRESENT], [TRIGGER_PHRASE]) that can be used in prompt templates to guide downstream large language model (LLM) behavior. These annotations are not exposed to the user directly but serve as control signals for question generation or synthesis.

In one implementation, feature annotation and prompt variable engine 212 selects a subset of features based on saliency metrics, which may include attention weights from the classifier models, gradient-based attribution methods, or model explanation vectors. For example, when a message includes multiple URLs, feature annotation and prompt variable engine 212 may rank these based on domain reputation scores or link entropy and inject only the highest-ranked URL into a link_context variable. This selective injection ensures that downstream models receive meaningful context without prompt overloading.

In certain embodiments, feature annotation and prompt variable engine 212 also retrieves prompt configuration metadata from orchestration system 112 or training system 116, including schema definitions, field aliases, fallback defaults, or variable priority levels. This allows feature annotation and prompt variable engine 212 to reconcile message-specific features with dynamic prompt structures. For example, if one or more variables are missing (e.g., due to ambiguous extraction), the engine applies schema-conformant substitution rules or omits the variable entirely from the constructed prompt.

Feature annotation and prompt variable engine 212 outputs a structured variable set that may include binary flags, scalar scores, and tagged text spans. These outputs are stored in a message feature record and passed to user context refinement system 108, where they are used to generate dynamic prompts for user interaction. As used herein, the term "prompt variable" refers to a key-value or structured tag used to modulate the behavior of downstream question-generation or inference routines. Prompt variables may be derived directly from extracted features, classifier outputs, or system metadata, and may be dynamically selected based on model configuration, message characteristics, or session state.

Vectorization module 214 is operable to convert annotated message features, classifier outputs, and structured prompt variables into vector embeddings that preserve semantic, structural, and categorical information for downstream scoring and model-based evaluation. In various embodiments, vectorization module 214 receives the structured outputs from feature annotation and prompt variable engine 212 and transforms them into a high-dimensional embedding space aligned with the embedding configurations used during model training and classification inference.

More specifically, vectorization module 214 applies a multi-channel encoding architecture, wherein different categories of inputs (e.g., binary flags, scalar scores, token sequences) are encoded through distinct sub-encoders. For example, binary features such as link_present or suspicious_sender may be one-hot encoded and projected into a dense space using a linear transformation layer, while textual features such as subject line or message snippet are tokenized using a domain-specific tokenizer and passed through a sentence-level embedding model (e.g., Sentence-BERT or a fine-tuned Transformer). The resulting embeddings are concatenated or pooled to produce a unified vector representation that reflects both the content and meta-context of the message.

In one implementation, vectorization module 214 performs vector-based transformations including logit-space operations for normalized scalar values—such as risk score confidence or intent pillar strength—to improve their separability within the embedding space. For instance, if the extracted URL entropy has a normalized value of 0.85, the system may apply a logit transformation to amplify variance across the upper range of values and avoid compressive effects in regions of high confidence. These transformed features may then be aligned with similarly structured training examples maintained by training system 116 to support vector-based comparisons.

As used herein, "vector-based transformations" refer to mathematical operations applied to multi-dimensional numeric representations wherein user responses are converted into structured response vectors through natural language processing, then transformed in a mathematical space suitable for probability manipulation. These transformations include logit-space adjustments that apply inverse sigmoid functions to normalized confidence scores, embedding realignment using linear projections to maintain semantic relationships, and vector normalization to ensure consistent mathematical bounds across processing stages.

In certain embodiments, vectorization module 214 supports bi-directional embedding alignment. This allows the system to project current message vectors into the embedding space used during training, while also aligning output embeddings from downstream agent interactions back into the message representation for feedback refinement. For example, when a user submits a response to a clarifying question, the embedded representation of that answer may be used to update or reweigh the original message vector through embedding delta computation or similarity-based interpolation.

As used herein, "vector embedding" refers to a structured, multi-dimensional numeric representation of a message, feature set, or user input, encoded such that semantically or functionally similar elements occupy proximal regions in the vector space. These embeddings enable fast distance-based comparisons, model conditioning, and compatibility assessments throughout the anomaly detection system 105.

In particular embodiments, the vector embedding alignment process implements similarity-preserving projections and embedding realignment to maintain semantic relationships when updated embeddings are integrated back into the message representation. Vectorization module 214 performs vector normalization prior to score modification to ensure downstream modules operate within consistent vector bounds, preventing embedding drift that could degrade model performance. The system employs embedding delta computation and similarity-based interpolation techniques to update original message vectors while preserving the geometric structure of the embedding space. When user responses modify classification vectors, the updated embeddings are projected back into the original training space using principal component analysis or learned linear transformations to maintain compatibility with existing model inference pipelines. This ensures that user-driven score modifications through logit-space transformations do not introduce vector artifacts that would compromise the reliability of subsequent classifications processed by media feature analysis system 106.

Agent coordination interface 216 is operable to facilitate message-level coordination between media feature analysis system 106 and other agent components of anomaly detection system 105. In various embodiments, agent coordination interface 216 manages the routing, versioning, and conditional forwarding of vectorized representations, derived risk signals, and associated metadata to user context refinement system 108 and response synthesis system 110 for further processing. Agent coordination interface 216 may also manage return flows of response-adjusted scores or message state updates, ensuring consistency across the distributed agent architecture.

More specifically, agent coordination interface 216 tracks the execution state of each agent and applies coordination logic governed by orchestration system 112. This includes assigning agent-specific tasks based on message type, current confidence levels, and whether further refinement is warranted. For example, if vectorization module 214 outputs a message vector indicating a medium-risk phishing likelihood with low pillar consensus, agent coordination interface 216 may forward the message to user context refinement system 108 for additional interaction-based scoring. Conversely, if initial scores exceed a defined confidence threshold, the system may bypass further questioning and submit the synthesized output directly to response synthesis system 110 for classification.

In one implementation, agent coordination interface 216 supports conditional triggers that enable parallel or asynchronous engagement of downstream agents. For instance, upon completion of intent scoring and pillar evaluation engine 210, the interface may simultaneously pass refined outputs to both prompt generation components of user context refinement system 108 and summary evaluators within response synthesis system 110, allowing score refinement and synthesis to proceed in tandem. Completion hooks, model signals, or orchestration flags may then determine which outputs are committed or discarded based on response latency, score change significance, or agent consensus.

In certain embodiments, agent coordination interface 216 includes logic for passing and versioning embedded message representations. This may include attaching version hashes, embedding tags, or prompt lineage IDs to preserve traceability across interactions and prevent stale state propagation. For example, if a user responds to a first-generation prompt and that response materially shifts the combined risk score, the system can retire older prompt states and rebase subsequent refinement steps on the updated embedding context. This enables consistent multi-step reasoning across the agents.

As used herein, "agent coordination" refers to the machine-executed management of message scoring workflows across modular agents (e.g., Sentinel, Scout, and Sage), including the triggering of downstream processing, the synchronization of intermediate states, and the handling of message-level metadata or control signals. Coordination logic may be rule-based, model-informed, or both, and may include explicit fallback pathways or threshold-based routing adjustments driven by orchestration system 112.

Feature vector datastore 218 is operable to store, retrieve, and manage vectorized message representations and associated metadata generated by vectorization module 214 and other components of media feature analysis system 106. In various embodiments, feature vector datastore 218 serves as a centralized or distributed repository for embedding vectors that encapsulate risk-relevant features, classification inputs, pillar-specific attributes, and prior message outcomes. These vector records may be consumed by downstream agents-including user context refinement system 108 and response synthesis system 110—as part of the bidirectional processing and refinement loop governed by orchestration system 112.

More specifically, feature vector datastore 218 may maintain distinct namespaces or index partitions for raw message vectors, intermediate embeddings, post-response adjusted vectors, and aggregated or weighted scores derived from multi-agent consensus. Each record may be annotated with version tags, feature lineage identifiers, message UUIDs, model checkpoint references, and context flags (e.g., "prompted," "revised," "synthesized") to support traceability and replayability. In one implementation, vector entries include the original input vector, per-pillar confidence scores, intent classification probabilities, URL model features, and any prompt-variable modifications captured during interaction with user device(s) 155. In certain embodiments, the feature vector datastore 218 also stores output vectors and link-specific metadata generated by link analyzer engine 211, including domain reputation embeddings, redirect chain scores, and confidence values derived from URL feature evaluations.

Feature vector datastore 218 may be queried by training system 116 for model retraining operations, drift analysis, and reinforcement learning updates. For example, the system may extract high-disagreement vectors (e.g., messages with conflicting outputs across agents) to construct retraining datasets focused on underperforming classification boundaries. In certain embodiments, orchestration system 112 may access feature vector datastore 218 to identify message clusters with similar structural or semantic attributes for routing optimization or to suppress redundant prompts during multi-message evaluations.

In some implementations, feature vector datastore 218 includes append-only write logs to preserve the temporal evolution of message processing. These logs can capture the initial feature set extracted by feature extraction module 206, the transformed vector produced by vectorization module 214, and the final vector-state used for output generation by response synthesis system 110. This provides a consistent audit trail and enables system rehydration or simulation runs for testing scoring logic under modified thresholds or coordination paths.

As used herein, the term "feature vector" refers to an n-dimensional numeric or symbolic representation of extracted message attributes, including but not limited to token embeddings, pillar-aligned scores, model output probabilities, and prompt-variable modifiers. These vectors may be derived from proprietary, pretrained, or fine-tuned models and may be structured to reflect temporal, semantic, or categorical dependencies for downstream compatibility and interpretability.

Model performance log datastore 220 is operable to record, archive, and retrieve historical performance metrics, operational telemetry, and scoring consistency data associated with one or more machine learning models or modular agents used within media feature analysis system 106. In various embodiments, model performance log datastore 220 maintains longitudinal data capturing input-output mappings, per-agent score variance, classification drift, decision boundary instability, and response latency trends. This datastore supports both operational transparency and adaptive refinement strategies executed by training system 116.

More specifically, model performance log datastore 220 may store timestamped entries linked to individual message UUIDs, including ground truth annotations (when available), predicted classifications, per-pillar scores, and agent-specific confidence values. For example, when a message is processed and outputs are generated by media feature analysis system 106, user context refinement system 108, and response synthesis system 110, their respective predictions and scoring justifications may be logged alongside the ultimate outcome (e.g., confirmed scam, no action taken, false positive). These logs enable follow-up audits, comparative evaluations, and dataset curation for retraining purposes.

In one implementation, model performance log datastore 220 supports structured metadata fields such as agent version identifiers, model checkpoint hashes, schema versioning of vector outputs, and prompt-variable deltas. By capturing model-prompt-output relationships over time, the system can identify conditions under which specific agent responses become unreliable, exhibit instability, or diverge from historical norms. This enables temporal performance slicing and the identification of failure modes (e.g., prompt sensitivity, input class imbalance) that may not be immediately observable in aggregate metrics.

In certain embodiments, orchestration system 112 interacts with model performance log datastore 220 to evaluate agent consistency across similar inputs or repeated queries. For instance, if two messages yield divergent scores despite overlapping features and classification signals, the orchestration logic may flag the underlying models for retraining prioritization or weight adjustment. Similarly, training system 116 may generate longitudinal plots of scoring precision, recall, or calibration error by agent role, helping guide the selection of new training data, hyperparameter schedules, or architectural refinements.

As used herein, "model performance logs" refer to structured, time-indexed data records capturing the operational behavior of trained models, agents, or scoring systems during live message evaluation. These logs may include raw prediction values, classification decisions, model confidence scores, input feature summaries, prompt formulations, and agent-specific output rationales. Model performance logs facilitate interpretability, reproducibility, and fault-tolerant adaptation in distributed message scoring systems.

Figure 3:
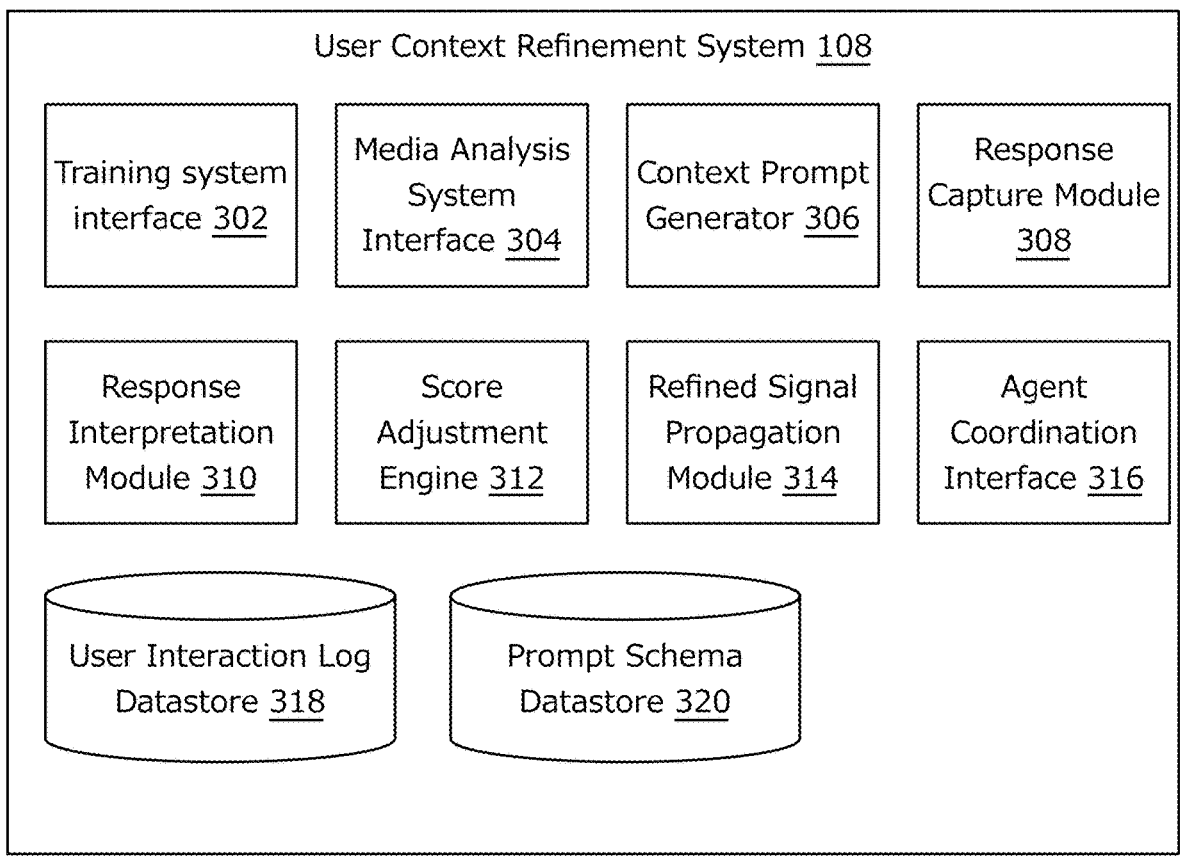
FIG. 3 illustrates components of the user interaction system in accordance with various embodiments.

FIG. 3 illustrates an example architecture of user context refinement system 108, in accordance with various embodiments. As shown, user context refinement system 108 includes training system interface 302, media analysis system interface 304, context prompt generator 306, response capture module 308, response interpretation module 310, score adjustment engine 312, refined signal propagation module 314, agent coordination interface 316, user interaction log datastore 318, and prompt schema datastore 320.

Training system interface 302 is operable to manage communication, e.g., between user context refinement system 108 and training system 116. In various embodiments, training system interface 302 facilitates retrieval of prompt construction templates, refinement rules, variable weightings, and historical engagement data to guide interaction strategies. Training system interface 302 may also transmit session-specific metadata and annotated message records back to training system 116 for incorporation into model feedback loops or reinforcement learning pipelines. These bidirectional data flows enable the refinement system to remain aligned with current training priorities and adaptive scoring objectives across user-facing interactions.

More specifically, training system interface 302 may receive schema definitions for question generation, including prompt templates aligned to message category, threat archetype, or signal ambiguity level. For example, when a message contains borderline signals for impersonation and urgency, training system interface 302 may retrieve a clarification prompt schema designed to distinguish intent without priming the user. Additionally, the interface may access variable injection configurations specifying how annotated features (e.g., [LINK_PRESENT], urgency_flag=true) are to be integrated into dynamic questions. In certain implementations, training system interface 302 retrieves interaction fallback logic, specifying what questions to use when certain user inputs are unavailable or ambiguous.

In one embodiment, training system interface 302 transmits completed interaction records—containing user responses, response latency, vectorized inputs, and post-refinement scoring updates—back to training system 116. These records are tagged with metadata such as message UUID, prompt lineage ID, and model checkpoint reference to ensure alignment with stored vectors in feature vector datastore 218. For example, if a user provides additional context in response to a clarifying prompt, training system interface 302 ensures the delta between pre- and post-refinement scores is recorded for use in future retraining iterations or prompt strategy updates.

As used herein, the term "training system interface" refers to a communication and orchestration layer that supports dynamic model-guided question formulation, structured prompt variable injection, and telemetry feedback exchange between the interactive agent and the underlying model training infrastructure. These interactions may occur in batch or real-time mode and may be used to propagate configuration updates or contextual state representations during ongoing refinement sessions.

Media analysis system interface 304 is operable to receive structured message data, derived feature annotations, and vectorized representations from media feature analysis system 106 for use in prompt construction and user interaction workflows executed by user context refinement system 108. In various embodiments, media analysis system interface 304 coordinates the ingestion of multi-source input signals—such as feature maps, classifier outputs, and pillar scores—and reformats them into intermediate records suitable for downstream selection, template filling, and question generation processes.

More specifically, media analysis system interface 304 standardizes the inputs received from media feature analysis system 106 by validating schema compliance, resolving field aliases, and attaching lineage metadata for traceability. For example, when feature extraction module 206 outputs structured flags (e.g., link_present, domain_reputation_score), media analysis system interface 304 maps these into normalized prompt variables or confidence indicators that align with prompt construction conventions used by feature annotation and prompt variable engine 212. In certain embodiments, the interface resolves conflicting or overlapping features (e.g., duplicate flags from OCR and visual analysis pipelines) based on confidence scores or priority tiers supplied by orchestration system 112.

In one implementation, media analysis system interface 304 also receives intermediate embeddings or attention maps from message-type classifier 208 or intent scoring and pillar evaluation engine 210, which are optionally used to guide saliency-based prompt construction. For example, if model attribution maps identify specific tokens or visual regions as highly influential in score determination, media analysis system interface 304 may direct user prompts toward those high-salience inputs. These refined features are then eligible for prompt injection or user-facing clarification, ensuring that user context refinement system 108 operates on the most informative subset of the original signal.

As used herein, the term "media analysis system interface" refers to a structured conduit for integrating the outputs of upstream feature extraction and classification pipelines with interactive refinement workflows. It ensures type-safe, schema-conformant, and traceable data exchange between media feature analysis system 106 and user context refinement system 108, while preserving contextual fidelity across distributed agent workflows.

Context prompt generator 306 is operable to construct structured prompt templates using message-specific features, classifier outputs, and session metadata to generate contextually grounded queries for downstream interaction. In various embodiments, context prompt generator 306 receives inputs from media analysis system interface 304 and training system interface 302, including annotated feature sets, vectorized message embeddings, and prompt configuration schemas.

More specifically, context prompt generator 306 constructs prompt scaffolds by combining predefined template fragments with dynamically selected content variables. For example, a base prompt structure such as "The following message may contain suspicious content. Does the language suggest an attempt to . . . " may be completed with variable inserts like urgency_flag, impersonation_indicator, or top_risk_feature extracted from prior scoring steps. These templates may be tailored per message type or system confidence level, enabling differentiation between exploratory clarification prompts and confirmation-based follow-ups.

In one implementation, context prompt generator 306 applies prompt assembly logic based on priority weighting, saliency ranking, or feedback recency. For example, when orchestration system 112 flags a message for further clarification based on low pillar consensus, context prompt generator 306 may elevate prompt variables tied to the most uncertain or contradictory features, and suppress less relevant ones. The generator may also retrieve configuration metadata from training system 116 to adjust language, tone, or prompt framing based on the target deployment environment (e.g., formal vs. conversational phrasing).

In certain embodiments, context prompt generator 306 supports dynamic fallback behavior when required variables are missing or ambiguous. If, for example, the domain reputation score cannot be computed due to URL obfuscation, the generator substitutes with a template that omits domain-specific language or includes a clarifying clause. These fallback strategies ensure robustness and reduce prompt failure across edge-case inputs.

As used herein, "context prompt generator" refers to the component responsible for building structured natural language queries using semantically relevant, message-specific variables and template configurations. It bridges the output of static feature extraction with dynamic user interaction by translating low-level attributes into interpretable prompts used to elicit human input or trigger model-based refinement.

Response capture module 308 is operable to receive, timestamp, and store user-generated responses to the prompts constructed by context prompt generator 306. In various embodiments, response capture module 308 interfaces with user device(s) 155 to collect free-text, multiple-choice, voice transcription, or structured responses, and forwards these to user context refinement system 108 for interpretation and scoring refinement.

More specifically, response capture module 308 supports multi-modal inputs and applies normalization routines to ensure compatibility with downstream vectorization and scoring processes. For example, a user response such as "Yes, it looks suspicious" may be converted into a tokenized sequence or mapped to a binary interpretation (e.g., suspicious=1) depending on the configured prompt type. In some cases, the module may also extract sentiment cues, negation markers, or phrase-level emphasis to preserve the intent of the user response beyond its literal content.

In one implementation, response capture module 308 includes timing logic to associate each response with the corresponding prompt version, session state, and vector embedding at the time of questioning. This ensures that asynchronous or delayed responses are properly reconciled with the correct message state and prompt lineage. For example, if a user answers a second prompt after scoring thresholds have shifted, the system may flag the response for recontextualization or mark it as stale.

In certain embodiments, response capture module 308 also supports metadata tagging to indicate source modality (e.g., typed, spoken, system-suggested), user confidence levels (e.g., from sliders or optional ratings), and fallback indicators (e.g., "I don't know" responses). These metadata fields are passed to answer vectorizer 314 and stored in association with the original message and prompt variables in feature vector datastore 218.

As used herein, "response capture" refers to the machine-executed process of collecting, encoding, and contextualizing user-provided input for use in message scoring refinement. The module ensures that user interactions are synchronized with message state, formatted for analysis, and stored in a traceable structure for auditability and feedback propagation.

Response interpretation module 310 is operable to analyze, normalize, and extract structured meaning from user responses collected by response capture module 308, enabling downstream refinement of message classification scores. In various embodiments, response interpretation module 310 receives tokenized or structured responses and applies language processing routines, mapping logic, and scoring directives to align the user input with one or more classification dimensions used in media feature analysis system 106.

More specifically, response interpretation module 310 includes a configurable processing pipeline that can apply natural language parsing, pattern matching, keyword mapping, or semantic embedding comparison to derive interpretable attributes from the user's answer. For example, a free-text response such as "Looks like a scam because of the fake logo" may be parsed to identify the user's confidence, rationale (e.g., logo), and the risk signal being referenced (e.g., impersonation). The parsed response can then be mapped to a structured confidence score, classification tag, or refinement directive.

In one implementation, response interpretation module 310 uses a lightweight classification model or embedding similarity check to translate natural language responses into one or more scalar values or flags that adjust the underlying pillar scores or message classification. For instance, if the original risk score for impersonation was 0.65 and the user indicates strong suspicion, the response interpretation module 310 may adjust the impersonation pillar weight to 0.82, depending on the refinement rules in place. The module logs the adjustment rationale, magnitude, and source input for traceability and subsequent training system 116 access.

In certain embodiments, response interpretation module 310 includes fallback logic to handle ambiguous, irrelevant, or contradictory responses. For example, if a user provides an off-topic or uncertain reply, the system may assign a null adjustment weight, flag the message for secondary prompting, or generate a refinement status of "inconclusive." Additionally, the module may tag responses with quality scores, estimated user intent, or semantic disambiguation labels that inform orchestration system 112 on whether further questioning is required.

As used herein, "response interpretation" refers to the automated process of extracting actionable signals, confidence adjustments, and semantic meaning from user inputs in a format compatible with downstream scoring logic. The module enables bidirectional feedback loops between user interactions and model-based evaluation while preserving interpretability and traceability for performance auditing and retraining.

Score adjustment engine 312 is operable to update, reweigh, or refine message-level classification scores based on interpreted user responses received from response interpretation module 310. In various embodiments, score adjustment engine 312 applies structured adjustment logic to one or more scoring dimensions—such as risk probability, pillar weightings, or model confidence intervals—according to a predefined adjustment schema or dynamic coordination strategy governed by orchestration system 112.

More specifically, score adjustment engine 312 receives input data including: (i) current message classification scores (e.g., per-pillar confidence values from media feature analysis system 106), (ii) interpreted user feedback (e.g., confidence indication, supporting rationale, or disambiguated signal vector), and (iii) system configuration parameters specifying adjustment thresholds, blending rules, or override conditions. Using this data, score adjustment engine 312 applies transformation functions to produce updated scores, which may be propagated back into the message vector maintained by feature vector datastore 218.

For example, if the original phishing score is 0.58 and the interpreted user response includes a high-confidence flag for urgency and link manipulation, score adjustment engine 312 may apply a +0.2 boost to the phishing score based on a reinforcement configuration. Conversely, if the user indicates the message is known and safe, the system may apply a negative offset or a class label override (e.g., "user-validated-safe") depending on policy. Adjustment magnitude and rationale are logged for traceability and may be stored in model performance log datastore 220 for future analysis or retraining.

In one implementation, score adjustment engine 312 supports additive, multiplicative, or interpolation-based score updates. This allows flexible adaptation based on how confident or structured the feedback is. For example, binary flags from form-based responses may trigger direct multiplier adjustments, while natural language responses may apply soft interpolation between original and target scores using cosine similarity or delta weighting. All updated scores are tagged with metadata including version lineage, adjustment source, and adjustment rationale ID.

In certain embodiments, score adjustment engine 312 interfaces with orchestration system 112 to determine whether the updated scores warrant early finalization, further questioning, or escalation. For example, if the adjusted phishing likelihood exceeds a defined threshold (e.g., 0.90), orchestration system 112 may skip further processing and direct the message to output engine 114. Alternatively, if the confidence remains ambiguous (e.g., multiple pillar scores in mid-range), the system may re-engage user context refinement system 108 with a targeted follow-up prompt.

As used herein, "score adjustment" refers to the machine-executed modification of model-generated message classification values based on structured or semi-structured user feedback. These adjustments may be deterministic, probabilistic, or learned, and may involve single-dimension or multi-pillar updates depending on the model configuration, feature saliency, and response interpretation fidelity.

Refined signal propagation module 314 is operable to transmit adjusted classification signals, embedding updates, and user-derived modifications to downstream agents and shared system components for final output synthesis, storage, or further coordination. In various embodiments, refined signal propagation module 314 receives the updated message classification scores, refined embeddings, and context flags generated by score adjustment engine 312 and ensures these values are integrated into the broader anomaly detection and scoring pipeline.

More specifically, refined signal propagation module 314 prepares and dispatches updated outputs to response synthesis system 110, feature vector datastore 218, and orchestration system 112. These outputs may include: (i) reweighted score vectors with associated adjustment metadata, (ii) modified message embeddings reflecting vector deltas or interpolation results, and (iii) updated classification tags, pillar rationales, or user-derived modifiers used to annotate the final message state. The module may apply transformation logic to serialize or package these outputs in formats compatible with the receiving modules' expectations.

For example, after a user clarifies that a message is a known promotion from a trusted source, refined signal propagation module 314 may propagate a confidence-adjusted class label (e.g., "non-risk-promotional"), a corresponding vector update reflecting reduced phishing or impersonation scores, and a user-validation flag. These values are sent to response synthesis system 110 to inform final output decisions, and to feature vector datastore 218 to archive the full message trajectory for traceability and retraining.

In one implementation, refined signal propagation module 314 includes logic for partial or conditional propagation. If only one classification pillar was adjusted (e.g., "urgency"), the module may isolate propagation to the affected dimensions or flag that only a partial re-evaluation is required by response synthesis system 110. This conserves computational resources and preserves the integrity of non-adjusted classification outputs.

In certain embodiments, refined signal propagation module 314 performs embedding realignment or vector normalization prior to dispatch. For instance, if a user input shifts a latent embedding position beyond a tolerance threshold, the module may project the updated embedding into the original training space using PCA or similarity-preserving projections, ensuring downstream modules operate within consistent vector bounds. Propagated outputs may also include a refinement confidence score or modification lineage, enabling orchestration system 112 to apply policy-based routing logic (e.g., skip redundant re-synthesis if minimal change).

As used herein, "refined signal propagation" refers to the machine-executed dissemination of adjusted classification artifacts—including score vectors, embeddings, and context flags—across system components following user interaction. These propagated values support output consistency, downstream traceability, and dynamic feedback loops within the broader multi-agent message scoring architecture.

Agent coordination interface 316 is operable to manage execution logic, control signals, and feedback integration between user context refinement system 108 and other agent systems within anomaly detection system 105. In various embodiments, agent coordination interface 316 facilitates the bidirectional exchange of message refinement state, refinement vector deltas, and interaction outcomes across media feature analysis system 106, response synthesis system 110, orchestration system 112, and associated storage modules.

More specifically, agent coordination interface 316 maintains interaction context state, controls agent transitions, and ensures that refinement outputs generated by user context refinement system 108 are incorporated into message-level decision pipelines. For example, when a user response modifies pillar-specific intent confidence, agent coordination interface 316 routes the updated scores to response synthesis system 110 for final message interpretation and output classification. The interface may also forward interaction-level metadata (e.g., number of turns, clarification success, or confidence shift magnitude) to orchestration system 112 to inform broader routing or escalation strategies.

In one implementation, agent coordination interface 316 tags each outgoing coordination payload with version metadata, session lineage, and interaction scope. For instance, a session with two prompt-response cycles may include a "refinement_pass=2" identifier and a traceable session UUID. If downstream modules determine that no further refinement is necessary, agent coordination interface 316 can signal session closure and archive the full state trajectory for performance logging.

In certain embodiments, agent coordination interface 316 supports asynchronous coordination patterns and fallback logic. For example, if refinement fails to reach a confidence delta threshold within a defined interaction limit, the system may auto-finalize outputs or initiate confidence normalization before routing to response synthesis system 110. Coordination logic may be rule-driven, dynamically weighted, or governed by orchestration system 112 depending on deployment configuration and operational policy.

User interaction log datastore 318 is operable to store, manage, and retrieve structured records of user interactions conducted during message refinement workflows. In various embodiments, user interaction log datastore 318 archives prompt-response sequences, refinement iterations, confidence score transitions, and user behavioral signals captured during live sessions. These records support system interpretability, retraining dataset construction, and feedback-based refinement analysis.

More specifically, user interaction log datastore 318 may store: (i) prompt templates and injected variables; (ii) user responses with timestamps and token-level annotations; (iii) confidence scores before and after refinement; and (iv) session outcome metadata (e.g., confidence improvement, resolution success, or fallback activation). For example, when a user confirms that a message is benign despite a high-risk preliminary classification, the full exchange is logged with both raw and vectorized representations to support longitudinal evaluation and adaptive retraining via training system 116.

In certain embodiments, user interaction log datastore 318 includes schema versioning to support evolving prompt formats or interaction models. Each entry may include a prompt schema ID, session UUID, and agent version identifiers, enabling fine-grained analysis of prompt effectiveness and agent stability across software updates. Logged interactions may be queried by orchestration system 112 to suppress repeated prompts for known message types or to inform escalation policies when similar interaction patterns yield divergent outcomes.

As used herein, the term "user interaction log" refers to a structured, time-indexed representation of machine-initiated and user-submitted interactions, including prompt inputs, response outputs, and derived adjustments to message classification vectors or confidence scores. These logs enable feedback-driven refinement, traceable performance evaluation, and dataset generation for supervised or reinforcement learning pipelines.

Prompt schema datastore 320 is operable to maintain structured definitions of prompt templates, variable injection formats, fallback rules, and schema metadata used by user context refinement system 108 during question generation and interpretation. In various embodiments, prompt schema datastore 320 provides lookup access for prompt configuration assets used by context prompt generator 306 and response capture module 308 during message-level refinement workflows.

More specifically, prompt schema datastore 320 stores a set of prompt templates encoded in a structured format (e.g., JSON, YAML, or protobuf) with fields specifying variable names, value types, default behaviors, injection priorities, and guardrails. For example, a schema entry may define a "link_context" variable with a max length constraint, an urgency_flag as a required binary input, and a fallback clause for missing values. These templates guide the prompt construction logic executed by upstream components and ensure consistency across user interactions.

In one implementation, prompt schema datastore 320 supports dynamic schema selection based on message type, feature profile, or user context. For instance, messages classified as impersonation attempts may invoke a schema variant that emphasizes identity confirmation and call-to-action verification, while promotional messages may trigger a schema emphasizing link reputation and reward framing. The datastore may also track schema usage frequency, response efficacy, or schema deprecation status to inform orchestration system 112 and training system 116.

In certain embodiments, prompt schema datastore 320 includes support for prompt variant testing and adaptive prompt evolution. Version tags, performance metrics, and session-level success rates may be associated with each prompt schema ID, enabling experimentation and refinement of prompt strategies over time. These schema definitions can be deployed in real time or during scheduled updates to maintain alignment with model training pipelines and deployment constraints.

As used herein, a "prompt schema" refers to a structured definition governing how extracted message features, user context variables, and fallback strategies are integrated into a question or instruction for downstream model execution. Prompt schemas may encode both the language structure and the operational behavior of prompts, allowing consistent and context-aware interaction patterns across user refinement sessions.

Figure 4:
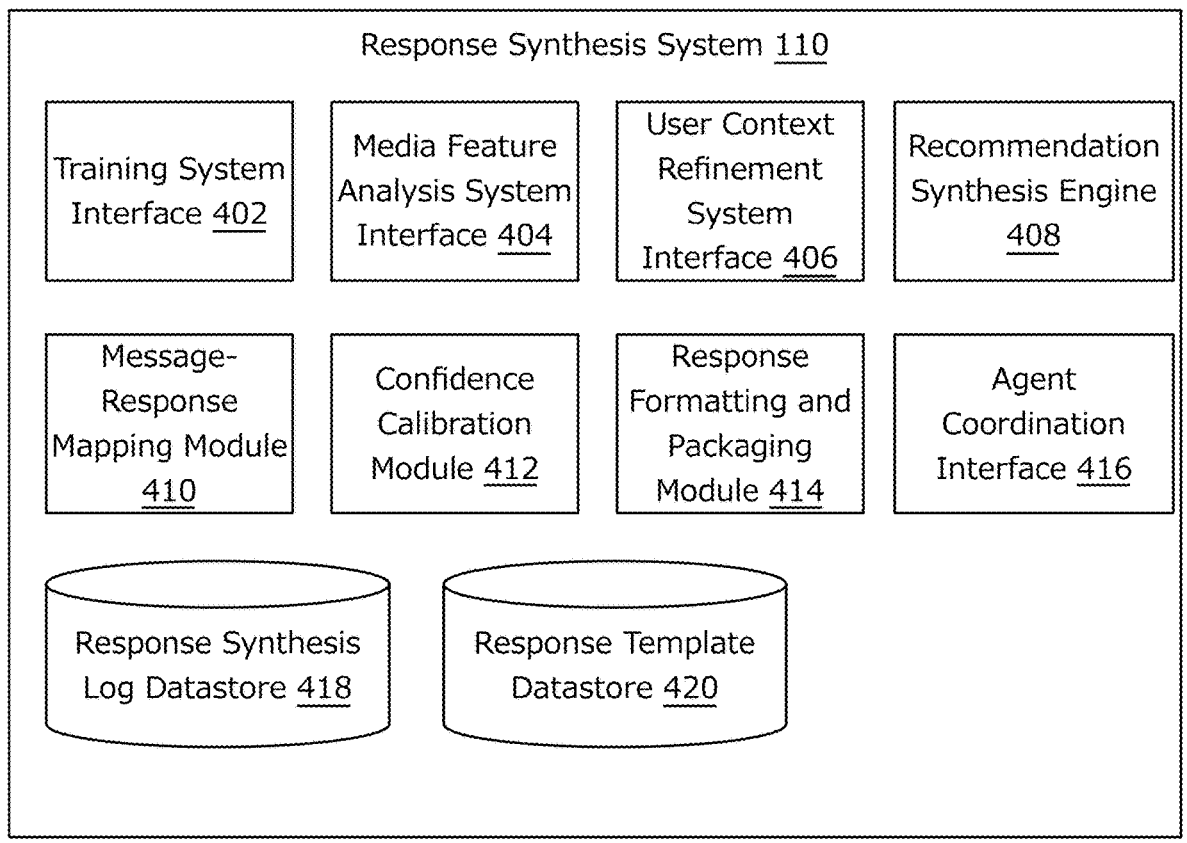
FIG. 4 illustrates components of the response synthesis system in accordance with various embodiments.

FIG. 4 illustrates an example architecture of response synthesis system 110, in accordance with various embodiments. As shown, response synthesis system 110 includes training system interface 402, media feature analysis system interface 404, user context refinement system interface 406, recommendation synthesis engine 408, message-response mapping module 410, confidence calibration module 412, response formatting and packaging module 414, agent coordination interface 416, response synthesis log datastore 418, and response template datastore 420.

Training system interface 402 is operable to retrieve model checkpoints, synthesis logic parameters, and response generation rules from training system 116 to support dynamic inference and decision generation within response synthesis system 110. In various embodiments, training system interface 402 provides runtime access to updated scoring models, configuration schemas, prompt-to-response mappings, and historical refinement traces used to govern the behavior of recommendation synthesis engine 408 and related components.

More specifically, training system interface 402 receives structured model artifacts from training system 116, including decoder weights, response classification matrices, and reliability metrics derived from prior agent interactions. For example, if an updated model checkpoint includes adjusted weightings for message-type probabilities based on a retraining cycle, interface 402 propagates this checkpoint into the active synthesis stack. In other implementations, training system interface 402 may retrieve strategy vectors or control directives (e.g., thresholds for deferral, override logic for low-confidence matches) that are used to guide downstream formatting and packaging behaviors.

In certain embodiments, training system interface 402 also receives feedback-annotated message-response pairs labeled during post-decision review or dispute handling. These pairs may include user corrections, outcome verifications, or confirmed fraud resolutions, and are used to align future synthesis operations with validated decision boundaries. As described further with respect to model performance log datastore 220, these feedback-driven updates support adaptive retraining and consistency tracking across synthesis agents.

As used herein, "model checkpoint" refers to a structured serialization of trained model weights, layer configurations, and version metadata, typically used to instantiate or resume inference operations. "Response generation rules" may include conditional logic, prompt-response templates, classifier routing instructions, or packaging constraints used to shape final message classifications or system feedback. Training system interface 402 enables synchronization between static synthesis infrastructure and evolving training pipelines, ensuring runtime recommendations reflect the latest learned patterns and reliability criteria.

Media feature analysis system interface 404 is operable to receive structured feature vectors, classification scores, and annotated embeddings from media feature analysis system 106 for use in final recommendation generation. In various embodiments, media feature analysis system interface 404 serves as the primary inbound channel for combined scoring vectors, pillar-level metadata, and signal interpretations derived from feature extraction module 206, message-type classifier 208, intent scoring and pillar evaluation engine 210, and link analyzer engine 211.

More specifically, media feature analysis system interface 404 receives outputs including (i) consolidated vector embeddings aligned with the message's original content, (ii) per-pillar scoring confidence values, and (iii) interpretive metadata such as model version tags, rationale statements, or classifier attention maps. For example, a received record may include a 384-dimensional embedding vector, three normalized intent pillar scores (e.g., 0.91 for urgency, 0.87 for manipulation, 0.22 for financial lure), and system-generated rationales for each axis. These inputs form the foundation for synthesis logic applied by downstream components.

In certain embodiments, media feature analysis system interface 404 also handles streaming updates from feature extraction or classification modules when intermediate results are flagged for real-time synthesis. For instance, if feature extraction module 206 determines that a message includes a high-risk URL pattern and link analyzer engine 211 assigns an extreme domain risk score, the system may trigger early-stage synthesis to accelerate delivery of a classification recommendation. Media feature analysis system interface 404 supports such conditional triggers and may package incomplete or partial feature vectors into provisional records for response formatting.

As used herein, "feature vector" refers to the structured representation of a message's semantic, visual, and contextual content as processed by media feature analysis system 106. "Interpretive metadata" refers to auxiliary data produced during classification, such as model output confidence, decision traces, or source attribution tags. Media feature analysis system interface 404 enables integration of upstream classifier insights with downstream synthesis operations, allowing the system to generate context-aware and model-aligned output representations.

User context refinement system interface 406 is operable to receive response-adjusted embeddings, annotated variables, and user-submitted input representations from user context refinement system 108 for use in final output synthesis. In various embodiments, user context refinement system interface 406 serves as a downstream ingress for post-interaction data artifacts, including vector deltas, user clarification embeddings, and prompt-augmented rationale records derived from message refinement sessions.

More specifically, user context refinement system interface 406 ingests signal modifications resulting from user responses captured and interpreted by components of user context refinement system 108 (e.g., response capture module 308 and response interpretation module 310). For example, when a user confirms that a message appears legitimate based on provided clarifying questions, the system may produce an adjusted confidence score or reweighted embedding vector reflecting reduced fraud likelihood. These refinements are routed through user context refinement system interface 406 and propagated to downstream synthesis components for incorporation into the final output.

In one implementation, user context refinement system interface 406 applies alignment checks to ensure vector compatibility and prompt lineage coherence. For instance, if a previously annotated feature was removed or materially altered through user input, the interface flags the update for synthesis system re-evaluation. In certain embodiments, the interface preserves a record of the applied refinement variables, user interaction metadata (e.g., timestamp, response length, interaction count), and vector transformation logs to support auditable synthesis decisions.

As used herein, "response-adjusted embedding" refers to a modified vector representation of a message that incorporates structured inputs derived from user feedback. "Prompt-augmented rationale" refers to a system-generated explanatory artifact that integrates both original classifier rationale and any refinement logic triggered by user interactions. User context refinement system interface 406 enables these adjusted signals to be consumed by synthesis components to generate more accurate and user-informed classification outcomes.

Recommendation synthesis engine 408 is operable to generate a final classification output for a message by synthesizing inputs received from upstream agents, classifiers, and user interaction pathways. In various embodiments, recommendation synthesis engine 408 consumes a plurality of structured inputs—including message embeddings, pillar-aligned scores, link analysis results, and user refinement vectors—and applies configurable aggregation logic to produce a final score, classification label, or interpretive recommendation.

More specifically, recommendation synthesis engine 408 applies one or more scoring fusion models or synthesis templates to reconcile heterogeneous inputs. For example, the engine may receive: (i) a message-type probability vector from message-type classifier 208, (ii) per-pillar scores from intent scoring and pillar evaluation engine 210, (iii) link-specific confidence metrics from link analyzer engine 211, and (iv) response-adjusted vectors from user context refinement system 108. Engine 408 aligns these inputs within a shared scoring framework—e.g., through weighted voting, decision tree ensemble, or rule-based combination—and emits a synthesized classification outcome (e.g., "likely scam," "requires review," or "low risk"). In one implementation, recommendation synthesis engine 408 supports dynamic weighting policies and conditional aggregation strategies governed by orchestration system 112. For instance, if a particular pillar exhibits low confidence or conflicts with user refinement inputs, the system may downweight its influence during synthesis. Conversely, if all agents converge on a high-confidence prediction, the engine may elevate the recommendation certainty and suppress further processing triggers. These rules may be encoded in a decision logic map, model checkpoint, or synthesis schema retrievable from training system 116.

Recommendation synthesis engine 408 may also generate auxiliary outputs, such as explanatory rationales, saliency overlays, or flagged decision artifacts. For example, the system may identify that a classification was driven predominantly by a high-urgency intent signal and a suspicious link domain, and attach this rationale to the final output. These justifications may be rendered to users or administrators depending on deployment configuration by response synthesis system 110.

In certain embodiments, recommendation synthesis engine 408 applies a tiered synthesis logic that incorporates not only direct classifier outputs and user responses, but also intermediate embeddings, pillar-aligned vectors, and prompt-derived contextual variables. The engine may execute a weighted synthesis plan in which high-confidence vectors are assigned primary influence, while fallback vectors (e.g., those derived from ambiguous responses or partial features) are included with lower weighting or conditional influence. For example, if the user input contains unresolved ambiguity, the engine may reference prior user interaction logs or prompt schema configurations to select a conservative classification state. The synthesis engine may also maintain fallback instruction sets and routing paths that adapt based on message archetype, scoring variance, or downstream policy thresholds defined in orchestration system 112.

As used herein, "synthesis" refers to the system-level combination of distributed classification signals, interaction-derived modifications, and metadata attributes into a coherent classification outcome. Recommendation synthesis engine 408 may employ statistical, rule-based, or learned fusion strategies, and supports traceable decision workflows suitable for regulated or high-stakes messaging environments.

Message-response mapping module 410 is operable to associate the final classification output generated by recommendation synthesis engine 408 with an appropriate system-generated response, action directive, or user-facing message. In various embodiments, message-response mapping module 410 receives the synthesized classification label, score vector, and rationale metadata from recommendation synthesis engine 408 and applies configurable response rules to select or generate the corresponding output action.

More specifically, message-response mapping module 410 maintains a mapping schema or rule-based logic table that links classification outcomes to response types. For example, if the classification is "likely scam," the system may select a response that blocks the message and informs the user with a predefined alert. If the classification is "ambiguous risk," the module may select a response that recommends user review with optional follow-up questions. The module may also assign severity levels or recommended triage actions (e.g., "escalate to moderator," "quarantine content," or "log for analysis") based on system confidence levels and organizational policy.

In one implementation, message-response mapping module 410 supports both static and adaptive response strategies. Static mappings may rely on predetermined rule sets or policy directives defined during deployment. Adaptive strategies may incorporate runtime telemetry, historical outcomes, or user feedback loops to adjust response selection. For instance, if a previously safe classification category begins showing false negatives, the system may escalate response severity or flag the mapping for administrator review.

Message-response mapping module 410 may also generate response metadata—including response ID, triggering classification path, associated rationale summary, and delivery parameters—which are passed to response synthesis system 110 for formatting. These metadata records support traceability, audit logging, and downstream integration with user-facing applications or moderation tools.

In various embodiments, message-response mapping module 410 is operable to perform vector-level alignment between prompt responses and previously extracted feature embeddings to evaluate semantic coherence and intent consistency. The module may generate delta vectors representing the semantic shift induced by user input, and apply similarity metrics (e.g., cosine distance or vector norm deviation) to quantify response alignment with the system's interpretive expectations. For example, if a response deviates substantially from an expected answer type, module 410 may trigger a re-evaluation using a fallback prompt template or flag the response as low-salience. Additionally, the module may apply prompt-to-answer mapping policies that exclude non-informative responses (e.g., "I don't know," or off-topic replies) from downstream aggregation.

As used herein, "response mapping" refers to the structured translation of a machine-generated classification outcome into a system action or user-facing output. Message-response mapping module 410 ensures that the classification results of response synthesis system 110 are actionable, explainable, and contextually aligned with platform or organizational response frameworks.

Confidence calibration module 412 is operable to evaluate and adjust the confidence level associated with classification results produced by recommendation synthesis engine 408 prior to final output generation. In various embodiments, confidence calibration module 412 receives synthesized classification scores, pillar-specific signals, and auxiliary metadata (e.g., source type, model version, score variance) and applies normalization, scaling, or calibration routines to ensure that the reported confidence values reflect empirically observed system behavior.

More specifically, confidence calibration module 412 may apply statistical calibration techniques such as isotonic regression, Platt scaling, or temperature scaling to align model output probabilities with observed classification reliability. For example, if the system's uncalibrated "scam" prediction is 0.92, but historical evaluation shows that similar scores yield correct predictions only 80% of the time, confidence calibration module 412 adjusts the final confidence score to better match the real-world true positive rate. This promotes score interpretability and consistency across different agents, message types, and system updates.

In one implementation, confidence calibration module 412 references longitudinal accuracy metrics from model performance log datastore 220 to compute per-class reliability curves or sliding-window calibration factors. These may be dynamically updated based on drift signals detected by orchestration system 112 or derived from feedback recorded in user interaction log datastore 318. The module may also apply source-specific calibration adjustments; for instance, messages originating from unknown numbers may trigger more conservative score interpretation based on elevated uncertainty.

In certain embodiments, confidence calibration module 412 generates a calibration trace, which includes pre- and post-calibration scores, adjustment rationale, and contributing features (e.g., link entropy, classifier disagreement, prior user behavior). This trace may be stored alongside the classification record and used by downstream analytics or decision support modules. Additionally, the module may assign qualitative descriptors (e.g., "high certainty," "low consensus") based on confidence thresholds to guide how messages are surfaced to end users or moderators.

In certain embodiments, confidence calibration module 412 integrates score variance analysis and inter-agent disagreement modeling to dynamically refine output thresholds. The module may maintain a calibration buffer populated with scoring deltas across similar message classes, and use these statistics to adjust decision boundaries over time. For instance, if the response synthesis engine produces fluctuating outputs for a particular risk category, the calibration module may introduce a dampening factor or defer the final classification until a stronger agent consensus is achieved. Calibration logic may also incorporate output rationale embeddings or metadata tags (e.g., prompt lineage, scoring path) to assess output stability across different session contexts. This allows the system to optimize interpretability while minimizing misclassification risk in high-ambiguity scenarios.

As used herein, "confidence calibration" refers to the process of refining raw classification confidence values to reflect observed predictive accuracy, contextual uncertainty, or system-specific heuristics. Confidence calibration module 412 ensures that downstream consumers of classification results—whether human or automated—receive appropriately weighted outputs that correspond to known model reliability characteristics.

Response formatting and packaging module 414 is operable to prepare the final structured output for delivery based on the calibrated classification results, underlying rationale, and relevant metadata. In various embodiments, response formatting and packaging module 414 receives synthesized recommendation data and associated confidence scores from confidence calibration module 412, then constructs a structured message interpretation record suitable for consumption by output engine 114 or downstream applications.

More specifically, response formatting and packaging module 414 transforms the system's internal outputs—including classification label, adjusted score, interpretability signals, and optionally user—response traces-into a standardized format defined by deployment configuration or recipient system interface specifications. These outputs may be encoded in JSON, Protocol Buffers, or other schema-conformant structures for seamless integration into messaging platforms, fraud monitoring systems, or case management interfaces. The formatted response may include fields such as message_id, final_label, confidence_score, reasoning_summary, and agent_contributions.

In one implementation, response formatting and packaging module 414 includes a templating engine configured to apply environment-specific formatting rules. For instance, in mobile messaging contexts, the output may include localized display labels and short summaries intended for in-app presentation to the user. In fraud alert pipelines, the module may generate verbose audit logs including timestamped feature vectors, pillar breakdowns, and rationale statements for escalation review. Response formatting and packaging module 414 ensures that these outputs are complete, consistent, and aligned with operational requirements.

In certain embodiments, the module incorporates fallback routines that govern how to handle incomplete inputs, missing metadata, or ambiguous classification states. For example, if agent consensus could not be reached or input variables were insufficient to meet a confidence threshold, response formatting and packaging module 414 may package the result with a status=undetermined tag, along with a diagnostic explanation and recommendation for human review. These policies are governed by orchestration system 112 or specified through deployment-level configurations.

As used herein, "response formatting and packaging" refers to the system-controlled transformation of internal classification and interpretation artifacts into an externally consumable structure, including labeling, metadata binding, trace linking, and schema-conformant output generation. Response formatting and packaging module 414 ensures that downstream consumers receive appropriately structured, explainable, and interoperable representations of the system's determinations.

Agent coordination interface 416 is operable to manage communication flows, processing state synchronization, and message handoffs between response synthesis system 110 and other agents within anomaly detection system 105. In various embodiments, agent coordination interface 416 facilitates bidirectional data exchange, execution orchestration, and version tracking across distributed components involved in message classification, user interaction, and final recommendation generation.

More specifically, agent coordination interface 416 receives vectorized message representations, prompt-adjusted user responses, and intermediate classification outputs from media feature analysis system interface 404 and user context refinement system interface 406. These inputs are used to determine whether additional synthesis, feedback weighting, or score rebalancing is warranted prior to generating final output. The interface operates under coordination policies set by orchestration system 112, which may specify fallback flows, minimum consensus thresholds, or re-query conditions.

In one implementation, agent coordination interface 416 includes routing logic for assigning priority to incoming updates and determining whether real-time message refinement should proceed or be deferred. For example, if a user response introduces significant delta in vector space but the model confidence is unchanged, the system may short-circuit additional scoring and directly package results. Conversely, if low consensus is detected across pillars or agents, the interface may reinitiate synthesis with adjusted weighting or retrigger prompt clarification routines.

In certain embodiments, the interface supports embedded traceability metadata—such as embedding version, user interaction lineage, and prior agent contributions—so that message histories can be persisted and rehydrated for audit, replay, or escalation use cases. Agent coordination interface 416 may also attach session-level attributes or orchestration flags (e.g., require_explanation, force_output, suppress_prompt) to guide downstream behavior and enforce policy constraints defined by external systems or administrators.

As used herein, "agent coordination" within response synthesis system 110 refers to the machine-executed control layer responsible for managing cross-agent execution paths, synchronizing intermediate outputs, and ensuring that message-level classification flows proceed in accordance with deployment rules and real-time context. Agent coordination interface 416 enables dynamic adaptation of synthesis workflows based on updated user signals, model drift, or evolving scoring conditions.

Response synthesis log datastore 418 is operable to record, organize, and retrieve structured logs related to classification determinations, synthesis operations, and output rationale generated by response synthesis system 110. In various embodiments, response synthesis log datastore 418 stores timestamped records for each processed message, including the final synthesized output, contributing factors, and metadata associated with scoring convergence, agent alignment, and fallback execution, where applicable.

More specifically, response synthesis log datastore 418 captures the structured result of each synthesis process—such as the final label, adjusted confidence score, rationale trace, and agent-specific inputs or vector deltas—and indexes these records by message UUID, user session, and processing window. These entries may include versioned vector states, classification lineage, synthesis rationale tokens, and references to prompts or user responses that contributed to the final outcome. For example, a log entry may indicate that a user's confirmation shifted the classification from "potential scam" to "benign promotional message," along with corresponding vector changes and calibrated score deltas.

In one implementation, response synthesis log datastore 418 supports flexible filtering, aggregation, and export operations. For instance, orchestration system 112 may request all synthesis events within a given confidence band to evaluate calibration accuracy, or training system 116 may extract disagreement cases across agents for retraining analysis. Logs may also include rollback entries and transient synthesis attempts where no final classification was committed, enabling full traceability even in ambiguous or unresolved sessions.

In certain embodiments, datastore 418 supports structured links to corresponding records in model performance log datastore 220, feature vector datastore 218, and user interaction log datastore 318. These links enable composite evaluation across synthesis, performance, and feedback dimensions, supporting root cause analysis, A/B testing, or failure mode tracking. Each log entry may also include metadata fields such as model checkpoint hash, orchestration policy ID, embedding configuration, and runtime environment tags (e.g., production, sandbox).

As used herein, "synthesis log" refers to a structured, persistent record of how final classification outputs were generated within response synthesis system 110, including associated metadata, decision rationale, scoring inputs, and system behavior during the classification lifecycle. These logs provide a system-level memory of decision pathways and serve as a foundation for interpretability, auditing, and performance improvement workflows.

Response template datastore 420 is operable to store, retrieve, and manage pre-configured or dynamically generated message templates used by response synthesis system 110 to construct structured outputs for presentation to end users or downstream systems. In various embodiments, response template datastore 420 serves as a repository of reusable formatting patterns, phrasing structures, classification labels, explanatory modules, and conditional messaging logic that guide how classification outcomes are rendered into human-readable or system-consumable responses.

More specifically, response template datastore 420 maintains a set of indexed templates organized by classification type (e.g., phishing, promotional offer, unknown), delivery context (e.g., mobile app, web interface, API response), and required verbosity level (e.g., summary only, explanatory mode, multi-step rationale). Templates may be parameterized with fields such as <classification_label>, <confidence_score>, <recommendation_text>, or <safety_guidance>, which are filled in by response formatting and packaging module 414 using values derived from the synthesis output and agent contributions.

In one implementation, templates are encoded in a markup format that supports conditional rendering blocks (e.g., show guidance if score <0.5, include user rationale if available) and localization tags for multilingual deployment. For example, if a classification result includes a medium-risk impersonation score with low user engagement, the selected template may conditionally suppress verbose output and recommend limited action, while including a summary of system rationale and a call-to-action button.

In certain embodiments, response template datastore 420 includes a versioning system that tracks template updates, deprecations, and context-specific overrides. Orchestration system 112 may dynamically select different template sets based on runtime environment (e.g., production vs. testing), organizational policies, user role, or jurisdictional requirements. For instance, enterprise deployments may enforce stricter warning language and user escalation prompts, while consumer-facing deployments prioritize clarity and simplicity.

As used herein, "response template" refers to a structured message skeleton used to render final classification outcomes, including explanatory content, confidence indicators, recommended actions, and optional disclaimers or user prompts. Templates may be static, configurable, or dynamically selected based on synthesis metadata, and may include embedded formatting logic to support a range of output modes and delivery channels. Response template datastore 420 ensures that output messaging remains consistent, explainable, and aligned with policy constraints across diverse classification scenarios.

Figure 5:
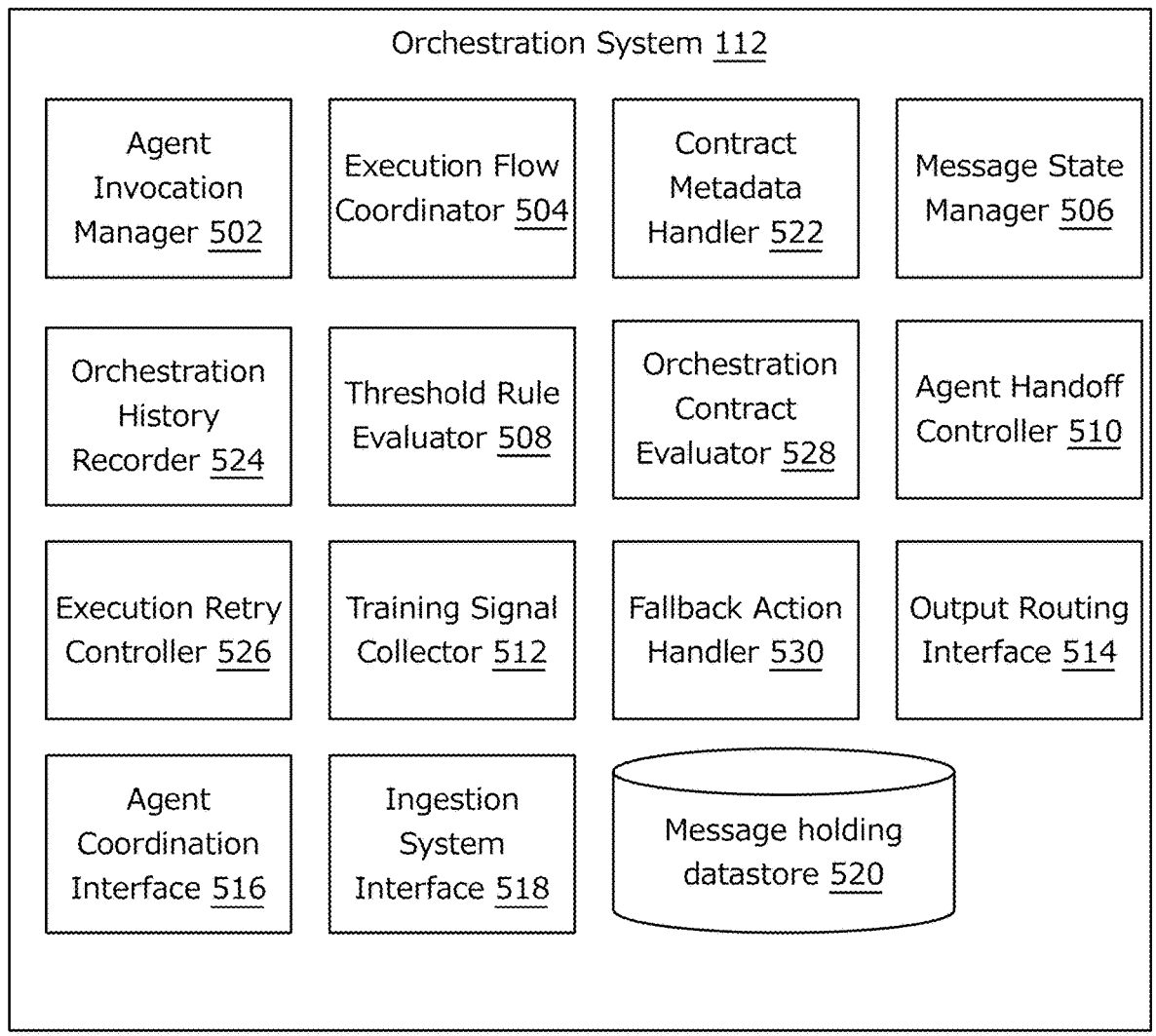
FIG. 5 illustrates components of the orchestration system in accordance with various embodiments.

FIG. 5 illustrates an example architecture of orchestration system, in accordance with various embodiments. As shown, orchestration system 112 includes agent invocation manager 502, execution flow coordinator 504, contract metadata handler 522, message state manager 506, orchestration history recorder 524, threshold rule evaluator 508, orchestration contract evaluator 528, agent handoff controller 510, execution retry controller 526, training signal collector 512, fallback action handler 530, output routing interface 514, agent coordination interface 516, ingestion system interface 518, and message holding datastore 520.

Agent invocation manager 502 is operable to determine which agent or agent sequence should be activated in response to a received message based on initial system evaluation and routing policy. In various embodiments, agent invocation manager 502 receives message representations, preliminary classification outputs, or embedded vectors from ingestion system interface 518 and identifies the appropriate agent paths (e.g., media feature analysis system 106, user context refinement system 108, response synthesis system 110) to execute based on system configuration and orchestration policy.

More specifically, agent invocation manager 502 may evaluate message type indicators, vector confidence distributions, and source metadata to select a conditional routing plan. For example, if a message is classified as a low-complexity type with a high-confidence promotional classification, the agent invocation manager 502 may skip user context refinement and directly invoke response synthesis system 110. Conversely, if the system detects an ambiguous or low-consensus classification, the manager may activate multiple agents in parallel or apply sequential handoffs based on a defined fallback strategy. Invocation policies may be retrieved from orchestration configuration records stored within orchestration system 112.

In one implementation, agent invocation manager 502 includes logic to support selective agent activation based on risk tier, regulatory compliance tier, or user group policy. For instance, financial institutions may activate additional scrutiny modules when messages involve transaction keywords, while general users may follow a simplified agent sequence. The manager tags each agent invocation with a session identifier, invocation context, and initial routing rationale for downstream audit and traceability.

As used herein, "agent invocation" refers to the machine-executed process of selecting and triggering one or more processing agents in the system architecture in accordance with predefined conditions, runtime message characteristics, or adaptive orchestration logic. Invocation decisions may include primary agent selection, fallback agent specification, and conditional trigger registration for downstream coordination.

Execution flow coordinator 504 is operable to manage the runtime execution state, ordering, and dependency constraints associated with active agent processing flows. In various embodiments, execution flow coordinator 504 receives agent invocation directives from agent invocation manager 502 and initiates execution pipelines based on system-wide orchestration logic, agent readiness, and inter-agent data dependencies.

More specifically, execution flow coordinator 504 tracks active message sessions and orchestrates the sequencing of agent tasks across media feature analysis system 106, user context refinement system 108, and response synthesis system 110. The coordinator may enforce wait conditions, such as deferring synthesis tasks until response capture completes, or enable parallel execution when agents operate on independent branches. Coordination logic may include dependency resolution graphs, execution windows, and conditional checkpoints retrieved from orchestration policy configurations.

In one implementation, execution flow coordinator 504 maintains an internal state machine for each message session. The state machine tracks current agent status (e.g., idle, running, completed), gating flags (e.g., "awaiting user input"), and transition conditions between stages. For example, upon receiving updated pillar scores from user context refinement system 108, the coordinator may determine whether score changes exceed a defined threshold that warrants reactivation of media feature analysis system 106 for re-scoring, or may finalize the state and forward to synthesis. Timeouts, non-response paths, or agent error conditions may also be handled via failover transitions encoded within the coordination logic.

In certain embodiments, execution flow coordinator 504 includes hooks to communicate with orchestration policy versioning records or external session monitoring tools. This allows real-time inspection of execution flows for auditability, debugging, or adaptation based on live message traffic. Coordinator 504 may expose API endpoints or log events that reflect the decision path, agent transitions, and state resolutions for each message session.

Contract metadata handler 522 is operable to store, retrieve, and propagate agent coordination contracts and session-specific orchestration directives across components of orchestration system 112. In various embodiments, contract metadata handler 522 maintains session-bound configurations that define the scope, conditions, and constraints under which different agents—such as media feature analysis system 106, user context refinement system 108, and response synthesis system 110—are to be invoked, evaluated, or bypassed during multi-agent processing flows.

More specifically, contract metadata handler 522 operates as an active configuration layer that serves structured orchestration instructions to execution flow coordinator 504 and agent invocation manager 502. These instructions may include: (i) agent selection conditions, (ii) score threshold escalation policies, (iii) failover criteria, and (iv) metadata requirements for triggering fallback paths. For example, a contract may define that if message-type classifier 208 emits a score below 0.6 and intent scoring and pillar evaluation engine 210 reports low urgency, the system should skip prompt generation and proceed directly to synthesis. Each contract includes a contract ID, scope of applicability, and field-level specifications that control execution logic dynamically.

In one implementation, contract metadata handler 522 retrieves orchestration contract blueprints from training system 116 or an administrative policy interface. These blueprints may define templates for dynamic contracts based on message type, source device, prior session history, or regional risk model alignment. For instance, contracts applied to inbound messages originating from mobile carriers may differ from those applied to high-risk international email sources. At runtime, contract metadata handler 522 applies interpolation or substitution logic to generate a session-specific contract instance from these templates, adjusting fields like agent priority, prompt depth, or response formatting constraints accordingly.

In certain embodiments, contract metadata handler 522 maintains bidirectional coordination with message state manager 506 and threshold rule evaluator 508 to enforce contract continuity and ensure consistency between the configured orchestration scope and live message metadata. For example, if a contract specifies that user interaction is prohibited after initial synthesis, message state manager 506 will suppress prompt invocation regardless of agent outputs. Similarly, threshold rule evaluator 508 may apply contract-specified override rules when computing whether to pause, escalate, or route messages to alternate agents.

As used herein, the term "contract metadata" refers to a structured configuration object that defines agent participation rules, execution bounds, score thresholds, fallback logic, and other orchestration control parameters on a per-session or per-message basis. These contracts may be dynamically generated, versioned, cached, and audited across orchestration system 112 to ensure explainable, adaptive, and session-aware behavior.

Contract metadata instances implement structured configuration objects that define execution constraints through contract metadata handler 522, including agent selection conditions, threshold escalation policies, and fallback criteria as coordinated with execution flow coordinator 504. These contracts support dynamic instantiation based on message characteristics, with template interpolation enabling context-specific adjustments for different deployment scenarios. Contract conditions are evaluated using configurable rule-based logic that can assess combinations of pillar scores, confidence levels, and metadata attributes, enabling sophisticated orchestration policies through orchestration contract evaluator 528. The system supports hierarchical and nested contract structures with conditional branching logic, allowing contracts to specify different processing requirements based on message type, source characteristics, and risk assessment results. Fallback criteria implementation includes timeout handling, retry logic managed by execution retry controller 526, and alternative processing paths when primary analysis methods are unavailable or produce insufficient confidence levels.

Message state manager 506 is operable to maintain and update the authoritative state record associated with each message as it progresses through multi-agent processing workflows. In various embodiments, message state manager 506 receives event updates, score outputs, vector transformations, user responses, and metadata tags from upstream systems and consolidates this information into a structured message state representation.

More specifically, message state manager 506 acts as a canonical store for tracking the evolving context of a given message, including current classification scores, refinement history, embedding snapshots, agent engagement flags, and output statuses. For example, if user context refinement system 108 generates a clarifying question and receives a user response, message state manager 506 records both the original prompt metadata and the parsed answer, associating these with the correct processing version and timestamp.

In one implementation, message state manager 506 stores each state record as a versioned object, supporting rollback, audit traceability, and rehydration of prior processing stages. These records may include serialized message embeddings, annotated prompt variables, per-agent outputs (e.g., risk vectors, rationale strings), and completion markers (e.g., "ready for synthesis"). State deltas may be computed between versions to inform retraining pipelines via training system 116 or to resolve agent-level inconsistencies flagged by execution flow coordinator 504.

In certain embodiments, message state manager 506 also supports fine-grained access by other orchestration components. For example, orchestration system 112 may query state history to determine whether a refinement path has been attempted and retrieve active and prior scores to calculate confidence intervals across agent outputs. By centralizing state information with structured versioning, message state manager 506 ensures consistent, interpretable message handling across the distributed system.

Orchestration history recorder 524 is operable to log orchestration-specific execution metadata across each message session, including agent routing decisions, contract enforcement paths, score deltas, and override actions taken during message evaluation. In various embodiments, orchestration history recorder 524 writes structured, timestamped records that reflect both the raw and derived operations of orchestration system 112 during a single or multi-step scoring sequence.

More specifically, orchestration history recorder 524 captures (i) the sequence of agent invocations, (ii) agent outputs and associated confidence metrics, (iii) contract references used during decision-making, (iv) score evaluations before and after threshold rule application, and (v) trigger flags from message state manager 506 that modified execution flow. For example, if orchestration system 112 receives a message flagged by media feature analysis system 106 and routes it to user context refinement system 108 based on a low pillar consensus score, orchestration history recorder 524 stores a log entry capturing this condition, the triggering values, the fallback flag, and the timestamp of agent handoff.

In one implementation, orchestration history recorder 524 stores historical session traces in a time-indexed datastore, enabling traceability across repeated message evaluations or comparative policy enforcement. These traces may include message UUIDs, orchestration contract IDs, execution tree snapshots, model version hashes, and override event markers (e.g., "Prompt Bypassed: Contract Restriction"). These logs can be queried by training system 116 for post hoc validation or policy tuning based on operational drift, unexpected routing patterns, or agent instability.

In certain embodiments, orchestration history recorder 524 supports hashed linkage to message holding datastore 520, enabling cross-lookup of message payloads and agent responses with orchestration decisions. For instance, if a downstream agent output is later corrected through user feedback, the corresponding orchestration path (e.g., which agents were invoked, skipped, or retried) can be reconstructed to inform retraining data selection or audit resolution.

As used herein, "orchestration history" refers to a machine-generated, structured, session-specific trail of message processing steps within orchestration system 112, capturing all routing decisions, agent results, contract applications, threshold checks, and output resolutions. This history supports system observability, auditability, and adaptive refinement through retrospective orchestration analysis.

Threshold rule evaluator 508 is operable to determine whether the current message state satisfies one or more predefined or dynamically generated rule conditions for classification finalization, agent bypass, escalation, or fallback invocation. In various embodiments, threshold rule evaluator 508 receives input from message state manager 506, agent outputs, and orchestration configuration data to evaluate whether certain confidence thresholds, disagreement margins, or contextual flags are met.

The system utilizes learned uncertainty points, which are empirically determined score values derived from validation data analysis where classification confidence is lowest, typically occurring at decision boundaries between different risk categories. Unlike static thresholds, learned uncertainty points dynamically adapt based on model performance metrics and real-world classification outcomes, enabling the system to identify score regions where additional context or refined analysis would be most beneficial.

More specifically, threshold rule evaluator 508 compares current combined risk scores, individual classifier or pillar confidence values, and downstream agent deltas against system-defined thresholds configured via orchestration system 112 or training system 116. For example, if the combined message score exceeds a configured upper threshold (e.g., 0.92) and all active agents report above-minimum consensus, threshold rule evaluator 508 may permit direct routing to output engine 114 without invoking additional refinement or synthesis stages.

The disagreement detection process between pillars employs binary prediction comparison combined with uncertainty-weighted influence adjustment as coordinated through orchestration system 112. Specifically, threshold rule evaluator 508 identifies disagreement when pillar predictions differ across classification outcomes, then calculates uncertainty differences between pillar confidence levels to determine appropriate weighting adjustments. The system computes uncertainty scores by inverting confidence values, then evaluates the uncertainty difference between pillars to guide dynamic influence allocation. When uncertainty differences exceed configurable thresholds, the system applies adjusted influence weights that favor the more confident pillar, with larger uncertainty gaps triggering more significant weight adjustments. The disagreement resolution mechanism leverages historical accuracy tracking stored in model performance log datastore 220, enabling the system to learn which pillar performs better in specific disagreement scenarios and adjust future influence calculations based on empirically observed performance patterns rather than static rules.

In one implementation, threshold rule evaluator 508 supports multi-variable conditional evaluation, incorporating not only static thresholds but also adaptive parameters based on model drift indicators, prompt path history, or message source. For instance, if user interaction logs from datastore 318 indicate high variance for a specific message archetype, threshold rule evaluator 508 may lower thresholds or trigger additional validation even if confidence levels appear sufficient.

In certain embodiments, threshold rule evaluator 508 includes override logic for policy-specific routing conditions. For example, some deployments may mandate human review for financial lures exceeding a moderate risk score, even when synthesis confidence is high. In these cases, threshold rule evaluator 508 applies contextual override parameters encoded in the prompt schema datastore 320 or coordination rules from orchestration system 112. The decision result (e.g., "pass," "refine," "flag," "halt") is propagated to execution flow coordinator 504 to inform subsequent routing.

Orchestration contract evaluator 528 is operable to enforce conditional requirements, processing constraints, and output validation rules as defined by the execution configuration associated with each message. In various embodiments, orchestration contract evaluator 528 receives intermediate results from prior components—such as threshold rule evaluator 508 and message state manager 506—and determines whether those results satisfy the contract criteria necessary to proceed with agent handoff or output generation.

More specifically, each message entering orchestration system 112 may be associated with a dynamically scoped orchestration contract, a system-internal artifact that defines required agent steps, minimum model confidence levels, score consistency bounds, response time limits, and optional enrichment steps (e.g., user input required before decision). Orchestration contract evaluator 528 compares current message state against these requirements, and if violations are detected, generates a structured violation record passed to agent handoff controller 510 or execution retry controller 526 for appropriate handling.

For example, a contract may specify that all messages classified as financial impersonation must (i) reach a combined pillar score of ≥0.85, (ii) include at least one user refinement step via Scout, and (iii) be evaluated by the latest model checkpoint. If a message fails to meet these conditions, orchestration contract evaluator 528 can halt further agent progression and flag the message for reassessment or exception handling.

In one implementation, orchestration contract evaluator 528 supports hierarchical and nested contracts, enabling conditional branching logic. For instance, if an upstream module emits a low-entropy link score, the evaluator may bypass certain downstream agents entirely, adjusting the expected contract flow dynamically. Alternatively, high-urgency messages may invoke additional verification steps even when prior thresholds are satisfied.

In certain embodiments, contract definitions are managed by orchestration system 112 and version-controlled by training system 116. Orchestration contract evaluator 528 may also be operable to emit contract satisfaction logs to orchestration history recorder 524, allowing post hoc audits of whether execution paths were compliant with system policy at the time of evaluation.

As used herein, "orchestration contract" refers to a dynamically evaluated execution blueprint that encodes mandatory processing steps, agent participation requirements, and validation criteria for a given message. Orchestration contract evaluator 528 ensures that agent execution logic remains compliant, adaptive, and traceable across evolving deployment configurations.

Agent handoff controller 510 is operable to manage conditional transitions between modular agents within anomaly detection system 105 based on message state, evaluation results, and orchestration directives. In various embodiments, agent handoff controller 510 receives updated message representations, agent-specific outputs, and orchestration flags from execution flow coordinator 504 and threshold rule evaluator 508, and applies routing logic to determine the next agent to invoke, bypass, or reengage.

More specifically, agent handoff controller 510 evaluates agent readiness states, prior execution paths, and residual uncertainty to guide sequential or parallel handoffs. For example, if a message has already passed through media feature analysis system 106 but the synthesized confidence remains below a specified threshold, agent handoff controller 510 may direct the message vector to user context refinement system 108 for clarification, unless that agent has been previously invoked with no material score change. The controller maintains state-awareness to prevent redundant loops and ensures forward progress through the orchestration pipeline.

In one implementation, agent handoff controller 510 incorporates a dynamic path planner that scores possible agent invocation orders based on expected score lift, response latency, and historical effectiveness metrics logged in model performance datastore 220. For instance, when response synthesis system 110 is predicted to add minimal value due to low signal clarity or prior inconsistency, the planner may bypass it and escalate to human-in-the-loop review if configured.

In certain embodiments, agent handoff controller 510 supports asynchronous or speculative handoff logic. This allows the system to issue simultaneous tasks to multiple downstream agents while tracking whichever returns first with a meaningful refinement. If conflicting outputs arise, the controller applies predefined resolution logic or coordination rules. All transitions and control flags are versioned and logged for traceability, with orchestration system 112 able to audit and adjust handoff strategies over time.

Execution retry controller 526 is operable to detect, evaluate, and selectively trigger retry attempts for message processing flows that have failed, timed out, or produced low-confidence outputs across one or more agents. In various embodiments, execution retry controller 526 is invoked by orchestration system 112 when downstream results do not meet contract-specified quality thresholds, model confidence limits, or consensus criteria across distributed agent outputs.

More specifically, execution retry controller 526 monitors indicators such as (i) agent timeout or crash signals, (ii) insufficient response justification from downstream modules, (iii) threshold evaluation failures, or (iv) orphaned message states with unresolved classification tags. Based on these conditions, execution retry controller 526 may reinitiate message processing from a specific module, agent, or orchestration checkpoint. For example, if response synthesis system 110 returns an ambiguous message label with low rational confidence and no prompt lineage, execution retry controller 526 may trigger a re-routing of the same message back to user context refinement system 108 with updated context embeddings or fallback prompt schema.

In one implementation, execution retry controller 526 includes a bounded retry policy with maximum retry counts, delay intervals, and retry reason tags. These policies may be configured per deployment, message type, or system load state. For example, high-urgency impersonation messages may permit a second-pass evaluation with re-weighted pillar scores, while benign promotional messages may be dropped after a single failure. Retry actions are logged in orchestration history recorder 524 and tagged in message state manager 506 to ensure full traceability.

In certain embodiments, controller 526 leverages the message holding datastore 520 to retrieve buffered inputs and prior agent outputs, then modifies only the failing segment of the execution path without replaying the full orchestration. This partial retry behavior allows the system to isolate failing modules, test new prompt formulations, or override previous threshold decisions in an adaptive, non-disruptive manner.

As used herein, "execution retry" refers to a machine-executed conditional re-engagement of agent-based message processing steps based on error conditions, low-confidence outputs, or unmet orchestration contracts. Retry logic may include partial execution rollback, prompt variation, adjusted routing, or scoring re-evaluation, all controlled by execution retry controller 526.

Training signal collector 512 is operable to extract, normalize, and transmit relevant message-level artifacts for use in downstream retraining, drift detection, and model calibration workflows managed by training system 116. In various embodiments, training signal collector 512 monitors agent outputs, intermediate scores, prompt interactions, and user response vectors to capture structured supervision data associated with each evaluated message.

More specifically, training signal collector 512 listens for post-decision signals routed from message state manager 506 and agent handoff controller 510, including final classification outputs, agent disagreement events, and indicators of user-reported false positives or confirmed threats. These signals are converted into structured training records containing the original input vector, all agent-level outputs, applicable prompt variables, and trace metadata (e.g., timestamp, model version, score history).

In one implementation, training signal collector 512 includes configurable filters to selectively store only informative or novel examples. For instance, messages that trigger high variance in pillar scores or exhibit low consensus across agents may be flagged for inclusion, while routine high-confidence predictions are excluded to reduce redundancy in retraining datasets. training signal collector 512 may also prioritize messages with known outcomes (e.g., user-confirmed scam, dismissed alert) for supervised fine-tuning.

In certain embodiments, training signal collector 512 interfaces directly with model performance log datastore 220 and feature vector datastore 218 to retrieve relevant embeddings and historical performance context. These enriched training records are bundled with system-assigned labels (e.g., consensus class, deviation reason, prompt response content) and stored in a staging queue accessible by training system 116. This architecture supports both batch-mode and online reinforcement learning pipelines and enables continual adaptation of models across Sentinel, Scout, and Sage.

Fallback action handler 530 is operable to evaluate message processing outcomes that do not meet predefined thresholds, agent confidence criteria, or orchestration contract conditions and to apply configured fallback routines to ensure safe and policy-aligned completion of the processing flow. In various embodiments, fallback action handler 530 receives status indicators, rule violation notifications, and downstream eligibility signals from orchestration contract evaluator 528, training signal collector 512, and agent coordination interface 516.

More specifically, fallback action handler 530 may select from a set of predefined fallback strategies—such as routing the message for human review, suppressing the output entirely, emitting a generalized warning message, or triggering an alternate agent pipeline. These fallback routines may be configured based on message type, classification confidence, user context, or operational mode (e.g., high-sensitivity vs. fast-path processing).

For example, if the system is unable to converge on a consistent classification outcome—e.g., due to conflicting scores between Sentinel and Scout, or unresponsive behavior from Sage-fallback action handler 530 may apply a policy that blocks the message and triggers an escalation routine via external service integration. Alternatively, if the message is below all threat thresholds but ambiguity remains, the handler may invoke a "low-risk disclaimer" output path managed by response formatting and packaging module 414.

In one implementation, fallback action handler 530 accesses configuration metadata supplied by orchestration system 112 or retrieved from orchestration history recorder 524 to determine the applicable fallback tier. Each tier may specify override thresholds, preferred backup agents, and permissible truncation behavior for intermediate outputs.

In certain embodiments, fallback action handler 530 emits fallback invocation records into model performance log datastore 220 and message holding datastore 520, enabling downstream retraining or policy refinement. The system may later analyze fallback frequency, trigger conditions, and downstream user outcomes to adapt fallback logic over time.

As used herein, "fallback action" refers to an explicitly triggered alternative message handling behavior executed when primary agent coordination flows are blocked, degraded, or insufficiently confident to meet deployment standards. Fallback action handler 530 ensures fail-safe behavior aligned with operational policy, user expectations, and regulatory requirements.

Output routing interface 514 is operable to transmit finalized classification outputs, synthesized interpretations, or agent-adjusted scores from orchestration system 112 to downstream systems for logging, user notification, or external integration. In various embodiments, output routing interface 514 receives the final result set from agent handoff controller 510 and prepares it for delivery through one or more transport channels defined by deployment configuration or system policy.

More specifically, output routing interface 514 applies message packaging and delivery logic based on destination type. For example, if the classified message originated from a messaging platform, the interface formats a risk score response or content flag in accordance with that platform's API specifications. If routed to an enterprise alert system, the output may include structured metadata (e.g., reason codes, pillar breakdowns, trace identifiers) suitable for ingestion by ticketing or threat-response platforms.

In one implementation, output routing interface 514 supports dynamic routing rules, allowing certain outputs to be conditionally forwarded to feedback loops, user-facing interfaces, or external review queues. For instance, messages flagged as borderline or unresolved by confidence calibration module 412 may be forwarded both to the user and to a human-in-the-loop moderation tool. Similarly, high-certainty classifications may be logged directly without additional human review.

In certain embodiments, output routing interface 514 appends audit fields or output provenance metadata to each transmitted message. This includes trace identifiers from message state manager 506, the agent pathway used, and confidence thresholds applied. This ensures consistency between the scoring logic used internally and the interpretations presented externally, enabling downstream systems to perform trust evaluation, suppression logic, or real-time overrides based on fully traceable metadata.

Agent coordination interface 516 is operable to facilitate bidirectional communication and execution synchronization between orchestration system 112 and the modular agents of anomaly detection system 105, including media feature analysis system 106, user context refinement system 108, and response synthesis system 110. In various embodiments, agent coordination interface 516 enables orchestration system 112 to issue invocation commands, retrieve intermediate or final agent outputs, and manage timing, versioning, and fallback handling for inter-agent workflows.

More specifically, agent coordination interface 516 supports message-contextualized routing using agent identifiers, model checkpoint metadata, and execution context flags. For example, when execution flow coordinator 504 determines that a message should be routed to both user context refinement system 108 and response synthesis system 110, agent coordination interface 516 packages and transmits the relevant embedding vectors, prompt variable sets, and control metadata to each target agent. Each payload may be tagged with orchestration state lineage or step identifiers to support traceability and rollback.

In one implementation, agent coordination interface 516 enables concurrent or sequential agent dispatching based on rules defined by threshold rule evaluator 508 or agent invocation manager 502. For instance, if a first agent output meets a bypass threshold, further agent calls may be suppressed. Conversely, if outputs are incomplete or below a confidence threshold, coordination interface 516 can initiate asynchronous follow-up calls to refinement agents, propagate message updates via message state manager 506, and track resolution cycles through handoff controller 510.

In certain embodiments, agent coordination interface 516 maintains per-agent configuration data, including version compatibility, accepted input schemas, expected response formats, and allowed side-effects (e.g., prompt injection, response modification, or confidence reweighting). This allows orchestration system 112 to adaptively sequence multi-agent flows while enforcing operational constraints, preventing duplicate processing, and ensuring state consistency across distributed scoring and refinement logic.

Ingestion system interface 518 is operable to receive incoming message data and associated metadata from ingestion system 104 and initiate orchestration workflows managed by orchestration system 112. In various embodiments, ingestion system interface 518 functions as the entry point through which orchestratable message instances are registered, classified, and routed to downstream agents for feature analysis, scoring, and synthesis.

More specifically, ingestion system interface 518 retrieves structured message payloads, including extracted media content, timestamp metadata, source identifiers, and transport attributes. These inputs may be normalized prior to orchestration, or passed directly into agent invocation manager 502 for dynamic routing. For example, when a new SMS message with a shortened URL is received from ingestion system 104, ingestion system interface 518 validates the message format, appends an orchestration-ready UUID, and forwards the payload to execution flow coordinator 504 to determine the appropriate agent path.

In certain embodiments, ingestion system interface 518 also supports batch ingestion and deferred processing flows. For instance, multiple messages received within a short interval may be grouped for staged orchestration, allowing orchestration system 112 to coalesce scoring signals or apply deduplication logic. The interface may additionally apply pre-processing filters to determine whether specific agent paths are warranted (e.g., media-rich messages may bypass initial user interaction).

Ingestion system interface 518 serves as the operational bridge between ingestion system 104 and orchestration system 112. By enforcing input normalization protocols and embedding orchestration metadata at the point of entry, ingestion system interface 518 ensures consistent downstream processing while enabling orchestration system 112 to dynamically assign routing priorities, apply message state updates, and initiate appropriate agent flows.

Message holding datastore 520 is operable to store message records, intermediate scoring outputs, agent-specific state snapshots, and orchestration metadata associated with the lifecycle of message processing within orchestration system 112. In various embodiments, message holding datastore 520 provides persistent or semi-persistent storage for messages under active orchestration, supporting pause-resume behavior, fallback handling, and asynchronous agent handoffs.

More specifically, message holding datastore 520 retains stateful representations of messages that are awaiting refinement, routing decisions, or user interactions. For example, if orchestration system 112 triggers a prompt generation sequence via user context refinement system 108 but awaits user response, the message instance and its current scoring vector may be suspended in datastore 520. Upon resumption, agent coordination interface 516 or agent handoff controller 510 retrieves the suspended state to resume the pipeline without data loss or duplication.

In certain embodiments, message holding datastore 520 maintains indexed partitions for messages in different orchestration phases (e.g., awaiting agent invocation, awaiting threshold evaluation, post-refinement). Each stored message instance may include associated metadata such as message UUID, ingestion timestamp, triggering agent identifier, current agent index, prompt lineage ID, and temporal markers used for timeout handling.

For example, if a message completes feature analysis via media feature analysis system 106 but does not meet the confidence threshold for direct synthesis, orchestration system 112 may log the message state in message holding datastore 520 while awaiting user response. If no response is received within a configured time window, the orchestration system may retrieve the stored state and pass it to response synthesis system 110 using a fallback configuration.

Message holding datastore 520 ensures continuity across distributed and time-dependent orchestration flows by preserving execution context, intermediate results, and agent-related decision markers. This enables orchestration system 112 to operate flexibly across synchronous and asynchronous workflows while maintaining traceability, fault tolerance, and consistent output generation.

Figure 6:
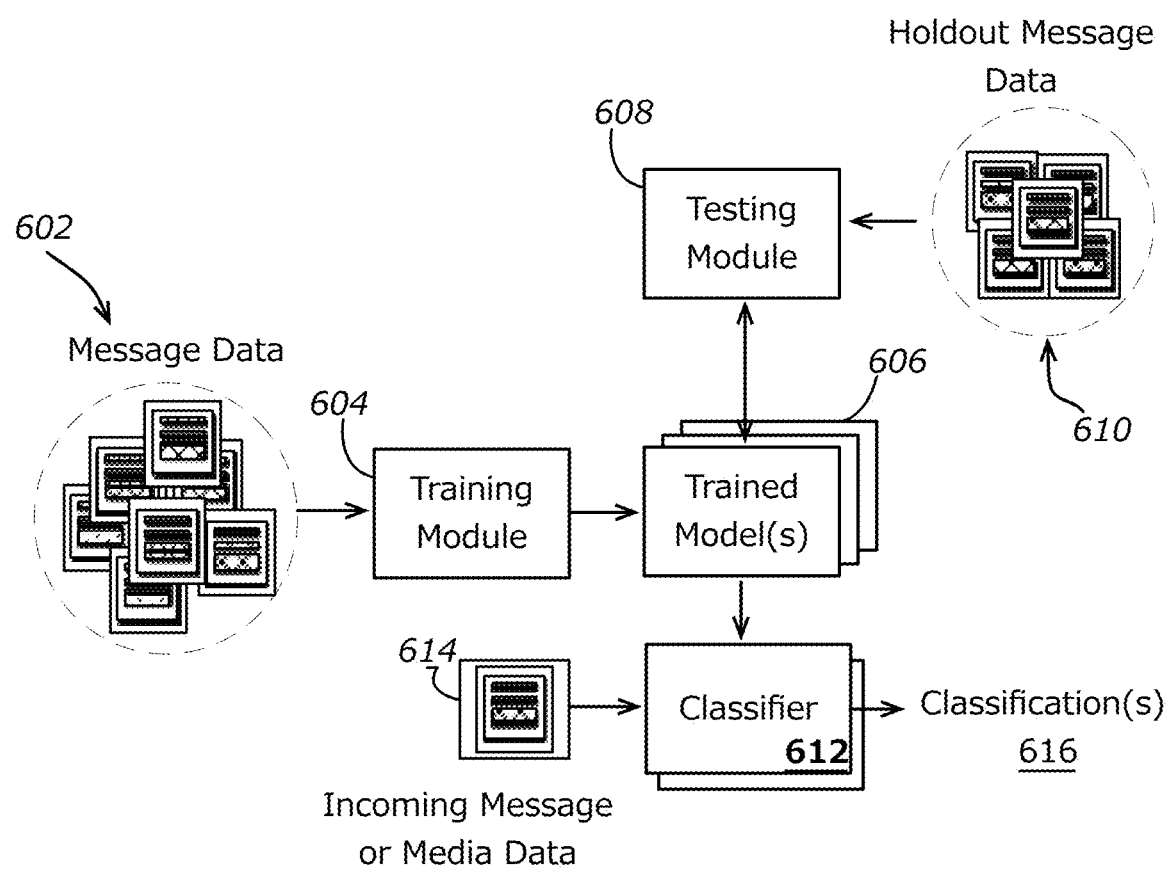
FIG. 6 illustrates a training pipeline for the message analysis system in accordance with various embodiments.

FIG. 6 illustrates an exemplary model training pipeline for refining machine learning models used to evaluate and classify message-based threats, in accordance with various embodiments. In this example, a set of training data 602 is collected from operational outputs of various agents and subsystems described herein (e.g., media feature analysis system 106, user context refinement system 108, response synthesis system 110) to train machine learning models 606 optimized for intent detection, message classification, and interpretive signal synthesis.

Training data 602 includes structured and unstructured message records such as vectorized features, classifier outputs, user interaction responses, prompt variables, and system-generated pillar scores. These records are annotated with final outcomes (e.g., confirmed scam, safe message), intermediate confidence levels, and prompt rationales used during message refinement. In certain embodiments, training data 602 is augmented with synthetic examples generated through controlled perturbation of prompt variables, message masking, or simulated attack vectors, to improve model resilience against ambiguous or adversarial content.

In various embodiments, training data 602 undergoes preprocessing in training module 604 to normalize scoring metadata, align schema versions, and standardize feature encodings. Preprocessing may include logit-space transformation of scalar values, dimensionality alignment for embedding vectors, and normalization of prompt variable formats. Training module 604 uses supervised learning techniques to train message classification models 606 that interpret composite risk signals derived from multimodal content, classifier predictions, and user-interaction feedback.

Machine learning models 606 may include transformer-based scoring models, prompt-conditioned inference models, and confidence calibration models. The models are trained to process structured message representations and to replicate or enhance the decision logic executed by anomaly detection system 105. In some embodiments, the training pipeline includes embedding projection networks used to align feature spaces across message types (e.g., promotional offer, impersonation, misinformation), enabling cross-type generalization and improved scoring reliability.

After training, models are evaluated using a separate testing module 608 with testing data 610. Testing data 610 includes previously unseen message records, prompt responses, and classifier outputs that were excluded from training. These samples are used to compute model performance metrics such as classification accuracy, score calibration error, and agent consensus divergence. For example, testing may involve evaluating how reliably a trained scoring model reproduces prior pillar scores or whether updated prompt-conditioning logic alters downstream agent outputs beyond acceptable thresholds. If testing criteria are satisfied, models are deployed for production use in classifier module 612.

Classifier module 612 processes incoming message data 614—such as vectorized features generated by media feature analysis system 106 or response embeddings returned by user context refinement system 108—and produces classification outputs 616, which may include message type labels, pillar-aligned scores, summary rationale, and system recommendations. In certain embodiments, classifier module 612 applies multi-stage classification using sequential or ensemble models to account for uncertainty, agent disagreement, or partial input signals.

Model training pipeline supports continuous learning by incorporating updated data from operational deployments. For example, message state manager 506 and training signal collector 512 (as described in FIG. 5) may provide updated message outcomes, score revisions, and user input data that feed into retraining cycles. Orchestration system 112 manages training triggers and deployment scheduling, allowing system-wide model performance to evolve based on empirical usage patterns and observed failure modes.

In certain embodiments, training pipeline incorporates unsupervised clustering or self-supervised learning to identify patterns in unannotated message data. For example, clusters of high-entropy message vectors may be flagged for analyst review or model refinement. Additionally, model training pipeline includes telemetry monitoring logic to track score consistency, feature drift, and prompt sensitivity in real time, supporting rollback or retraining when performance degradation is detected.

FIG. 7 illustrates an example process for determining and refining training data utilized to improve model performance in a distributed message evaluation system, in accordance with various embodiments. In an embodiment, this process is implemented within training system 116 to improve classification accuracy, scoring stability, and interpretability across media feature analysis system 106, user context refinement system 108, and response synthesis system 110. The refined training data supports the development and retraining of various machine learning models used to evaluate message content, structure, context, and behavioral signals under supervision of orchestration system 112.

The process begins at step 702, where input message data is obtained from the ingestion system 104 or via feedback collection pathways from downstream systems (e.g., agent handoff controller 510 or training signal collector 512). This message data may include raw inputs (e.g., original user-submitted content), structured feature vectors, pillar evaluation scores, prompt variables, message classification outcomes, and user interaction metadata. In certain embodiments, the message data includes derived annotations (e.g., urgency flag, impersonation likelihood, domain entropy) computed by the upstream scoring pipeline.

At step 704, the system determines whether the message data includes the classification attributes necessary for supervised training or scoring calibration. This includes checking for presence of labeled outcomes (e.g., confirmed scam vs. false positive), sufficient vector feature coverage (e.g., link model score, pillar diversity), or observed user engagement signals (e.g., prompt response, clarification submitted). For example, a message with downstream human-labeled outcome data and a complete classifier output set may qualify for inclusion, while a message lacking sufficient structure or feature vector completeness may be deferred.

A determination is made at step 706 regarding whether the message is eligible for training inclusion. If eligible, the system proceeds to step 708 to tag the message data with relevant metadata—such as session ID, model version, scoring rationale, or embedding lineage—before storing it for training set assembly or model evaluation. If the message is not eligible, it is excluded from training at step 710. In certain embodiments, excluded messages are archived for error analysis or retained for synthetic augmentation (e.g., prompt injection testing or counterfactual generation).

At step 712, the system evaluates whether the current training set meets completeness thresholds. These thresholds may include coverage across message types (e.g., promotional scam, account impersonation), distribution across scoring strata (e.g., low-confidence, high-urgency), or alignment with model retraining goals (e.g., bias reduction, threshold calibration). If completeness is not met, the process loops back to step 702 for further data collection.

If training set completeness is achieved, the process advances to step 714, where the assembled message data and labels are stored in training data repositories used by training system 116. These may include structured vector logs, annotated prompt-response pairs, or filtered agent scores with outcome associations. This training set may then be used to update one or more model components described in FIG. 6, including transformer-based classifiers, pillar evaluation engines, or scoring normalization models.

In accordance with various embodiments, this process enables adaptive training of system components based on operational message data and observed scoring performance. For example, vectorization module 214, intent scoring and pillar evaluation engine 210, and link analyzer engine 211 may all be retrained using datasets assembled through the process. Feedback loops from orchestration system 112 and model performance log datastore 220 may further refine which message types are prioritized for inclusion, promoting improved robustness and contextual fidelity during downstream evaluations.

The training process described in FIG. 7 supports dynamic adaptation in message classification systems operating in adversarial environments, allowing detection pipelines to continuously evolve based on novel messaging patterns, evasion tactics, or user-reported outcomes. In certain embodiments, this process also enables the use of contrastive learning, synthetic augmentation, or uncertainty-based sampling to optimize training data selection and improve model generalizability.

Figure 8:
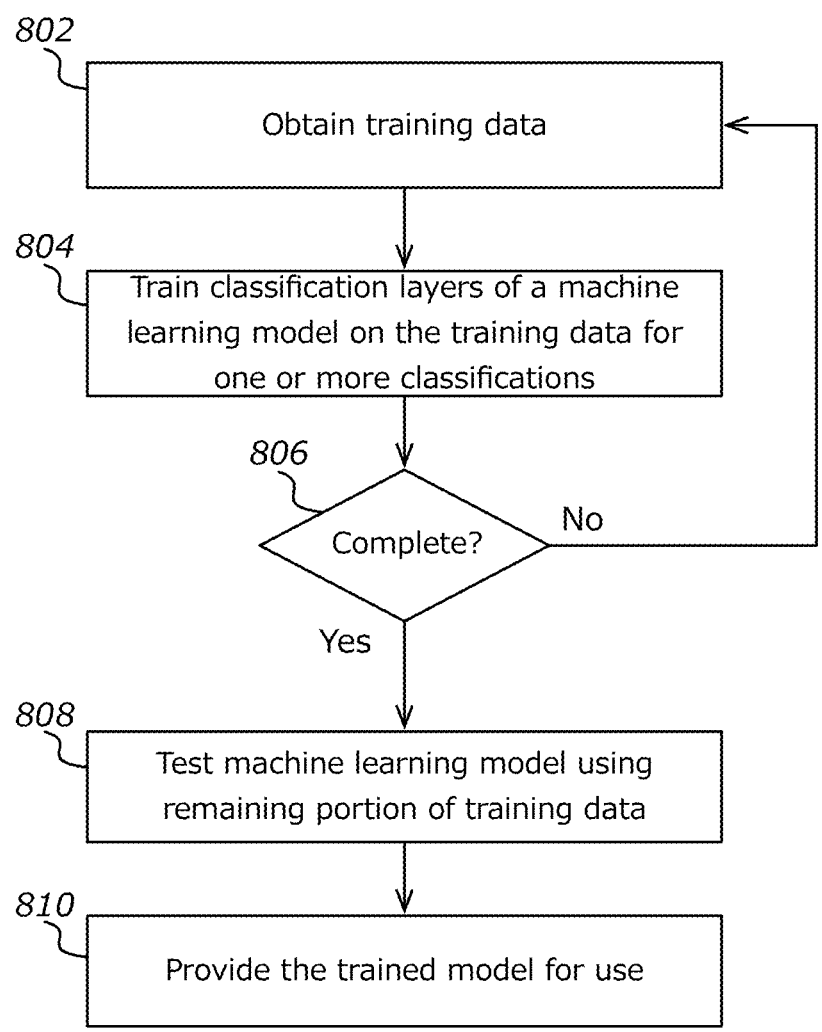
FIG. 8 illustrates a training pipeline for the response synthesis system in accordance with various embodiments.

FIG. 8 illustrates an example process for training and deploying model components within a distributed message evaluation system, in accordance with various embodiments. This process is implemented within training system 116 to improve the scoring accuracy, interpretive fidelity, and multi-agent consistency across media feature analysis system 106, user context refinement system 108, response synthesis system 110, and orchestration system 112. The trained models are deployed to enhance components such as feature extraction module 206, message-type classifier 208, intent scoring and pillar evaluation engine 210, vectorization module 214, and confidence calibration module 412.

The process begins at step 802, where the system collects training data from feature vector datastore 218, model performance log datastore 220, user interaction log datastore 318, and downstream agent logs (e.g., from agent handoff controller 510 or training signal collector 512). The training data may include annotated message inputs, structured feature vectors, classifier outputs, pillar evaluation scores, prompt-response sequences, vectorized embeddings, and associated metadata. In certain embodiments, the training dataset also includes system-generated rationales, outcome labels (e.g., confirmed false positive, verified scam), and prompt variables associated with previous message evaluations.

At step 804, the collected data is used to train or fine-tune one or more model components. These may include transformer-based classifiers (e.g., for message-type detection), scoring vector generators (e.g., for intent or pillar evaluation), or embedding models used in vectorization module

214. The training phase adjusts model parameters—such as attention weights, threshold coefficients, or embedding projection layers—to improve alignment with observed outputs and refine interpretive behavior under varying message structures or source conditions. In certain embodiments, retraining targets classification confidence calibration, vector similarity alignment, or prompt sensitivity reduction.

At step 806, the system determines whether training is complete or a predefined stop condition has been met. Stop conditions may include convergence on performance metrics (e.g., reduced calibration error, improved recall), completion of training epochs, or identification of diminishing returns on evaluation accuracy. If training is not complete, the system returns to step 802 to incorporate additional examples or update training configurations (e.g., learning rate, input sampling logic, pillar weightings) for further refinement.

If the stop condition is satisfied, the process proceeds to step 808, where the trained model(s) are evaluated against a reserved validation or testing set. This evaluation includes analysis of output consistency, classification agreement across agents, sensitivity to prompt variables, and stability of score distributions under adversarial input variance. For instance, a pillar scoring model may be tested against known user-interaction messages to confirm accurate detection of urgency, impersonation framing, or financial lure presence. The system may also analyze embedding quality using vector similarity benchmarks or response alignment scores.

At step 810, if the models pass validation thresholds, they are finalized and deployed across the relevant system components. These may include: media feature analysis system 106 (e.g., for updated feature scoring logic), user context refinement system 108 (e.g., for improved prompt generation and vector alignment), and response synthesis system 110 (e.g., for refined confidence calibration or answer integration). The updated models are versioned, checkpointed, and made accessible to orchestration system 112 for integration into runtime coordination logic and score synthesis workflows.

In accordance with various embodiments, this training process supports iterative learning cycles driven by operational feedback, agent disagreement signals, or system-triggered retraining conditions. For example, if model performance log datastore 220 detects drift in impersonation classification accuracy or an increase in threshold instability during score fusion, the system may automatically invoke this training loop to refresh the affected model weights. The process also supports fine-tuning via user interaction data captured in user context refinement system 108, enabling the system to adapt to evolving messaging patterns, evasion tactics, or user behavior signatures over time.

Figure 9:
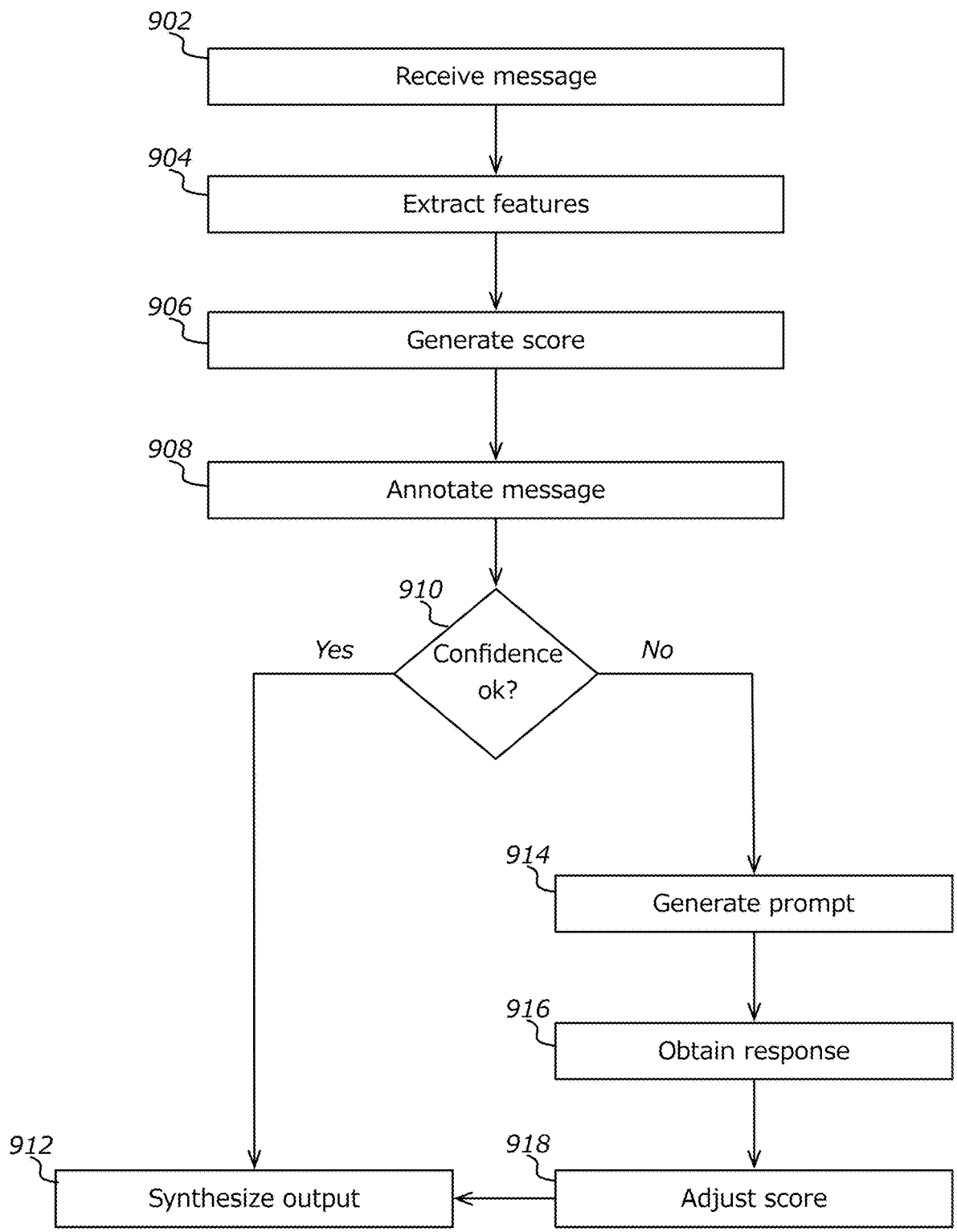
FIG. 9 illustrates an example process for coordinated message classification and refinement in accordance with various embodiments.

FIG. 9 illustrates an example process flow for adaptive message evaluation, refinement, and classification in accordance with various embodiments. The steps shown represent machine-executed operations that may be performed in sequence, in parallel, or conditionally based on system configuration. The process includes extracting features from an incoming message, generating classification scores, evaluating confidence thresholds, optionally invoking refinement interactions, and synthesizing a final output based on updated scoring logic. The process may include additional steps, fewer steps, or be executed in a different order without departing from the scope of the invention, as would be apparent to a person of ordinary skill in the art.

At step 902, the system receives a message for evaluation. In various embodiments, the message may originate from sources including user device(s) 155, third-party messaging platforms, monitored communication channels, or event-driven integration APIs. The message may take the form of a text-based communication, multimedia post, marketing broadcast, system alert, or user-generated content that includes embedded visual assets, hyperlinks, or structured metadata. Upon receipt, the system registers the message with a unique identifier, logs its receipt timestamp, and associates the message with source-specific attributes such as origin domain, device profile, or message channel. In certain embodiments, the incoming message is stored in a transient processing queue for asynchronous evaluation. Metadata captured at this stage may include initial content hashes, message encoding format, sender classification (e.g., known contact, unknown sender, organizational origin), and high-level routing flags. For example, a promotional message received through a monitored messaging API may be labeled with a "user-sent" channel type and a "suspicious domain" flag if the URL matches a previously seen domain with low reputation. The message and associated metadata are then passed to the next stage of processing for feature extraction at step 904.

At step 904, the system is operable to extract structured and semi-structured features from the received message to support risk analysis and interpretive evaluation. In various embodiments, this includes parsing the message content for linguistic patterns, embedded objects, visual attributes, source metadata, and link-based indicators. The system applies a modular feature extraction pipeline capable of analyzing multi-modal inputs including text, image, and hyperlink components. Extracted features may include token sequences, stylometric markers, OCR-derived content, visual layout cues, URL reputation scores, redirect depth, domain entropy, and positional flags denoting suspected manipulative elements. In one implementation, the system detects that a received message contains an image with superimposed text and a shortened hyperlink. The image is processed using an OCR engine to extract embedded phrases, while the URL is resolved through link expansion to retrieve the final destination domain. The system then queries a domain reputation index and calculates a link entropy score, appending this to the structured feature set. Additional features such as font type, emoji density, and proximity of urgent language (e.g., "limited time," "reset your account") are also included as signals for analysis. In certain embodiments, features are annotated with extraction fidelity metadata and tagged with source-origin indicators (e.g., "user-submitted", "third-party forwarded", "platform-pulled") to enable traceability across stages. These extracted features are stored temporarily in message processing memory or routed through a message vectorization pipeline for concurrent representation. The complete structured feature set is passed to the scoring module at step 906 for interpretation by classifier models and scoring pillars.

At step 906, the system is operable to apply one or more scoring models to the extracted features to generate structured classification outputs and intent-aligned confidence values. In various embodiments, this includes executing multiple model pipelines or classification pillars, each designed to assess distinct interpretive dimensions of the message. These may include, without limitation, message type, malicious intent, manipulative framing, urgency cues, financial bait patterns, and anomalous link behavior. Each model emits a score or structured output representing the system's evaluation of the message along its respective interpretive axis.

More specifically, the system may invoke a transformer-based classifier to determine message type probabilities (e.g., impersonation, promotion, informational alert), an intent scoring engine to compute pillar-specific risk vectors, and a link analyzer to evaluate domain credibility and redirect patterns. These models may operate on shared or partitioned subsets of the feature set generated at step 904. In some embodiments, the models also emit intermediate outputs such as latent embeddings, attention heatmaps, or rationale justifications to support later prompt generation or signal traceability.

For example, if a received message includes stylized visual content and a hyperlink masked as "click here," the message type classifier may return a 0.87 confidence score for the "promotional scam" label, while the intent engine identifies strong urgency and reward-framing cues. The link analyzer may determine that the destination domain was registered within 48 hours and has no established reputation score, generating a link risk score of 0.78. These individual scores are aggregated into a structured classification vector.

In certain embodiments, the system applies normalization routines or score calibration logic to ensure interpretability across different scales. For example, if aggregate scoring across multiple pillars exceeds a defined threshold (e.g., 1.0), normalization or proportional redistribution may be applied to retain fidelity while preserving relative score strengths. The complete score vector is passed to the annotation module at step 908 for structured tagging and message interpretation.

At step 908, the system is operable to annotate the message with structured metadata, scoring outputs, and control variables derived from the classification outputs generated in step 906. These annotations provide a machine-readable representation of the system's evaluation and serve as the technical substrate for subsequent response decisions, prompt generation, or user interface signaling. In various embodiments, annotation involves appending the message object with fields that reflect classification labels, pillar scores, link analysis indicators, and interpretive flags, as well as embedding identifiers, versioning data, and routing metadata.

More specifically, the system constructs a metadata envelope that includes attributes such as message_type, risk_vector, confidence_scores, link_risk, model_version, and timestamp. For example, if a message is classified as a high-risk promotional offer with elevated urgency and a suspicious link, the annotated message may include entries such as message_type: "promotion", urgency_score: 0.82, link_risk_score: 0.78, and risk_level: "high". In some embodiments, the system also generates and attaches prompt variables (e.g., urgency_flag: true, link_present: true) that may be used if user clarification is required.

The annotation process may further include tagging individual message components with interpretive labels or control codes. For example, phrases like "claim your reward" may be bracketed with inline tags such as [REWARD_PHRASE], or links may be wrapped with tags indicating redirect depth or domain reputation class. These annotations are not visible to the end user but are consumable by coordination logic, prompt generators, or synthesis engines in later steps.

In certain embodiments, annotations are formatted in a schema-conformant structure and written to the message state store for traceability. These records include a full trace of how the message was evaluated, scored, and annotated at this stage, enabling transparent evaluation in future refinement or escalation cycles. The annotated message is then evaluated at step 910 to determine whether further interaction is required.

At step 910, the system evaluates whether the classification confidence associated with the annotated message satisfies a configured confidence threshold. This threshold evaluation determines whether the message can proceed to synthesis without additional clarification or must be routed through an interaction loop for refinement. In one implementation, the system compares one or more aggregated confidence scores—such as a combined pillar score, link classifier certainty, or overall message classification probability—against a configured threshold value. If the threshold is satisfied (e.g., met or exceeded), the message proceeds to step 912 for synthesis. Otherwise, the message continues to step 914 for user engagement.

In various embodiments, the confidence threshold may be static (e.g., 0.85) or dynamically configured based on contextual inputs, model type, or orchestration policy. For example, orchestration system 112 may assign higher thresholds to messages originating from unknown senders or containing shortened URLs, while applying lower thresholds to internal system messages or previously validated contacts. Threshold parameters may be set manually by system administrators, inferred through policy modules, or adjusted via real-time telemetry and model performance monitoring (e.g., using calibration metadata from model performance log datastore 220).

In one example, a message classified as a promotional scam may receive the following pillar scores: message type score of 0.93, intent pillar score of 0.87, and link risk score of 0.91. If the system's configured confidence threshold is 0.85, and the combined pillar scores and associated confidence values satisfy the predetermined threshold conditions, the message may bypass user context refinement and proceed directly to response synthesis. The threshold evaluation ensures that only messages requiring additional context trigger user prompting, enabling immediate classification when system confidence is high while preserving the option for clarification when uncertainty exists.

At step 912, the system synthesizes the final classification output based on the annotated message and the associated confidence signals. This synthesis operation generates a structured response record that includes the predicted message category, risk indicators, and supporting metadata to be used by subsequent enforcement or logging components. The synthesized output may include classification labels (e.g., "promotional scam," "credential phishing," "benign communication"), scalar risk scores, decision justifications, and model attribution data.

In various embodiments, the synthesis process includes consolidating signals from multiple classification pillars, agent-specific evaluations, and link analysis features. These signals may be weighted or normalized according to orchestration system 112's score reconciliation policy, which considers signal origin, model versioning, and prior session outcomes. The output structure may also incorporate lineage tags, such as the UUID of the message, timestamps, the scoring path taken, and model checkpoints used during inference.

For example, a message classified as "credential phishing" may yield an output structure with: (i) final classification label= "phishing," (ii) combined score=0.91, (iii) contributing pillars={urgency: 0.87, link_risk: 0.93, impersonation: 0.89}, (iv) model path= {transformer-v2.3+ heuristic-adjustment-1.4}, and (v) timestamp=2025-07-23T16: 34:12Z. This synthesized output is stored and optionally routed for downstream enforcement, alerting, or storage in model performance log datastore 220.

In some implementations, the output synthesis step includes optional risk tagging logic that annotates the message record with operational labels (e.g., "quarantine required," "show warning banner," "log-only"). These annotations may be derived from predefined rules or generated via agent coordination interface 216, depending on deployment policy. The synthesized output concludes the message evaluation pathway for cases where confidence thresholds are met.

In the situation where the confidence score does not satisfy the confidence threshold, the system proceeds to step 914, where a clarifying prompt is generated to obtain additional input prior to final classification. This prompt generation step is operable to construct a context-sensitive question that targets the source of uncertainty identified during prior evaluation stages. The goal is to elicit disambiguating information from the user or external source that may assist in refining the risk interpretation or classification outcome.

In various embodiments, the prompt is generated using context prompt generator 306 of user context refinement system 108. The generator receives the annotated message, confidence scores, scoring deltas across classification pillars, and a summary of which features contributed most to the ambiguity. Based on this information, the system selects a predefined prompt template-retrieved from prompt schema datastore 320—and fills in variable slots using structured values from feature annotation and prompt variable engine 212. The result is a grammatically complete prompt that references specific message attributes or behaviors. In various embodiments, the system may generate binary (yes/no) questions, open-ended questions, or multiple-choice questions, depending on the type and source of ambiguity identified in the message evaluation. This format may be selected based on scoring uncertainty, model entropy, or prompt schema configurations retrieved from prompt schema datastore 320.

For example, if the message includes a shortened link and ambiguous intent language, and the impersonation pillar score is inconclusive, the system may generate the prompt: "Does this message appear to come from a trusted sender or impersonate a known organization?" This prompt is then routed via agent coordination interface 216 to initiate the user interaction process described in steps 916 and 918.

In certain embodiments, prompt selection incorporates user or session-specific history, including past interactions, recent message types, or prior classifications involving similar feature sets. Additionally, the system may apply prompt entropy scoring to ensure that the selected prompt is likely to yield high informational gain based on the nature of the ambiguity. The generated prompt is stored along with the message context and used to orchestrate subsequent refinement operations.

At step 916, the system obtains a response to the generated prompt issued in step 914. This response may be collected from a user, an automated agent, or an integrated data source depending on the deployment configuration and interaction channel. In an embodiment, the system presents the generated prompt via a user-facing interface—such as an email client banner, a secure messaging portal, or a mobile application notification—and receives the response in natural language or structured format. The system associates the received response with the corresponding message identifier and context state for integration into subsequent classification refinement.

In various embodiments, the response may include confirmation of message legitimacy, identification of the sender's authenticity, or clarification of ambiguous intent indicators. For example, if the prompt was "Does this message appear to come from a trusted sender or impersonate a known organization?", the user may respond with "This looks like it's pretending to be PayPal." The system captures this input and prepares it for semantic parsing and vectorization in step 918. If the system is configured for agent-based feedback, the response may instead come from a secondary classifier or signal enrichment module that applies rule-based or model-inferred logic to supply the required information without direct user involvement.

In one implementation, the system includes metadata with the response capture, such as response timestamp, interaction delay, user confidence level (if requested), or message state at time of prompting. These attributes are logged in user interaction log datastore 318 and referenced during score adjustment to support auditability and longitudinal model evaluation. Additionally, in some embodiments, response quality heuristics—such as response length, specificity, or contradiction with prior context—may be computed to influence how the input is weighted during reclassification in step 918.

As used herein, the term "response" refers to a message, input, or feedback signal received in response to a clarification prompt, including both natural language and structured form. Responses may be supplied directly by an end user, derived from contextual policy inputs, or inferred by auxiliary modules, and are used to refine risk interpretation, resolve ambiguity, or support multi-agent consensus in subsequent stages of message evaluation.

At step 918, the system adjusts the classification score based on the response obtained in step 916. This adjustment process is operable to refine the risk interpretation or category assignment associated with the message by incorporating additional semantic context, disambiguating cues, or user-affirmed input. The adjustment logic may involve reweighting existing confidence scores, updating classification vectors, or executing a secondary evaluation routine that integrates the response as a new feature input.

In various embodiments, the system parses the user-provided or agent-supplied response using response interpretation module 310, converting it into structured signals such as binary flags, confidence modifiers, or semantic embeddings. These structured signals are then passed to refined signal propagation module 314, which recalculates pillar-specific scores or message-level risk vectors using updated inference rules. For example, if a user confirms that a message impersonates a known brand, the impersonation pillar score may be boosted, triggering a reclassification to "credential phishing" with elevated risk severity.

The system may also compare the updated classification result with the original output to determine whether the response materially changes the risk profile or message category. In one implementation, agent coordination interface 316 is operable to flag significant score deltas for logging or post-review, especially if the adjusted output crosses a configured threshold boundary (e.g., from "low risk" to "elevated risk").

In certain embodiments, the updated score is propagated through the same synthesis logic described in step 912, resulting in a revised classification output that incorporates both initial model inferences and response-informed adjustments. The adjusted result is then routed for output formatting and delivery, completing the message evaluation pathway. In the event that the response does not meaningfully alter the classification (e.g., ambiguous or contradictory response), the system may default to the initial output with a confidence modifier or alert flag for further manual review.

Once the updated scores are computed, the system transitions to step 912 to synthesize the final classification output based on the adjusted evaluation context.

At step 912, the system synthesizes the final classification output based on the adjusted confidence signals and refined annotations generated during steps 916 and 918. This synthesis operation is operable to consolidate model-inferred and user-augmented insights into a unified output structure representing the system's interpretation of the message's nature, risk level, and intended action. This marks the resolution of the message evaluation pathway for cases requiring interaction-based refinement.

In various embodiments, the synthesized output includes a final classification label (e.g., "credential phishing," "malware lure," "benign communication"), scalar or vectorized risk scores, contributing signal breakdowns (e.g., urgency pillar=0.87, impersonation pillar=0.91), and a provenance trace of how the classification evolved over the processing flow. For example, the system may embed both the original model-inferred label and the revised label post-user input, along with associated timestamp and model version metadata.

The final output may also include prompt lineage references, indicating which question templates were used, what response was provided, and which components adjusted their scores. In certain embodiments, agent coordination interface 316 appends coordination metadata such as prompt UUID, response entropy score, and delta vector magnitude to support subsequent analysis, retraining logic, or transparency reporting.

The completed output is formatted for routing to enforcement, alerting, or archival destinations. For example, the output may be passed to response formatting and packaging module 414 of FIG. 4, stored in model performance log datastore 220 of FIG. 2, or surfaced to a system dashboard for operator review. In some implementations, outputs are tagged with operational instructions—such as "quarantine," "annotate and deliver," or "no action"—derived from the classification result and system policy configuration.

This synthesis step concludes the classification sequence for the message. The resulting output reflects both model-generated confidence signals and any refinements derived from user interaction. The structured result-including classification label, associated scores, and attribution metadata—is recorded for use in logging, auditing, or downstream enforcement, as applicable. Subsequent messages are evaluated using the same process flow, beginning at step 902.

Figure 10:
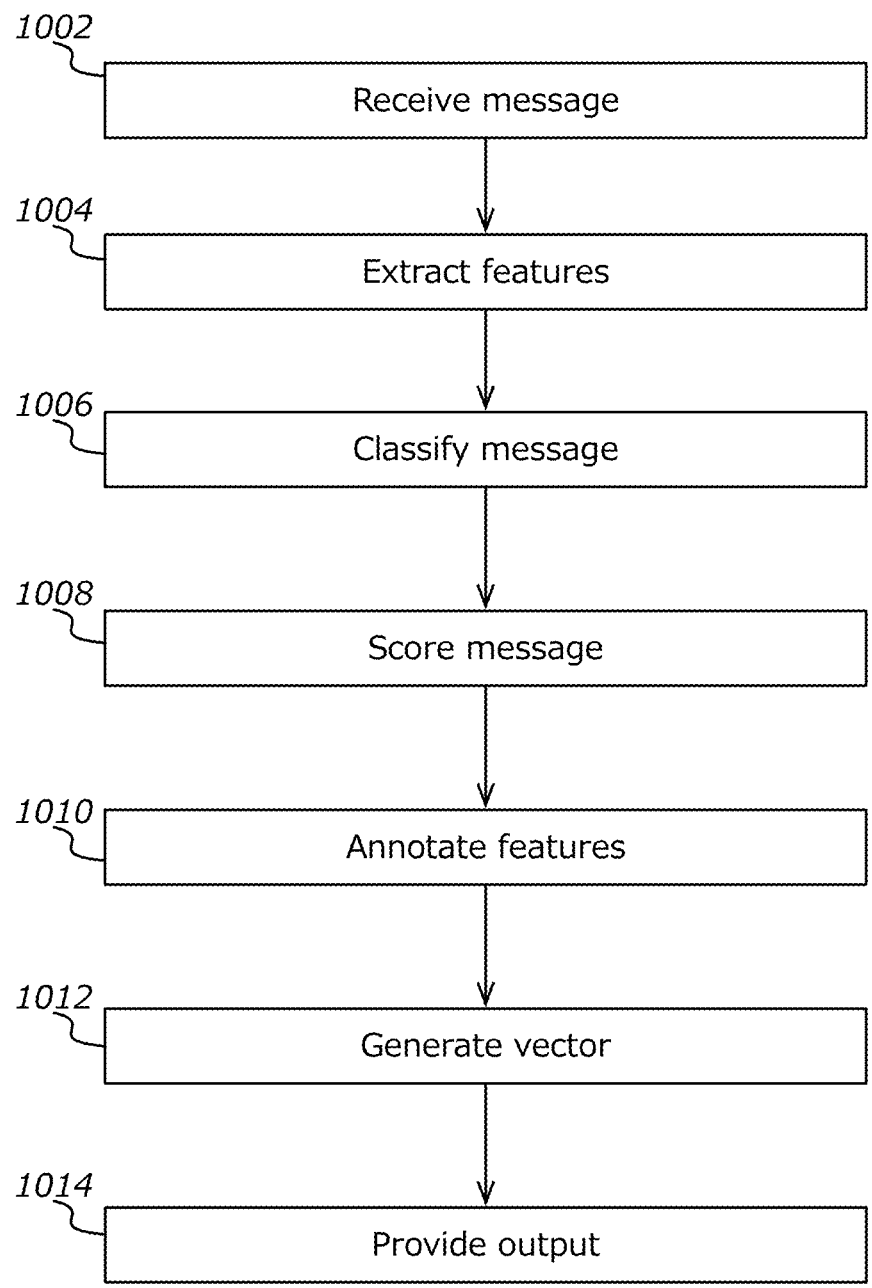
FIG. 10 illustrates an example process for classification in accordance with various embodiments.

FIG. 10 illustrates an example end-to-end evaluation process for transforming a received message into a structured classification output, in accordance with various embodiments. The steps shown represent operations performed by one or more components of the system, including media feature analysis system 106, user context refinement system 108, and response synthesis system 110. The process describes the transformation path in which a message is received, interpreted, and evaluated using trained models, feature annotation, and vector-based scoring, culminating in a synthesized classification output. The process may include additional steps or variations without departing from the scope of the invention.

At step 1002, a message is received for evaluation. This message may originate from user device(s) 155, integrated messaging platforms, or backend services and can include text, structured metadata, embedded URLs, and contextual headers. The message may be received via secure API, messaging queue, or platform integration and is registered within the orchestration system for processing.

At step 1004, the system extracts features from the received message. These features include surface-level content (e.g., tokens, subject line, sender information), structural cues (e.g., link presence, formatting artifacts), and contextual indicators (e.g., urgency phrases, impersonation patterns). Feature extraction module 206 may invoke specialized subroutines, including link analyzer engine 211 and intent scoring and pillar evaluation engine 210, to compute domain reputation scores, intent classifications, and confidence values associated with behavioral signals.

At step 1006, the system classifies the message using model-based evaluation. This may involve the application of transformer-based classifiers, logistic scoring functions, or ensemble logic across distinct classification pillars. Classification outputs may include predicted message types (e.g., phishing, spam, benign), as well as intermediate scores and confidence signals from specific classifiers or evaluators, each of which may be weighted by model lineage, message structure, or contextual source.

At step 1008, the system computes one or more risk or intent scores for the message, informed by classifier outputs and pillar-specific evaluations. These scores may be aggregated, normalized, or dynamically adjusted based on scoring policies defined by orchestration system 112. For example, a phishing likelihood score may be computed using an average or weighted combination of impersonation pillar strength, link entropy score, and urgency classifier output.

At step 1010, the system annotates extracted features with prompt variables and semantic tags. Feature annotation and prompt variable engine 212 converts raw and derived features into structured artifacts such as binary flags, scalar values, and inline annotations (e.g., [LINK_PRESENT], [TRIGGER_PHRASE]) that are used to configure downstream evaluation or prompt logic. These annotations serve as internal control signals and are aligned to a variable schema that supports consistency across session evaluations.

At step 1012, the annotated message is converted into one or more vector embeddings. Vectorization module 214 applies encoding logic to project structured annotations, classification scores, and raw message attributes into an embedding space compatible with the system's model training configuration. This may include concatenated channel encodings, logit-space transformations, or pooled feature representations, which preserve semantic and categorical relationships necessary for similarity scoring and inference.

At step 1014, the system generates the final classification output, including one or more structured message labels, score summaries, and associated metadata. This output may be formatted for internal enforcement systems, external alerting pipelines, or archived within model performance log datastore 220. The output record may include lineage tags (e.g., UUID, scoring path, model version), justification fields, and operational risk annotations used for follow-up triage, feedback refinement, or compliance logging.

Figure 11:
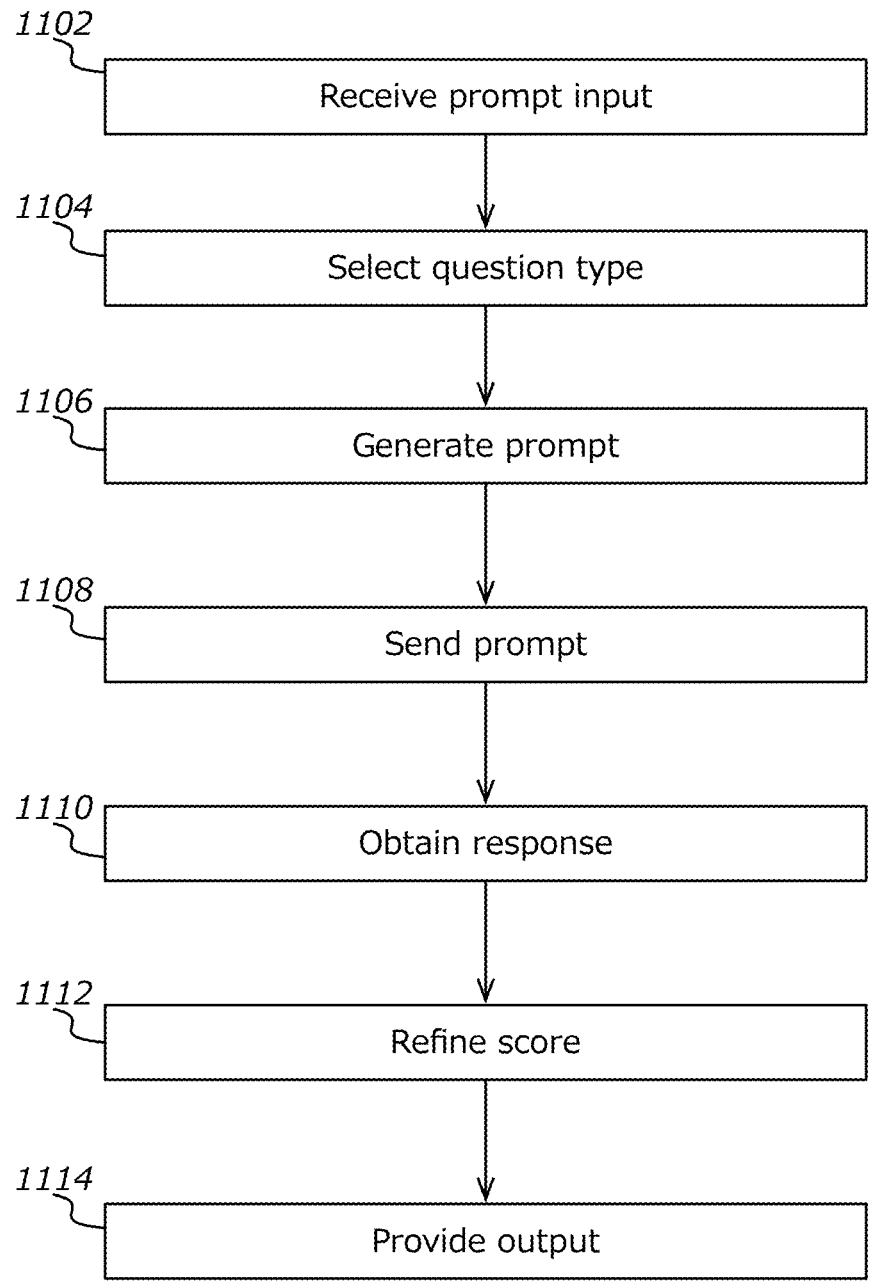
FIG. 11 illustrates an example process for question generation and response capture in accordance with various embodiments.

FIG. 11 illustrates an example process for generating and using interactive prompts to refine message classification outcomes in a multi-agent message evaluation system, in accordance with various embodiments. The steps shown represent operations performed during interactive clarification sequences, such as those governed by user context refinement system 108 and orchestrated through coordination with response synthesis system 110 and orchestration system 112. This process enables the system to selectively engage clarification logic when confidence thresholds are not met, as described previously in FIG. 9.

At step 1102, the system receives a prompt input trigger based on one or more conditions associated with message uncertainty or ambiguity. In an embodiment, this includes detection that a message's classification confidence is below a defined threshold, or that score variance across classification pillars is too high to warrant automatic synthesis. The input includes annotated message features, preliminary classification signals, and vector-based scoring indicators that identify why prompt-based clarification may be necessary.

At step 1104, the system selects a question type appropriate for the ambiguity at issue. The selection may be based on which classification pillars showed uncertainty (e.g., impersonation, urgency), or on specific features (e.g., suspicious sender domain, use of a URL shortener). In some implementations, the system uses an internal prompt schema index—such as prompt schema datastore 320—to determine a best-match question template based on scoring deltas, entropy levels, or session history. For example, if the link classifier score was inconclusive, the system may choose a question type related to sender trustworthiness or intent confirmation.

At step 1106, the system generates a clarification prompt using the selected template. The template includes variable slots populated using contextual values extracted from the message—such as sender identity, message tone, or structural cues. The resulting prompt may take the form of a natural language question posed to the user (e.g., "Does this message appear to come from someone you know?") or an internal clarification request passed to another system or agent. The prompt generation process may also incorporate rules about prompt length, disambiguation strength, or anticipated informativeness.

At step 1108, the system sends the generated prompt to the appropriate recipient. In various embodiments, this includes routing the prompt to the user through a user interface, or to an internal clarification module for synthetic response generation. This routing step is governed by coordination logic, such as that managed by agent coordination interface 216, and may depend on session priority, risk level, or deployment configuration (e.g., manual vs. automated refinement).

At step 1110, the system obtains a response to the prompt. This response may include a binary answer (e.g., yes/no), a short natural language reply, or a structured signal indicating user feedback. The system captures this response and aligns it with the original message context. In certain embodiments, this step includes validation of the response format, timestamp association, and attachment of prompt-response linkage metadata for traceability.

At step 1112, the system refines the message score based on the received response. This refinement may involve updating one or more pillar scores, recalculating the combined classification score, or modifying message-level annotations. For example, a user response indicating that the sender is unrecognized may increase the impersonation score and push the overall risk score above the synthesis threshold. In some embodiments, vector delta methods or embedding interpolation techniques are used to apply the clarified signal to the message representation.

At step 1114, the system provides the final classification output using the refined score and updated message annotations. This output may be routed to logging systems, enforcement engines, or visualization interfaces depending on the system's configuration. The prompt-response exchange and resulting classification decision are recorded as part of the message's evaluation lineage, allowing subsequent training or audit operations to incorporate the clarified outcome.

Figure 12:
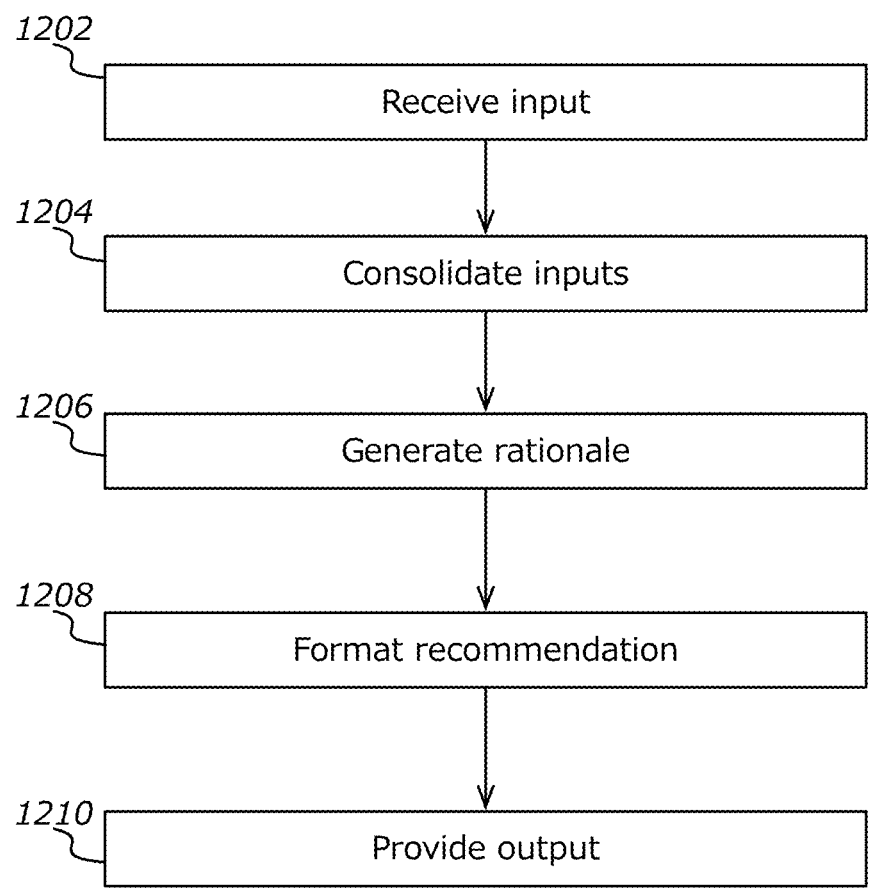
FIG. 12 illustrates an example process for synthesis in accordance with various embodiments.

FIG. 12 illustrates an example process for synthesizing and formatting a recommendation based on message classification results, user interaction data, and model-inferred rationale, in accordance with various embodiments. This process is implemented within response synthesis system 110 to generate structured recommendations that can be acted upon by downstream security, notification, or review systems. The operations shown may be executed in sequence or in modified order, and may be performed by one or more components described in FIG. 4, including recommendation synthesis engine 408, message-response mapping module 410, and response formatting and packaging module 414.

At step 1202, the system receives input data comprising annotated message records, classification labels, scalar confidence scores, and optionally, user-submitted responses collected through interaction workflows. This input may originate from user context refinement system 108 or be routed directly from orchestration system 112. For example, a message flagged as "potential credential phishing" with moderate classification confidence may be accompanied by a user response confirming unfamiliarity with the sender.

At step 1204, the system consolidates the received inputs into a unified representation. This may involve aligning message-level metadata, normalizing pillar scores, integrating user responses into the message vector context, and resolving feature lineage or scoring path identifiers. In certain embodiments, the system applies a fusion heuristic or weighted combination strategy to preserve signal origin and priority—for instance, weighting user denial responses higher than borderline classifier output.

At step 1206, the system generates a rationale for the classification outcome and intended recommendation. The rationale may include a natural language justification summarizing key indicators—such as "suspicious domain link detected" or "high urgency tone with impersonation markers"—and a compact scoring breakdown. This justification may be assembled from decision trace logs, contributing pillar metrics, or prompt interaction summaries.

At step 1208, the system formats the final recommendation output in accordance with policy-defined schemas or output integration constraints. This may include generating structured JSON records for external alerting systems, rendering human-readable labels for dashboards, or attaching actionable flags (e.g., quarantine, escalate, allow) to the recommendation. The output format may vary depending on the intended destination—such as internal security consoles, client-side overlays, or archival databases.

At step 1210, the formatted output is provided to the appropriate endpoint. This may include writing the structured output record to a message handling queue for enforcement or mitigation actions (e.g., warning banners, quarantine, suppression), storing the result in model performance log datastore 220 for traceability, or returning the classification and associated metadata to an external API caller. In certain embodiments, the output is presented to the user who submitted the message for evaluation, such as via a frontend interface, browser extension, or integrated communication platform. The output may include the classification label, risk score, decision rationale, and optional guidance generated by recommendation synthesis engine 408, enabling the user to take informed action based on the system's determination.

Figure 13:
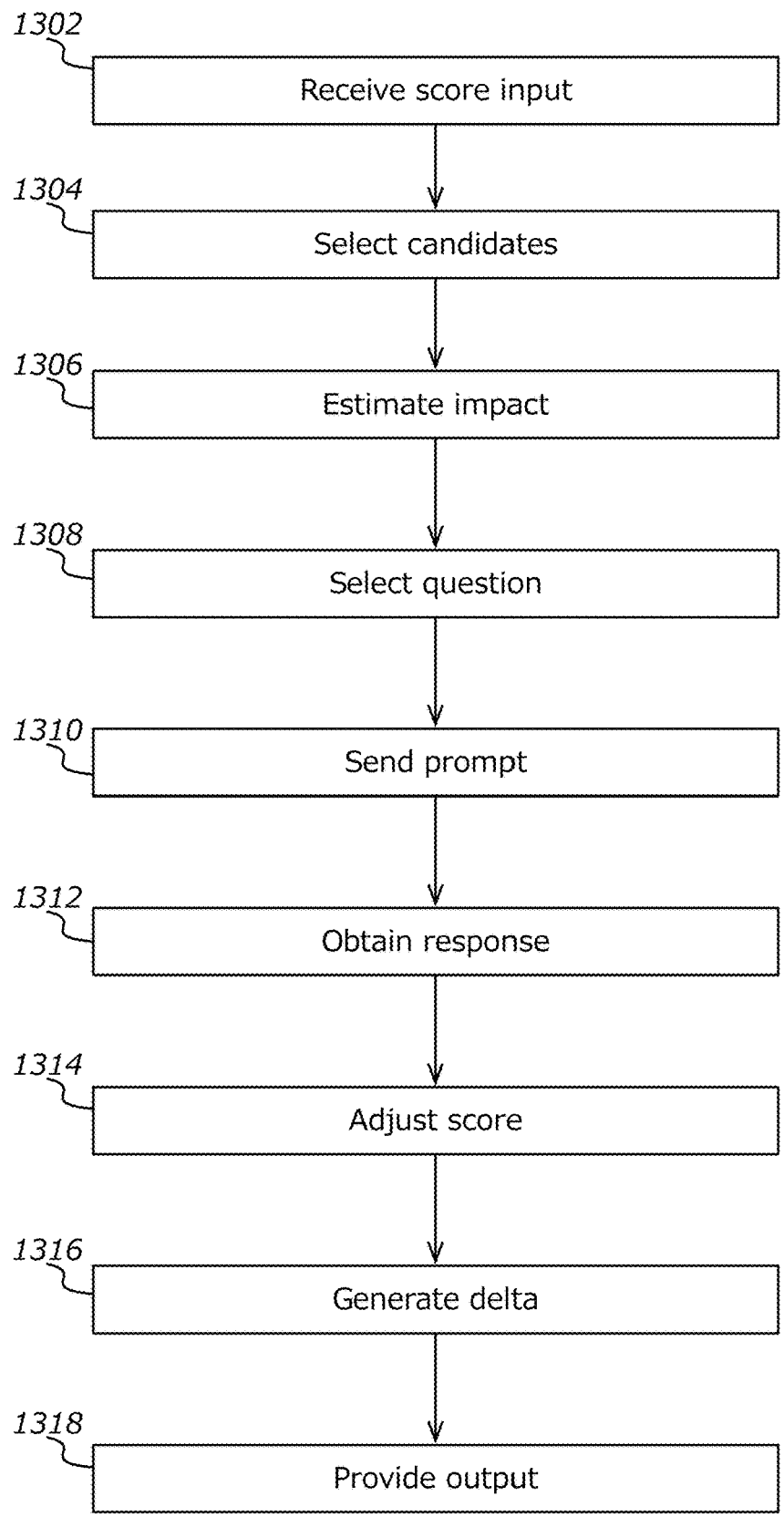
FIG. 13 illustrates an example process for dynamic prompt refinement and model reweighting in accordance with various embodiments.

FIG. 13 illustrates an example process for dynamic prompt refinement and model reweighting, in accordance with various embodiments. This process may be implemented within user context refinement system 108 to selectively engage clarification prompts, capture response-adjusted feature deltas, and recalibrate message scoring based on semantic inputs. The process supports scoring adaptability and model interpretability under orchestration system 112, particularly when confidence thresholds are not initially satisfied or when risk indicators remain ambiguous after initial classification.

The process begins at step 1302, where the system receives a score input associated with a previously evaluated message. This score input may represent a combined risk score, individual pillar assessments, intent confidence, or link risk estimates generated by components such as intent scoring and pillar evaluation engine 210 or link analyzer engine 211. In some embodiments, the score input includes metadata identifying prior prompt history, uncertainty indicators, or token-level attention metrics, enabling the system to contextualize the current evaluation state.

At step 1304, the system selects one or more candidate features or message regions to target with a follow-up prompt. This selection is operable to prioritize features that contributed disproportionately to the uncertainty or those identified as high-impact by prior model attribution. For example, the system may identify that the impersonation pillar has high variance across model checkpoints or that a specific segment of message text lacks resolution in prior embeddings. These candidates may be drawn from feature vector datastore 218 or inferred from scoring deltas observed during the initial evaluation.

At step 1306, the system estimates the likely impact of clarifying each candidate on the overall classification outcome. This estimation may involve model-internal uncertainty metrics (e.g., entropy scores, confidence intervals), expected information gain analysis, or retrieval of historical resolution patterns from user interaction log datastore 318. For instance, the system may determine that resolving a sender identity question has historically shifted classification from "benign" to "phishing" in similar messages and thus prioritize that dimension.

A prompt is selected at step 1308 based on the candidate evaluation and impact estimation. The system retrieves a corresponding prompt template from prompt schema datastore 320 and fills in variable slots using current message metadata, such as flagged features, unresolved classifications, or feature annotations from feature annotation and prompt variable engine 212. For example, if ambiguity surrounds a URL's legitimacy, the system may select the prompt, "Does the link in this message lead to a known and trusted site?"

At step 1310, the prompt is sent to the appropriate interaction surface for user input. This may involve rendering a clarification request in the user interface, issuing a message to an administrator console, or transmitting a system-generated inquiry to another agent. In some embodiments, agent coordination interface 216 orchestrates the timing and formatting of this prompt delivery based on message routing policies and session context.

The system obtains the response at step 1312. The response may be binary (e.g., "yes"/"no"), scalar (e.g., confidence slider), or free-form text, and may be processed by response interpretation module 310 to normalize the input and map it to a structured clarification vector. In certain embodiments, response capture module 308 records additional metadata, such as response delay, input modality, or confidence markers, for interpretive weighting.

At step 1314, the system adjusts the original score using the obtained response and the updated representation. This adjustment may involve reweighting the affected pillars, recomputing combined score values, or updating token-level embeddings to reflect clarified intent. For example, if the user confirms impersonation risk, the impersonation pillar score may be incremented, and the combined risk score re-evaluated under orchestration-defined rules.

A score delta is generated at step 1316 to quantify the magnitude and direction of change introduced by the user response. This delta may be logged for performance tracking, used to update score trajectories, or serve as a feature in future model retraining. In certain implementations, deltas are propagated back into training system 116 for contrastive learning or to trigger review of threshold calibration logic.

At step 1318, the adjusted classification output is provided for enforcement, audit logging, or visualization. This output reflects both model-derived and human-influenced interpretations, enabling explainable classification under dynamic input conditions. In some embodiments, the system may tag the message as "clarified" and embed lineage indicators linking the output to the prior score, prompt content, and response vector, thereby completing the refinement cycle.

The disclosure also provides support for a computing system for electronic message classification comprising: a processor, and a memory storing instructions that, when executed by the processor, cause the computing system to: receive an electronic message (e.g., an email, text message, or other user-facing message stream), generate, via a threat analysis component configured to analyze multiple threat indicators (e.g., feature, intent, and link indicators modeled by specialized subcomponents), threat assessment scores comprising: a feature threat score derived from mathematical and structural features (e.g., linguistic structure, layout attributes, numerical patterns), an intent threat score derived from semantic analysis of manipulation patterns (e.g., urgency cues, impersonation phrases, or persuasion language), and a link threat score derived from embedded link analysis (e.g., using mathematical heuristics and transformer-based semantic modeling), wherein the threat analysis component includes a feature analysis component that generates the feature threat score (e.g., by applying heuristics to tokenized message structure), an intent analysis component that generates the intent threat score (e.g., via intent classification routines for subcategories of malicious narrative), and a link analysis component that generates the link threat score (e.g., by evaluating URLs using anomaly detection and semantic embeddings), and wherein each threat assessment score has a respective associated confidence value (e.g., based on signal consistency and model certainty), compute a combined score based on a weighted combination of the threat assessment scores and respective associated confidence values (e.g., using dynamic confidence-based weighting and normalization strategies), compare the combined score to a classification threshold (e.g., a risk tolerance threshold modulated by orchestration policies), generate a classification output based on the comparison, the classification output indicating that the electronic message is one of a malicious message or a benign message (e.g., flagged or cleared for user interaction), in response to the combined score failing to satisfy threshold conditions for direct classification: generate contextual prompts using the threat assessment scores and the respective associated confidence values as input parameters (e.g., by transforming score components and attribution signals into question types or selectable indicators), and in response to receiving user responses to contextual prompts, process the user responses to generate score modification vectors for adjusting the threat assessment scores (e.g., using natural language responses to infer signal relevance updates), generate user response context data for adjusting recommendation parameters (e.g., generating context flags or intent alignment indicators based on the response), wherein a user context component is operable to process the user responses to produce the user response context data (e.g., using embeddings or interpretation heuristics trained on labeled dialog outcomes), apply the score modification vectors to the threat assessment scores to generate updated threat assessment scores, wherein the updated threat assessment scores are adjusted based on the score modification vectors (e.g., via additive or multiplicative adjustment logic constrained by score provenance metadata), and generate an updated classification output based on the updated threat assessment scores, and generate, via a recommendation component configured to produce security guidance (e.g., remediation, awareness, or action-path directives), security recommendations by: in response to the user context component not being invoked, apply recommendation logic to the threat assessment scores and the classification output to generate baseline recommendations (e.g., default guidance matched to the classification category), and in response to the user context component being invoked, apply recommendation logic to the updated threat assessment scores and the user response context data to generate weighted recommendations (e.g., tailored guidance that incorporates intent subcategory, link characteristics, and engagement profile).

In a first example of the system, generating the classification output comprises: applying one of the threat assessment scores or the updated threat assessment scores to the classification threshold (e.g., computing a comparison between weighted confidence-adjusted scores and a threshold boundary modulated by orchestration logic), determining the classification output including at least one of the malicious message or the benign message based on the combined score (e.g., labeling the message based on classification bin thresholds associated with model performance metrics), identifying diagnostic subcategories via the intent analysis component, wherein the intent analysis component is operable to classify content into subcategories including authority impersonation, urgency manipulation, persuasion tactics, promotional content, transactional communication, or personal communication (e.g., using a semantic parser trained to categorize manipulation types based on intent cues embedded in message text), and generating a structured output containing the classification output and a confidence metric (e.g., structured as a multi-field JSON object, XML payload, or UI data card), wherein, in response to identifying diagnostic subcategories, incorporating at least one of the diagnostic subcategories into the structured output as supplemental context (e.g., tagging or annotating the output with threat rationale or inferred motive labels).

In a second example of the system, optionally including the first example, the recommendation component is operable to generate personalized security recommendations by: analyzing updated threat assessment scores produced by the threat analysis component, wherein each updated threat assessment score includes diagnostic information comprising the feature threat score with contributing features having a highest weighting in a threat scoring calculation (e.g., tokenized fields, metadata traits, or format flags most influential to the model's confidence), the intent threat score with identified manipulation patterns (e.g., urgency or impersonation vectors extracted from semantically parsed text), and the link threat score with URL analysis metadata (e.g., path irregularity scores, domain history, or embedded token entropy), analyzing user response context data produced by the user context component (e.g., structured interaction state derived from prompt selections or freeform replies), selecting recommendation logic based on the classification output and attributes of the updated threat assessment scores (e.g., using a rule set or decision tree indexed by message classification tier and severity indices), determining recommendation parameters based on the updated threat assessment scores, the diagnostic information included in the threat assessment scores, and the user response context data, wherein specific feature patterns and intent categories contained in the diagnostic information determine one or more recommendation parameters (e.g., urgency-driven callouts vs. impersonation-driven advisories), generating personalized security recommendations using the recommendation logic and the recommendation parameters (e.g., dynamically constructed remediation instructions, inline alert formatting, or tailored awareness notices), deriving a threat severity metric from the updated threat assessment scores (e.g., based on absolute score values and disagreement spread), deriving a user awareness metric from the user response context data (e.g., inferred attention level, comprehension, or risk estimation capability), and prioritizing the personalized security recommendations based on the threat severity metric and the user awareness metric (e.g., sorting, filtering, or highlighting the outputs for user interface rendering or downstream policy actions).

In a third example of the system, optionally including one or both of the first and second examples, the threat analysis component is operable to generate the feature threat score, the intent threat score, and the link threat score by: extracting mathematical and structural features from the electronic message (e.g., message length, character frequency, entropy values, formatting irregularities, and presence of embedded media or HTML structure), generating the feature threat score based on extracted mathematical and structural features (e.g., applying a feature scoring model trained on feature vector inputs with associated threat probabilities), performing semantic analysis on the electronic message to identify manipulation patterns (e.g., detecting persuasion tactics, emotional triggers, or syntactic structures associated with urgency), generating the intent threat score based on identified manipulation patterns (e.g., using intent vectorization logic or transformer-based attention mechanisms), evaluating embedded links in the electronic message using mathematical and semantic analysis (e.g., domain reputation lookup, lexical path analysis, and contextual relevance to message body), and generating the link threat score based on evaluating the embedded links (e.g., combining lexical structure risk scores with intent-based link embeddings).

In a fourth example of the system, optionally including one or more or each of the first through third examples, the threat analysis component is further operable to: extract textual features from the electronic message, the textual features including linguistic patterns, urgency indicators, and semantic embeddings (e.g., n-gram sequences, modal verb patterns, or transformer-derived context vectors), extract structural features from the electronic message, the structural features including message formatting, header characteristics, and metadata fields (e.g., SPF/DKIM values, reply—to mismatches, attachment flags, or header alignment anomalies), extract behavioral features from the electronic message, the behavioral features including sender activity patterns and recipient relationship indicators (e.g., frequency of contact, known domain usage history, or timeof-day heuristics), and exclude link-based features from textual features, structural features, and behavioral features to prevent overlap with link evaluation processing (e.g., applying feature masking or domain-specific exclusion logic prior to vector generation to isolate link threat computation paths).

In a fifth example of the system, optionally including one or more or each of the first through fourth examples, the threat analysis component is further operable to generate the link threat score by: extracting mathematical link features from embedded links in the electronic message, the mathematical link features including at least one of brand impersonation indicators, structural anomaly scores, path entropy metrics, and domain age values (e.g., calculated via lexical similarity to known brand names, uncommon subdomain patterns, high entropy URL segments, or recently registered domains as flagged by WHOIS lookups), applying a transformer-based semantic model to the embedded links, the transformer-based semantic model trained on link-related manipulation patterns (e.g., identifying contextually mismatched anchor text, promotional bait language, or coercive framing around call-to-action phrases), generating a mathematical analysis score based on mathematical link features (e.g., using a feature vector scoring engine with weighting based on statistical threat correlations), generating a semantic analysis score based on the transformer-based semantic model (e.g., scoring link phrasing consistency with trusted communication), computing the combined score based on the mathematical analysis score and the semantic analysis score, the combined score being weighted according to confidence values associated with each analysis type (e.g., weighting higher the modality with lower internal disagreement across ensemble outputs), and generating the link threat score based on the combined score, wherein the link threat score is derived from mathematical characteristics extracted from embedded links and manipulation patterns identified using the transformer-based semantic model (e.g., using a fusion layer that incorporates embedding features and scoring heuristics across the different modalities).

In a sixth example of the system, optionally including one or more or each of the first through fifth examples, the memory further stores instructions that, when executed by the processor, cause the computing system to: calculate a plurality of disagreement metrics based on differences between the feature threat score, the intent threat score, and the link threat score (e.g., by measuring divergence across normalized probability outputs or applying cosine distance between vector representations of the scores), assign a confidence value to the feature threat score, the intent threat score, and the link threat score (e.g., derived from internal model calibration data, Bayesian posterior sampling, or dropout-induced uncertainty estimations), assign a weighting value to the feature threat score, the intent threat score, and the link threat score based on respective disagreement metrics and respective confidence values to generate respective weighting values for the feature threat score, the intent threat score, and the link threat score (e.g., weighting higher the more confident, lower-disagreement signals to stabilize combined score reliability), compute a weighted combination of the feature threat score, the intent threat score, and the link threat score based on the respective weighting values (e.g., through a score fusion module configured to apply normalized weighted summation with adjustable temperature scaling), identify message attributes based on the respective disagreement metrics (e.g., message risk characteristics such as presence of conflicting linguistic and structural cues), and in response to the user context component being invoked, generate contextual prompts based on the message attributes (e.g., selecting prompt phrasing that targets ambiguity around intent or unusual link content when model uncertainty is high).

In a seventh example of the system, optionally including one or more or each of the first through sixth examples, the memory further stores instructions that, when executed by the processor, cause the computing system to: identify contributing features for at least one threat assessment score based on feature importance data generated by the threat analysis component (e.g., using SHAP values or model-specific attention weights highlighting impactful tokens, patterns, or metadata fields), extract message-specific variables based on the threat assessment scores and the feature importance data (e.g., pulling out top-ranked structural anomalies, high-weight manipulation patterns, or unique sender-recipient behavioral deltas), generate a contextual prompt based on the message-specific variables (e.g., constructing a user-facing question that references urgency language or unknown links), and determine a prompt type for at least one contextual prompt based on a combination of the threat assessment scores and the respective associated confidence values (e.g., selecting between multiple-choice vs. open-response format based on confidence drop across scoring pillars or presence of conflicting diagnostics).

In an eighth example of the system, optionally including one or more or each of the first through seventh examples, the user context component is operable to: generate a score modification vector for adjusting at least one threat assessment score produced by the threat analysis component (e.g., a numerical delta applied to a score vector dimension or learned weight adjustment applied to token contributions), and generate user response context data for adjusting recommendation parameters used by the recommendation component (e.g., encoding response phrasing and selection patterns into context vectors for downstream tailoring), wherein the score modification vector is applied to refine threat classification (e.g., adjusting the score closer to the final classification threshold or amplifying intent scores), and the user response context data is applied to guide recommendation generation (e.g., adjusting tone, specificity, or urgency of recommendations based on indicated comprehension or behavioral tendencies).

In a ninth example of the system, optionally including one or more or each of the first through eighth examples, the memory further stores instructions that, when executed by the processor, cause the computing system to: convert the user responses into structured response vectors using natural language processing (e.g., embedding textual or button-based responses into tokenized vectors using transformer encoders or classification layers), apply transformation logic to the structured response vectors to generate score modification vectors for adjusting at least one of the threat assessment scores in a probability-based mathematical representation (e.g., shifting the base score by a delta determined from the similarity between user input and high-weight feature clusters), record, for each adjusted threat assessment score, a modification lineage indicating a magnitude of adjustment and a source of the adjustment (e.g., tagging the score with adjustment provenance, such as "User affirmed urgency language," and a delta of +0.12), and determine a synthesis logic based on whether each threat assessment score was adjusted using the score modification vectors or generated by the threat analysis component (e.g., flagging each score as either "modified" or "original" to influence downstream weighting logic or explainability generation).

In a tenth example of the system, optionally including one or more or each of the first through ninth examples, the memory further stores instructions that, when executed by the processor, cause the computing system to: adjust embeddings based on a user response to produce adjusted embeddings (e.g., projecting user-validated feature tokens into an altered vector position using realignment weights), project the adjusted embeddings into a training vector space using embedding realignment logic that preserves relative distances and relationships between the embeddings (e.g., applying Procrustes transformation or learned manifold projection that maintains semantic similarity across adjusted vectors), perform vector normalization on the embeddings adjusted based on the user response to generate normalized embeddings (e.g., rescaling the embedding vectors to unit length or distribution center), apply the score modification vector to adjust a threat assessment score based on the normalized embeddings (e.g., using cosine similarity or logistic regression over the updated vector), and generate a confidence value based on the score modification vector, the confidence value indicating a reliability level of score modification to the threat assessment score based on the user response (e.g., calculating a confidence lift based on vector distance from the original classification boundary or based on matching user feedback to known training-confirmed patterns).

In an eleventh example of the system, optionally including one or more or each of the first through tenth examples, the memory further stores instructions that, when executed by the processor, cause the computing system to: associate the electronic message, extracted features, contextual prompts, user responses, and classification output as structured training instances (e.g., generating records with fields for message content, feature vectors, prompt IDs, user reply types, and final classification label), annotate each structured training instance with a score modification delta and a confidence improvement metric (e.g., storing per-instance data showing score shifted from 0.52 to 0.81 and confidence increased by +0.15), and store prompt effectiveness data linking individual prompt types to user response quality and classification accuracy (e.g., calculating statistics over past instances showing that "urgency acknowledgment" prompts yield more meaningful confidence boosts than "tone confirmation" prompts).

In a twelfth example of the system, optionally including one or more or each of the first through eleventh examples, the system further comprises: an orchestration component operable to: maintain threshold parameters that are adjusted during operation based on at least one of message type, user history, and model performance metrics (e.g., tightening classification thresholds for financial phishing content if misclassification rate rises), apply different threshold conditions based on combinations of threat assessment scores (e.g., using a higher threshold when feature threat and intent threat are both elevated but link threat is ambiguous), implement escalation logic that increases threshold requirements for classification of high-risk message categories (e.g., requiring 0.95 combined score instead of 0.8 for government impersonation), determine, for each threat assessment score, a respective uncertainty point based on validation data instead of using a fixed threshold (e.g., referencing model confidence calibration curves derived from past test data), adjust respective uncertainty points based on model performance metrics (e.g., increasing conservativeness when false positive rate exceeds target), wherein a distance between each threat assessment score and its respective uncertainty point modulates an influence weighting in computing the combined score (e.g., downweighting scores that are near their uncertainty points during the aggregation process).

In a thirteenth example of the system, optionally including one or more or each of the first through twelfth examples, the orchestration component includes a coordination interface operable to: manage routing of message-contextualized data between the threat analysis component, the user context component, and the recommendation component (e.g., passing structured payloads between modules as described in the orchestration pipeline), transmit, between components, embedding vectors, prompt variable sets, and control metadata encapsulated in coordination payloads (e.g., routing vectorized threat scores, diagnostic breakdowns, and prompt assignment tokens), tag each coordination payload with an orchestration state lineage and a step identifier (e.g., tagging with state transitions like PRE_CLASS→CONTEXT_GEN→SCORE_ADJUST), and store configuration data for each component, the configuration data including version compatibility, accepted input schemas, and expected response formats (e.g., maintaining a registry mapping intent analysis version v1.3 to accepted feature vector length and required output attributes).

In a fourteenth example of the system, optionally including one or more or each of the first through thirteenth examples, the orchestration component further comprises: orchestration contract evaluation logic that enforces conditional requirements and processing constraints defined by execution configurations (e.g., specifying that when a message exceeds a certain risk level, the user context component must be invoked), contract metadata defining component selection conditions, score threshold escalation policies, and fallback criteria (e.g., triggering alternate link scoring when the primary semantic model returns below-threshold confidence), and dynamic contract instantiation that adjusts component participation requirements based on message type, source characteristics, and threat assessment results (e.g., skipping structural analysis for short-form social media posts unless embedded links are present).

In a fifteenth example of the system, optionally including one or more or each of the first through fourteenth examples, generating the classification output by combining the threat assessment scores when the link threat score is present comprises: applying a first weighting value to the link threat score when the link threat score exceeds a first threshold and at least one of the feature threat score and the intent threat score is below a second threshold (e.g., where link signals dominate content features in risk profile), applying a second weighting value to the link threat score when the link threat score, the feature threat score, and the intent threat score each exceed respective thresholds (e.g., indicating uniform agreement among independent signal paths), applying a third weighting value to the link threat score when the link threat score is below a third threshold (e.g., suggesting a non-salient embedded link), and applying a transformation function to compute a final link weight based on relative differences between the link threat score and one or more of the feature threat score and the intent threat score (e.g., using nonlinear boosting or discounting to adapt contribution strength), wherein the first weighting value is greater than the second weighting value, and the second weighting value is greater than the third weighting value.

In a sixteenth example of the system, optionally including one or more or each of the first through fifteenth examples, generating the updated threat assessment scores comprises instructions that, when executed by the processor, cause the computing system to: generate a base content score by combining the feature threat score and the intent threat score using confidence-weighted averaging (e.g., weighted sum where content confidence values guide proportional influence), determine whether the electronic message includes link-based features (e.g., based on presence of anchor tags, URLs, and recognized domains), in response to determining that the electronic message includes at least one link-based feature: compute a link adjustment value based on a sigmoid transformation of the link threat score, transformation modulated by a distance between the link threat score and a corresponding uncertainty point (e.g., using scaled sigmoid that tightens influence when the score is near ambiguity zones), and apply the link adjustment value to the base content score to generate an updated threat assessment score, wherein the sigmoid transformation applies a first weighting when increasing the updated threat assessment score and a second weighting, different from the first, when decreasing the updated threat assessment score (e.g., asymmetric sigmoid slope to prevent overcorrection from low-signal links).

In a seventeenth example of the system, optionally including one or more or each of the first through sixteenth examples, the memory further stores instructions that, when executed by the processor, cause the computing system to: normalize at least one of an email message, a text message, a social media message, or a messaging application message into a standardized format compatible with the threat analysis component (e.g., mapping inputs to a normalized representation including headers, body, attachments, and metadata fields), extract threat-relevant features from the standardized format using extraction logic that conforms to a format specification associated with a message source (e.g., schema-aware parsing logic that varies based on source type), and store user response context data in a unified context state structure associated with a user identifier, the unified context state structure being accessible across multiple message sources (e.g., maintaining a persistent context map for session-aware recommendation refinement).

The disclosure also provides support for a computer-implemented method for electronic message classification, comprising: receiving an electronic message (e.g., via a communication interface configured to accept email, chat, or social input), generating a feature threat score based on mathematical and structural features (e.g., message length, token density, capitalization ratio), generating an intent threat score based on semantic analysis of manipulation patterns (e.g., using a transformer-based model trained on deceptive language styles), generating a link threat score based on embedded link analysis (e.g., scoring domain impersonation risk and URL entropy), associating a respective confidence value with each threat assessment score (e.g., derived from model calibration metrics or past inference volatility), computing a combined score based on a weighted combination of threat assessment scores and respective confidence values (e.g., using learned or rule-based weight mapping logic), comparing the combined score to a classification threshold (e.g., a dynamic threshold modulated by orchestration component logic), generating a classification output based on the comparing, the classification output indicating whether the electronic message is malicious or benign, in response to the combined score failing to satisfy threshold conditions for direct classification: generating contextual prompts using threat assessment scores and respective confidence values as input parameters (e.g., selecting question templates targeting contributing score signals), and in response to receiving user responses to the contextual prompts: generating score modification vectors for adjusting the threat assessment scores (e.g., based on linguistic alignment and response structure analysis), and generating user response context data for adjusting recommendation parameters (e.g., extracting response traits indicating user alertness or confidence), applying the score modification vectors to the threat assessment scores to generate updated threat assessment scores (e.g., modifying individual score values while preserving prior distribution shape), generating an updated classification output based on the updated threat assessment scores, and generating security recommendations by: in response to not receiving user response context data, applying recommendation logic to the threat assessment scores and the classification output to generate baseline recommendations (e.g., drawn from rule-based mappings or a lookup table), and in response to receiving user response context data, applying recommendation logic to the updated threat assessment scores and the user response context data to generate weighted recommendations (e.g., tuned to reflect user comprehension or confirmation signals from prompt interactions).

In a first example of the method, the method comprises: calculating a plurality of disagreement metrics based on differences between the feature threat score, the intent threat score, and the link threat score (e.g., absolute or relative variance between individual score values), assigning a confidence value to the feature threat score, the intent threat score, and the link threat score (e.g., as computed by the respective analysis components using prior accuracy distributions), assigning a weighting value to the feature threat score, the intent threat score, and the link threat score based on respective disagreement metrics and respective confidence values to generate respective weighting values (e.g., using rule-based heuristics or regression-learned curves), computing a weighted combination of the feature threat score, the intent threat score, and the link threat score based on the respective weighting values, identifying message attributes based on the respective disagreement metrics (e.g., triggering label generation or diagnostic flags for high-score divergence), and in response to the user responses being received, generating contextual prompts based on the message attributes (e.g., tailoring follow-up questions to the area of highest inter-score uncertainty).

In a second example of the method, optionally including the first example, the method further comprises: identifying contributing features for at least one threat assessment score based on feature importance data (e.g., using SHAP or model-derived attention weights), extracting message-specific variables based on the threat assessment scores and the feature importance data (e.g., selecting most influential tokens, headers, or metadata fields), generating a contextual prompt based on the message-specific variables (e.g., prompting for user judgment about the presence of urgency or impersonation cues), and determining a prompt type for at least one contextual prompt based on a combination of the threat assessment scores and the respective confidence values (e.g., selecting free-response versus multiple-choice based on uncertainty levels and diagnostic category).

In a third example of the method, optionally including one or both of the first and second examples, generating the score modification vectors comprises: converting the user responses into structured response vectors using natural language processing (e.g., extracting syntactic structure, negation, and sentiment features), applying transformation logic to the structured response vectors to generate score modification vectors for adjusting at least one of the threat assessment scores in a probability-based mathematical representation (e.g., shifting logits or normalized score values using linear or non-linear functions), recording, for each adjusted threat assessment score, a modification lineage indicating a magnitude of adjustment and a source of the adjustment (e.g., appending to a provenance record for audit or training refinement), and determining synthesis logic based on whether at least one of the feature threat score, the intent threat score, and the link threat score is adjusted using the score modification vectors or remains unmodified by user response input (e.g., determining which values to prioritize in the final classification).

In a fourth example of the method, optionally including one or more or each of the first through third examples, the method further comprises: associating the electronic message, extracted features, contextual prompts, user responses, and classification output as structured training instances (e.g., as entries in a feedback-enriched corpus for continual model learning), and annotating each structured training instance with a score modification delta and a confidence improvement metric (e.g., tracking user interaction effectiveness and influence on model outcomes).

The disclosure also provides support for a non-transitory computer readable storage medium storing instructions that, when executed by at least one processor of a computing system, cause the computing system to: receive an electronic message; generate a feature threat score based on mathematical and structural features (e.g., statistical regularities, layout patterns); generate an intent threat score based on semantic analysis of manipulation patterns (e.g., transformer-based modeling of urgency or impersonation); generate a link threat score based on embedded link analysis (e.g., URL-based anomaly scoring and reputation mapping); associate a respective confidence value with each threat assessment score (e.g., representing model certainty or agreement with training data); compute a combined score based on a weighted combination of threat assessment scores and respective confidence values (e.g., using a dynamic fusion function responsive to input variability); compare the combined score to a classification threshold; generate a classification output based on the comparing, the classification output indicating whether the electronic message is malicious or benign (e.g., threshold exceedance logic or calibrated probability bins).

In response to the combined score failing to satisfy threshold conditions for direct classification: generate contextual prompts using threat assessment scores and respective confidence values as input parameters (e.g., selecting variables and diagnostic areas for clarification), and in response to receiving user responses to the contextual prompts: generate score modification vectors for adjusting the threat assessment scores (e.g., user-aligned score corrections), and generate user response context data for adjusting recommendation parameters (e.g., learned behavioral indicators for tailoring future outputs).

Apply the score modification vectors to the threat assessment scores to generate updated threat assessment scores (e.g., vector-based score overwriting or smoothing), generate an updated classification output based on the updated threat assessment scores (e.g., reclassification using the same or alternate thresholds), and generate security recommendations by: in response to not receiving user response context data, apply recommendation logic to the threat assessment scores and the classification output to generate baseline recommendations (e.g., generic actions mapped to score severity levels), and in response to receiving user response context data, apply recommendation logic to the updated threat assessment scores and the user response context data to generate weighted recommendations (e.g., prioritizing guidance aligned with user awareness level or identified threat vector).

In a first example of the system, the instructions further cause the computing system to: calculate a plurality of disagreement metrics based on differences between the feature threat score, the intent threat score, and the link threat score (e.g., divergence measures to indicate scoring conflict); assign a confidence value to the feature threat score, the intent threat score, and the link threat score; assign a weighting value to the feature threat score, the intent threat score, and the link threat score based on respective disagreement metrics and respective confidence values (e.g., increasing weight of scores with higher agreement or reliability); compute a weighted combination of the threat assessment scores; identify message attributes based on the disagreement metrics (e.g., which elements trigger suspicion but lack consensus); and in response to user responses being received, generate contextual prompts based on the message attributes (e.g., to resolve ambiguity in user-facing interactions).

In a second example of the system, optionally including the first example, the instructions for generating the contextual prompts cause the computing system to: identify contributing features for at least one threat assessment score based on feature importance data (e.g., attention weights or feature selection); extract message-specific variables based on the threat assessment scores and the feature importance data (e.g., targeted linguistic or structural markers); generate a contextual prompt based on the message-specific variables (e.g., framing a clarifying question around the most influential attribute); and determine a prompt type for at least one contextual prompt based on a combination of the threat assessment scores and the respective confidence values (e.g., using a matrix of confidence thresholds and threat categories to select input formats or escalation pathways).

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Any of the above-mentioned systems, modules, engines, controllers, interfaces, components, or the like may comprise hardware and/or software as described herein. For example, the systems described in association with ingestion system 104, anomaly detection system 105, media feature analysis system 106, user context refinement system 108, response synthesis system 110, orchestration system 112, and output engine 114, as well as subcomponents thereof, may comprise computing hardware and/or software implementations. Furthermore, any of the above-mentioned systems, modules, engines, controllers, interfaces, components, or the like may use and/or comprise an application programming interface (API) for communicating with other systems, modules, engines, controllers, interfaces, components, or the like for obtaining and/or providing data or information.

Figure 14:
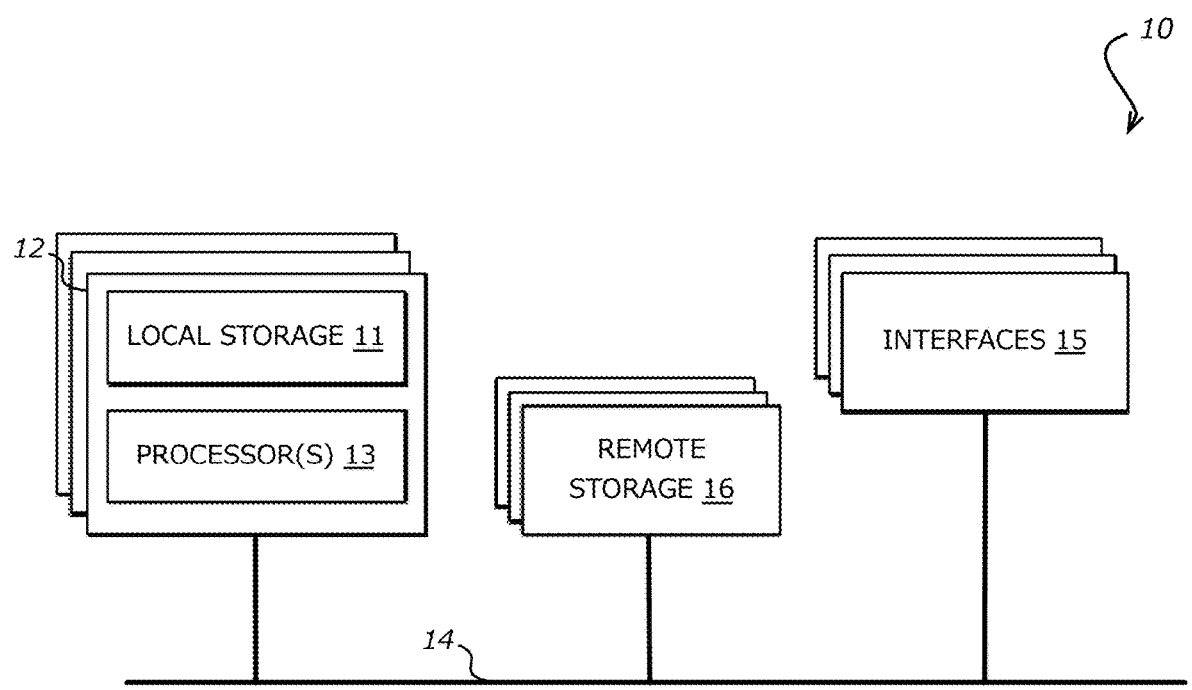
FIG. 14 illustrates an example device-level architecture that can support various embodiments.

Referring now to FIG. 14, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 14 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 15:
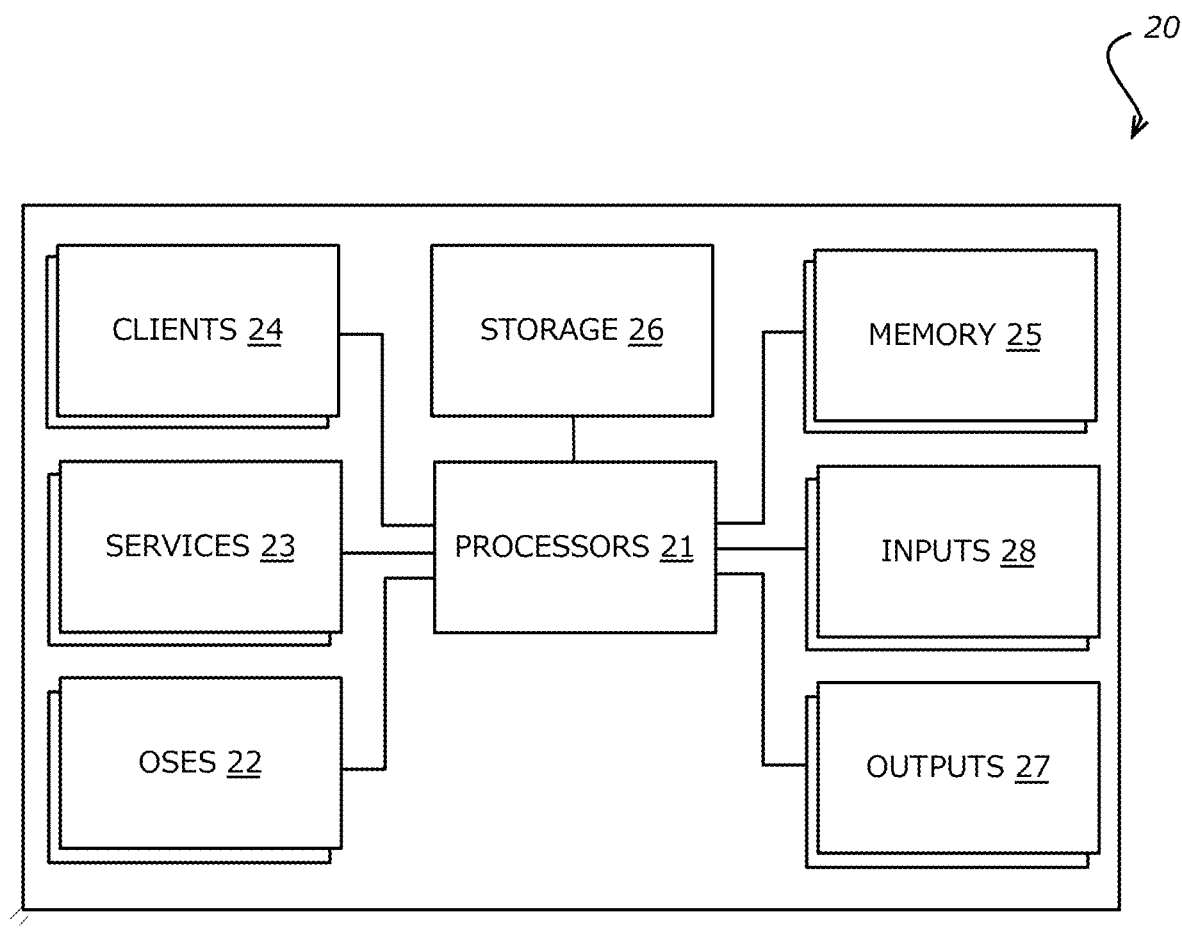
FIG. 15 illustrates components of a computing device in accordance with various embodiments.

In some embodiments, systems may be implemented on a standalone computing system. Referring now to FIG. 15, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 14). Examples of storage devices 26 include flash memory, magnetic hard drive, CD-ROM, and/or the like.

Figure 16:
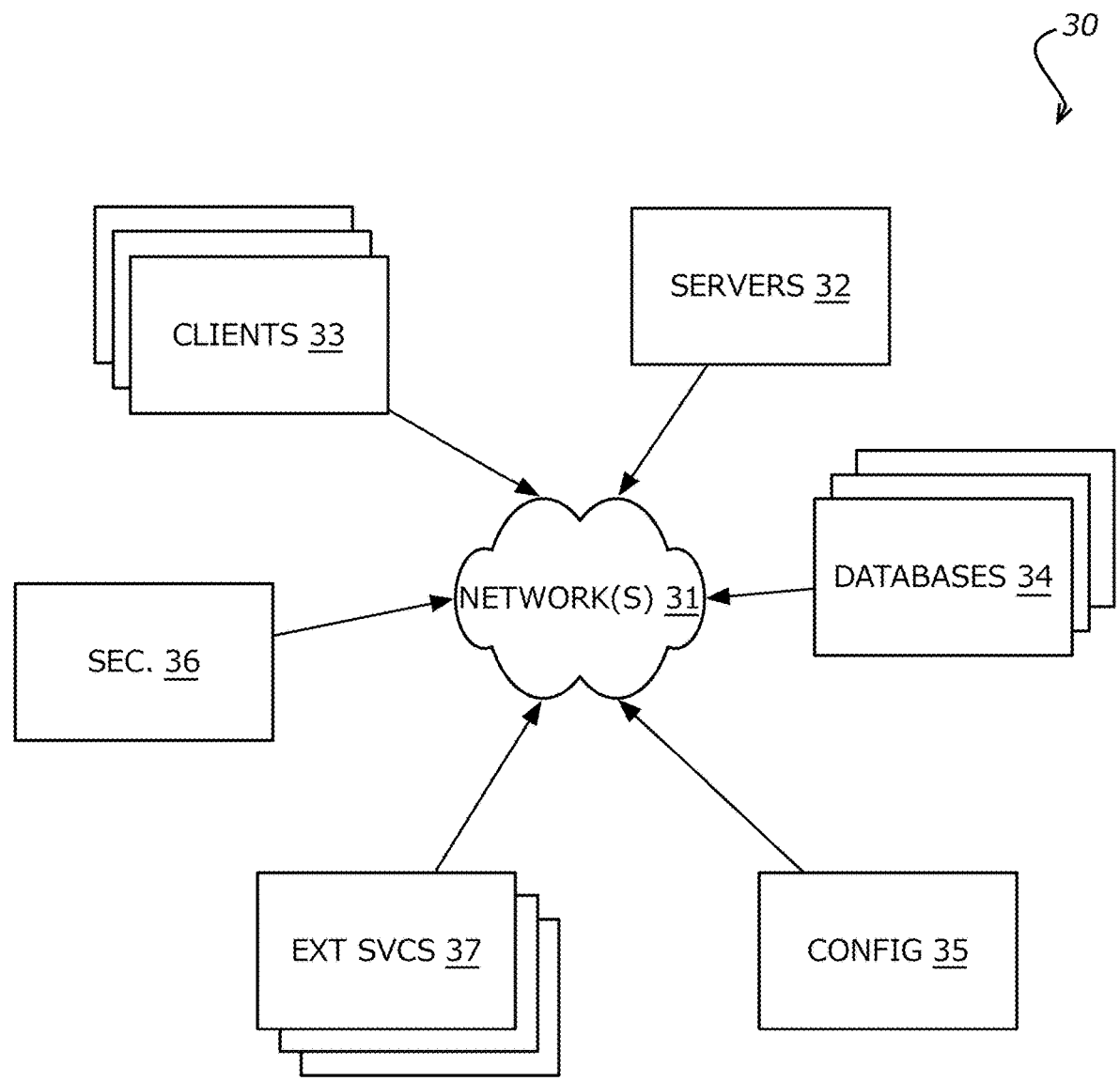
FIG. 16 illustrates an exemplary architecture of a system in accordance with various embodiments.

In some embodiments, systems may be implemented on a distributed computing network, such as one having any number of clients and/or servers. Referring now to FIG. 16, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 15. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 17:
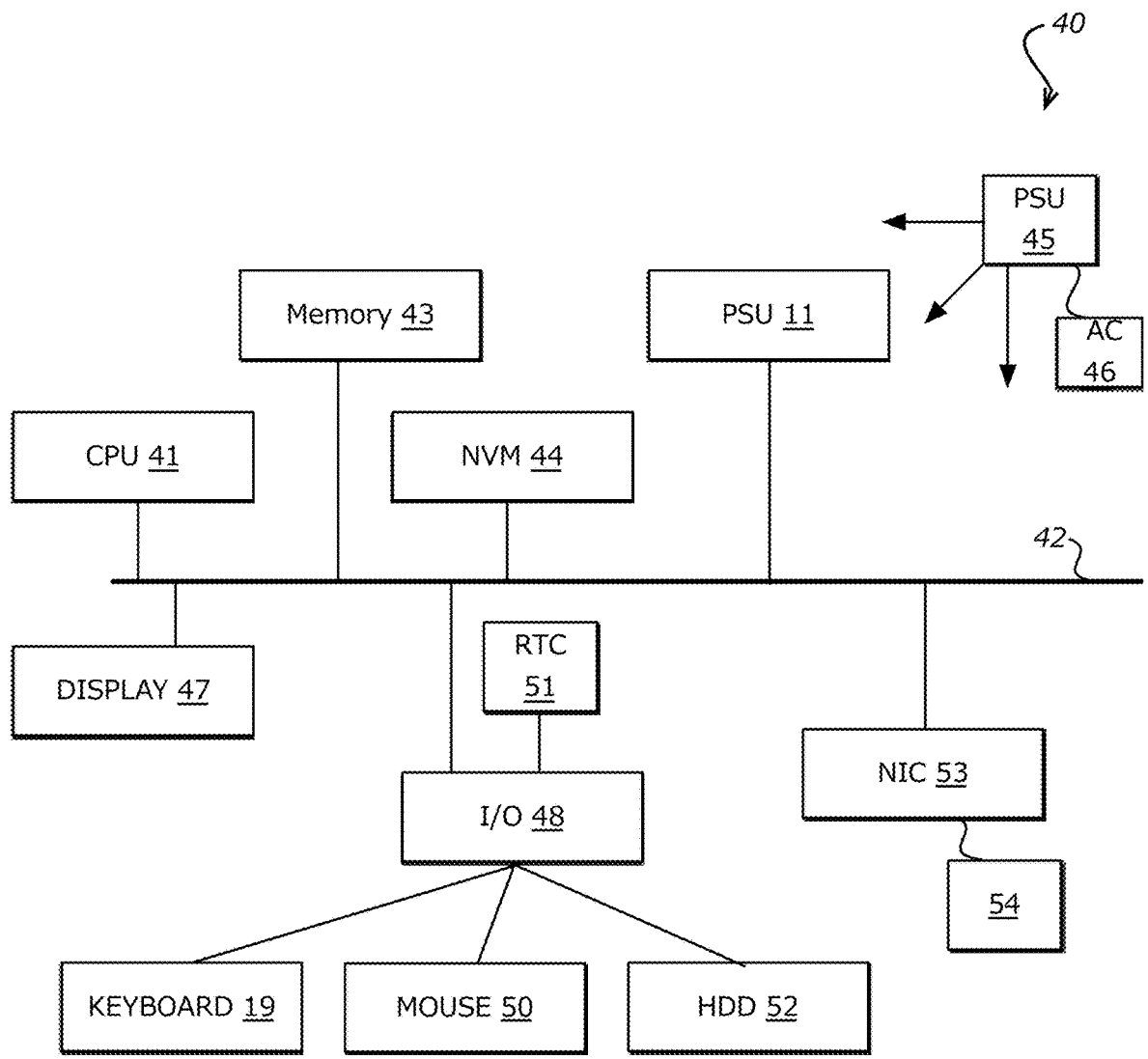
FIG. 17 illustrates components of a computing device in accordance with various embodiments.

FIG. 17 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for facilitating database queries through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computing system for electronic message classification comprising:
 a processor; and
 a memory storing instructions that, when executed by the processor, cause the computing system to:
  receive an electronic message;
  generate, via a threat analysis component configured to analyze multiple threat indicators, threat assessment scores comprising:
   a feature threat score derived from mathematical and structural features;
   an intent threat score derived from semantic analysis of manipulation patterns; and
   a link threat score derived from embedded link analysis, wherein the threat analysis component includes a feature analysis component that generates the feature threat score, an intent analysis component that generates the intent threat score, and a link analysis component that generates the link threat score, and wherein each threat assessment score has a respective associated confidence value;

compute a combined score based on a weighted combination of the threat assessment scores and respective associated confidence values;

compare the combined score to a classification threshold;

generate a classification output based on the comparison, the classification output indicating that the electronic message is one of a malicious message or a benign message;

in response to the combined score failing to satisfy threshold conditions for direct classification:

generate contextual prompts using the threat assessment scores and the respective associated confidence values as input parameters; and in response to receiving user responses to contextual prompts, process the user responses to generate score modification vectors for adjusting the threat assessment scores;

generate user response context data for adjusting recommendation parameters, wherein a user context component is operable to process the user responses to produce the user response context data;

apply the score modification vectors to the threat assessment scores to generate updated threat assessment scores, wherein the updated threat assessment scores are adjusted based on the score modification vectors; and generate an updated classification output based on the updated threat assessment scores; and generate, via a recommendation component configured to produce security guidance, security recommendations by:

in response to the user context component not being invoked, apply recommendation logic to the threat assessment scores and the classification output to generate baseline recommendations; and in response to the user context component being invoked, apply recommendation logic to the updated threat assessment scores and the user response context data to generate weighted recommendations.

2. The computing system of claim 1, wherein generating the classification output comprises:

applying one of the threat assessment scores or the updated threat assessment scores to the classification threshold;

determining the classification output including at least one of the malicious message or the benign message based on the combined score;

identifying diagnostic subcategories via the intent analysis component, wherein the intent analysis component is operable to classify content into subcategories including authority impersonation, urgency manipulation, persuasion tactics, promotional content, transactional communication, or personal communication; and generating a structured output containing the classification output and a confidence metric, wherein, in response to identifying diagnostic subcategories incorporating at least one of the diagnostic subcategories into the structured output as supplemental context.

3. The computing system of claim 1, wherein the recommendation component is operable to generate personalized security recommendations by:

analyzing updated threat assessment scores produced by the threat analysis component, wherein each updated threat assessment score includes diagnostic information comprising the feature threat score with contributing features having a highest weighting in a threat scoring calculation, the intent threat score with identified manipulation patterns, and the link threat score with URL analysis metadata;

analyzing user response context data produced by the user context component;

selecting recommendation logic based on the classification output and attributes of the updated threat assessment scores;

determining recommendation parameters based on the updated threat assessment scores, the diagnostic information included in the threat assessment scores, and the user response context data, wherein specific feature patterns and intent categories contained in the diagnostic information determine one or more recommendation parameters;

generating personalized security recommendations using the recommendation logic and the recommendation parameters;

deriving a threat severity metric from the updated threat assessment scores;

deriving a user awareness metric from the user response context data; and prioritizing the personalized security recommendations based on the threat severity metric and the user awareness metric.

4. The computing system of claim 1, wherein the threat analysis component is operable to generate the feature threat score, the intent threat score, and the link threat score by:

extracting mathematical and structural features from the electronic message;

generating the feature threat score based on extracted mathematical and structural features;

performing semantic analysis on the electronic message to identify manipulation patterns;

generating the intent threat score based on identified manipulation patterns;

evaluating embedded links in the electronic message using mathematical and semantic analysis; and generating the link threat score based on evaluating the embedded links.

5. The computing system of claim 4, wherein the threat analysis component is further operable to:

extract textual features from the electronic message, the textual features including linguistic patterns, urgency indicators, and semantic embeddings;

extract structural features from the electronic message, the structural features including message formatting, header characteristics, and metadata fields;

extract behavioral features from the electronic message, the behavioral features including sender activity patterns and recipient relationship indicators; and exclude link-based features from textual features, structural features, and behavioral features to prevent overlap with link evaluation processing.

6. The computing system of claim 4, wherein the threat analysis component is further operable to generate the link threat score by:
- extracting mathematical link features from embedded links in the electronic message, the mathematical link features including at least one of brand impersonation indicators, structural anomaly scores, path entropy metrics, and domain age values;
- applying a transformer-based semantic model to the embedded links, the transformer-based semantic model trained on link-related manipulation patterns;
- generating a mathematical analysis score based on mathematical link features;
- generating a semantic analysis score based on the transformer-based semantic model;
- computing the combined score based on the mathematical analysis score and the semantic analysis score, the combined score being weighted according to confidence values associated with each analysis type; and
- generating the link threat score based on the combined score, wherein the link threat score is derived from mathematical characteristics extracted from embedded links and manipulation patterns identified using the transformer-based semantic model.

7. The computing system of claim 1, wherein the memory further stores instructions that, when executed by the processor, cause the computing system to:
- calculate a plurality of disagreement metrics based on differences between the feature threat score, the intent threat score, and the link threat score;
- assign a confidence value to the feature threat score, the intent threat score, and the link threat score;
- assign a weighting value to the feature threat score, the intent threat score, and the link threat score based on respective disagreement metrics and respective confidence values to generate respective weighting values for the feature threat score, the intent threat score, and the link threat score;
- compute a weighted combination of the feature threat score, the intent threat score, and the link threat score based on the respective weighting values;
- identify message attributes based on the respective disagreement metrics; and
- in response to the user context component being invoked, generate contextual prompts based on the message attributes.

8. The computing system of claim 1, wherein the memory further stores instructions that, when executed by the processor, cause the computing system to:
- identify contributing features for at least one threat assessment score based on feature importance data generated by the threat analysis component;
- extract message-specific variables based on the threat assessment scores and the feature importance data;
- generate a contextual prompt based on the message-specific variables; and
- determine a prompt type for at least one contextual prompt based on a combination of the threat assessment scores and the respective associated confidence values.

9. The computing system of claim 1, wherein the user context component is operable to:
- generate a score modification vector for adjusting at least one threat assessment score produced by the threat analysis component; and
- generate user response context data for adjusting recommendation parameters used by the recommendation component,
wherein the score modification vector is applied to refine threat classification, and the user response context data is applied to guide recommendation generation.

10. The computing system of claim 9, wherein the memory further stores instructions that, when executed by the processor, cause the computing system to:
- convert the user responses into structured response vectors using natural language processing;
- apply transformation logic to the structured response vectors to generate score modification vectors for adjusting at least one of the threat assessment scores in a probability-based mathematical representation;
- record, for each adjusted threat assessment score, a modification lineage indicating a magnitude of adjustment and a source of the adjustment; and
- determine a synthesis logic based on whether each threat assessment score was adjusted using the score modification vectors or generated by the threat analysis component.

11. The computing system of claim 10, wherein the memory further stores instructions that, when executed by the processor, cause the computing system to:
- adjust embeddings based on a user response to produce adjusted embeddings;
- project the adjusted embeddings into a training vector space using embedding realignment logic that preserves relative distances and relationships between the embeddings;
- perform vector normalization on the embeddings adjusted based on the user response to generate normalized embeddings;
- apply the score modification vector to adjust a threat assessment score based on the normalized embeddings; and
- generate a confidence value based on the score modification vector, the confidence value indicating a reliability level of score modification to the threat assessment score based on the user response.

12. The computing system of claim 1, wherein the memory further stores instructions that, when executed by the processor, cause the computing system to:
- associate the electronic message, extracted features, contextual prompts, user responses, and classification output as structured training instances;
- annotate each structured training instance with a score modification delta and a confidence improvement metric; and
- store prompt effectiveness data linking individual prompt types to user response quality and classification accuracy.

13. The computing system of claim 1, further comprising an orchestration component operable to:
- maintain threshold parameters that are adjusted during operation based on at least one of message type, user history, and model performance metrics;
- apply different threshold conditions based on combinations of threat assessment scores;
- implement escalation logic that increases threshold requirements for classification of high-risk message categories;
- determine, for each threat assessment score, a respective uncertainty point based on validation data instead of using a fixed threshold;
- adjust respective uncertainty points based on model performance metrics, wherein a distance between each threat assessment score and its respective uncertainty point modulates an influence weighting in computing the combined score.

14. The computing system of claim 13, wherein the orchestration component includes a coordination interface operable to:
    manage routing of message-contextualized data between the threat analysis component, the user context component, and the recommendation component;
    transmit, between components, embedding vectors, prompt variable sets, and control metadata encapsulated in coordination payloads;
    tag each coordination payload with an orchestration state lineage and a step identifier; and
    store configuration data for each component, the configuration data including version compatibility, accepted input schemas, and expected response formats.

15. The computing system of claim 13, wherein the orchestration component further comprises:
    orchestration contract evaluation logic that enforces conditional requirements and processing constraints defined by execution configurations;
    contract metadata defining component selection conditions, score threshold escalation policies, and fallback criteria; and
    dynamic contract instantiation that adjusts component participation requirements based on message type, source characteristics, and threat assessment results.

16. The computing system of claim 1, wherein generating the classification output by combining the threat assessment scores when the link threat score is present comprises:
    applying a first weighting value to the link threat score when the link threat score exceeds a first threshold and at least one of the feature threat score and the intent threat score is below a second threshold;
    applying a second weighting value to the link threat score when the link threat score, the feature threat score, and the intent threat score each exceed respective thresholds;
    applying a third weighting value to the link threat score when the link threat score is below a third threshold; and
    applying a transformation function to compute a final link weight based on relative differences between the link threat score and one or more of the feature threat score and the intent threat score,
    wherein the first weighting value is greater than the second weighting value, and the second weighting value is greater than the third weighting value.

17. The computing system of claim 1, wherein generating the updated threat assessment scores comprises instructions that, when executed by the processor, cause the computing system to:
    generate a base content score by combining the feature threat score and the intent threat score using confidence-weighted averaging;
    determine whether the electronic message includes link-based features;
    in response to determining that the electronic message includes at least one link-based feature:
        compute a link adjustment value based on a sigmoid transformation of the link threat score, transformation modulated by a distance between the link threat score and a corresponding uncertainty point; and
        apply the link adjustment value to the base content score to generate an updated threat assessment score;
    wherein the sigmoid transformation applies a first weighting when increasing the updated threat assessment score and a second weighting, different from the first, when decreasing the updated threat assessment score.

18. The computing system of claim 1, wherein the memory further stores instructions that, when executed by the processor, cause the computing system to:
    normalize at least one of an email message, a text message, a social media message, or a messaging application message into a standardized format compatible with the threat analysis component;
    extract threat-relevant features from the standardized format using extraction logic that conforms to a format specification associated with a message source; and
    store user response context data in a unified context state structure associated with a user identifier, the unified context state structure being accessible across multiple message sources.

19. A computer-implemented method for electronic message classification, comprising:
    receiving an electronic message;
    generating a feature threat score based on mathematical and structural features;
    generating an intent threat score based on semantic analysis of manipulation patterns;
    generating a link threat score based on embedded link analysis;
    associating a respective confidence value with each threat assessment score;
    computing a combined score based on a weighted combination of threat assessment scores and respective confidence values;
    comparing the combined score to a classification threshold;
    generating a classification output based on the comparing, the classification output indicating whether the electronic message is malicious or benign;
    in response to the combined score failing to satisfy threshold conditions for direct classification:
        generating contextual prompts using threat assessment scores and respective confidence values as input parameters; and
        in response to receiving user responses to the contextual prompts:
            generating score modification vectors for adjusting the threat assessment scores; and
            generating user response context data for adjusting recommendation parameters;
    applying the score modification vectors to the threat assessment scores to generate updated threat assessment scores;
    generating an updated classification output based on the updated threat assessment scores; and
    generating security recommendations by:
        in response to not receiving user response context data, applying recommendation logic to the threat assessment scores and the classification output to generate baseline recommendations; and
        in response to receiving user response context data, applying recommendation logic to the updated threat assessment scores and the user response context data to generate weighted recommendations.

20. The computer-implemented method of claim 19, comprising:
    calculating a plurality of disagreement metrics based on differences between the feature threat score, the intent threat score, and the link threat score;

assigning a confidence value to the feature threat score, the intent threat score, and the link threat score;

assigning a weighting value to the feature threat score, the intent threat score, and the link threat score based on respective disagreement metrics and respective confidence values to generate respective weighting values for the feature threat score, the intent threat score, and the link threat score;

computing a weighted combination of the feature threat score, the intent threat score, and the link threat score based on the respective weighting values;

identifying message attributes based on the respective disagreement metrics; and in response to the user responses being received, generating contextual prompts based on the message attributes.

21. The computer-implemented method of claim 19, further comprising:

identifying contributing features for at least one threat assessment score based on feature importance data;

extracting message-specific variables based on the threat assessment scores and the feature importance data;

generating a contextual prompt based on the message-specific variables; and determining a prompt type for at least one contextual prompt based on a combination of the threat assessment scores and the respective confidence values.

22. The computer-implemented method of claim 19, wherein generating the score modification vectors comprises:

converting the user responses into structured response vectors using natural language processing;

applying transformation logic to the structured response vectors to generate score modification vectors for adjusting at least one of the threat assessment scores in a probability-based mathematical representation;

recording, for each adjusted threat assessment score, a modification lineage indicating a magnitude of adjustment and a source of the adjustment; and determining synthesis logic based on whether at least one of the feature threat score, the intent threat score, and the link threat score is adjusted using the score modification vectors or remains unmodified by user response input.

23. The computer-implemented method of claim 19, further comprising:

associating the electronic message, extracted features, contextual prompts, user responses, and classification output as structured training instances; and annotating each structured training instance with a score modification delta and a confidence improvement metric.

24. A non-transitory computer readable storage medium storing instructions that, when executed by at least one processor of a computing system, causes the computing system to:

receive an electronic message;

generate a feature threat score based on mathematical and structural features;

generate an intent threat score based on semantic analysis of manipulation patterns;

generate a link threat score based on embedded link analysis;

associate a respective confidence value with each threat assessment score;

compute a combined score based on a weighted combination of threat assessment scores and respective confidence values;

compare the combined score to a classification threshold;

generate a classification output based on the comparing, the classification output indicating whether the electronic message is malicious or benign;

in response to the combined score failing to satisfy threshold conditions for direct classification:

generate contextual prompts using threat assessment scores and respective confidence values as input parameters; and in response to receiving user responses to the contextual prompts:

generate score modification vectors for adjusting the threat assessment scores; and generate user response context data for adjusting recommendation parameters;

apply the score modification vectors to the threat assessment scores to generate updated threat assessment scores;

generate an updated classification output based on the updated threat assessment scores; and generate security recommendations by:

in response to not receiving user response context data, apply recommendation logic to the threat assessment scores and the classification output to generate baseline recommendations; and in response to receiving user response context data, apply recommendation logic to the updated threat assessment scores and the user response context data to generate weighted recommendations.

25. The non-transitory computer-readable storage medium of claim 24, wherein the instructions further cause the computing system to:

calculating a plurality of disagreement metrics based on differences between the feature threat score, the intent threat score, and the link threat score;

assigning a confidence value to the feature threat score, the intent threat score, and the link threat score;

assigning a weighting value to the feature threat score, the intent threat score, and the link threat score based on respective disagreement metrics and respective confidence values to generate respective weighting values for the feature threat score, the intent threat score, and the link threat score;

computing a weighted combination of the feature threat score, the intent threat score, and the link threat score based on the respective weighting values;

identifying message attributes based on the respective disagreement metrics; and in response to the user responses being received, generating contextual prompts based on the message attributes.

26. The non-transitory computer-readable storage medium of claim 24, wherein the instructions for generating the contextual prompts cause the computing system to:

identify contributing features for at least one threat assessment score based on feature importance data;

extract message-specific variables based on the threat assessment scores and the feature importance data;

generate a contextual prompt based on the message-specific variables; and determine a prompt type for at least one contextual prompt based on a combination of the threat assessment scores and the respective confidence values.

* * * * *